(12) United States Patent
Takeshita et al.

(10) Patent No.: US 10,591,136 B2
(45) Date of Patent: Mar. 17, 2020

(54) ARTIFICIAL SKYLIGHT UTILIZING LIGHT-GUIDES FOR ENHANCED DISPLAY

(71) Applicant: Panasonic Intellectual Property Management Co., Ltd., Osaka (JP)

(72) Inventors: Hironori Takeshita, Osaka (JP); Kentaro Yamauchi, Hyogo (JP); Satoru Yamauchi, Osaka (JP); Shumpei Fujii, Osaka (JP); Satoshi Hyodo, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/934,059

(22) Filed: Mar. 23, 2018

(65) Prior Publication Data
US 2018/0275498 A1    Sep. 27, 2018

(30) Foreign Application Priority Data

Mar. 24, 2017 (JP) ................. 2017-059791
Mar. 27, 2017 (JP) ................. 2017-061973
(Continued)

(51) Int. Cl.
*F21V 9/02* (2018.01)
*H05B 33/08* (2020.01)
(Continued)

(52) U.S. Cl.
CPC .............. *F21V 9/02* (2013.01); *F21S 8/02* (2013.01); *F21V 3/02* (2013.01); *F21V 3/049* (2013.01);
(Continued)

(58) Field of Classification Search
CPC .......... F21V 9/02; F21V 9/04; G03B 21/2066; H05B 33/0857
(Continued)

(56) References Cited

U.S. PATENT DOCUMENTS

| 4,315,302 A | 2/1982 | Petralia |
| 5,772,314 A | 6/1998 | Brumer |

(Continued)

FOREIGN PATENT DOCUMENTS

| JP | H09-205602 A | 8/1997 |
| JP | 2008-202283 A | 9/2008 |

(Continued)

OTHER PUBLICATIONS

Photography Mad, What Is Colour Temperature, Web Page (Year: 2016).*

(Continued)

*Primary Examiner* — Sean P Gramling
*Assistant Examiner* — Keith G. Delahoussaye
(74) *Attorney, Agent, or Firm* — McDermott Will & Emery LLP

(57) ABSTRACT

An illumination apparatus includes: a case having an opening portion; a first light source disposed in the case and including a plurality of light-emitting elements; a light diffuser which is disposed in the opening portion, diffuses and transmits light emitted from the first light source, and from which the diffused light and the transmitted light exit; a light emission component disposed outside a light exit region of the light diffuser on a light exit surface side of the light diffuser; and a second light source that emits light to the light emission component to cause the light emission component to radiate light.

20 Claims, 60 Drawing Sheets

(30) Foreign Application Priority Data

| Mar. 27, 2017 | (JP) | 2017-061985 |
|---|---|---|
| Mar. 28, 2017 | (JP) | 2017-064017 |
| Mar. 29, 2017 | (JP) | 2017-065504 |
| Mar. 29, 2017 | (JP) | 2017-065697 |

(51) Int. Cl.
*G02B 27/09* (2006.01)
*G03B 21/20* (2006.01)
*F21V 21/30* (2006.01)
*F21V 8/00* (2006.01)
*G03B 21/14* (2006.01)
*F21V 3/02* (2006.01)
*F21V 15/01* (2006.01)
*F21V 23/00* (2015.01)
*H05B 37/02* (2006.01)
*F21S 8/02* (2006.01)
*F21V 3/04* (2018.01)
*F21Y 113/20* (2016.01)
*F21Y 105/16* (2016.01)
*F21Y 115/10* (2016.01)
*F21W 121/00* (2006.01)
*F21Y 113/17* (2016.01)

(52) U.S. Cl.
CPC .............. *F21V 15/01* (2013.01); *F21V 21/30* (2013.01); *F21V 23/003* (2013.01); *G02B 6/0051* (2013.01); *G02B 27/0955* (2013.01); *G03B 21/145* (2013.01); *G03B 21/2033* (2013.01); *G03B 21/2066* (2013.01); *H05B 33/086* (2013.01); *H05B 33/0857* (2013.01); *H05B 37/0281* (2013.01); *F21W 2121/008* (2013.01); *F21Y 2105/16* (2016.08); *F21Y 2113/17* (2016.08); *F21Y 2113/20* (2016.08); *F21Y 2115/10* (2016.08)

(58) Field of Classification Search
USPC .................................................. 362/246, 247
See application file for complete search history.

(56) References Cited

U.S. PATENT DOCUMENTS

| 6,923,548 | B2 | 8/2005 | Lim |
| 7,052,152 | B2 | 5/2006 | Harbers et al. |
| 7,901,102 | B2 | 3/2011 | Jung et al. |
| 8,115,891 | B2 | 2/2012 | Ota |
| 8,240,875 | B2 | 8/2012 | Roberts et al. |
| 8,421,362 | B2 | 4/2013 | Kato |
| 8,608,351 | B2 | 12/2013 | Peifer |
| 8,764,226 | B2 | 7/2014 | Roberts et al. |
| 8,827,490 | B2 | 9/2014 | Kim et al. |
| 9,488,327 | B2 | 11/2016 | Van Gheluwe et al. |
| 9,658,489 | B1 | 5/2017 | Lee et al. |
| 9,951,925 | B2 | 4/2018 | Fujikawa et al. |
| 2007/0076427 | A1 | 4/2007 | Reo et al. |
| 2007/0236628 | A1 | 10/2007 | Epstein |
| 2009/0140972 | A1* | 6/2009 | Park ................. G02F 1/133609 345/102 |
| 2009/0273302 | A1 | 11/2009 | Staats et al. |
| 2009/0323334 | A1 | 12/2009 | Roberts et al. |
| 2010/0165660 | A1 | 7/2010 | Weber et al. |
| 2011/0122614 | A1* | 5/2011 | Kuan ..................... F21S 8/086 362/235 |
| 2012/0020053 | A1 | 1/2012 | Chen et al. |
| 2012/0051050 | A1 | 3/2012 | Lee et al. |
| 2012/0069556 | A1 | 3/2012 | Bertram et al. |
| 2012/0087122 | A1 | 4/2012 | Takeuchi et al. |
| 2012/0087124 | A1 | 4/2012 | Ravillisetty et al. |
| 2012/0113676 | A1* | 5/2012 | Van Dijk ............. G02B 6/0036 362/606 |
| 2012/0126711 | A1 | 5/2012 | Suminoe et al. |
| 2012/0139445 | A1 | 6/2012 | Fujiwara et al. |
| 2012/0230019 | A1 | 9/2012 | Peifer |
| 2012/0243232 | A1 | 9/2012 | Bertram et al. |
| 2012/0275154 | A1 | 11/2012 | Hood et al. |
| 2012/0320587 | A1 | 12/2012 | Roberts et al. |
| 2012/0320626 | A1* | 12/2012 | Quilici ..................... F21S 8/04 362/606 |
| 2012/0320627 | A1* | 12/2012 | Araki ....................... F21S 8/04 362/608 |
| 2013/0039047 | A1 | 2/2013 | Kim et al. |
| 2013/0069687 | A1 | 3/2013 | Ooto et al. |
| 2013/0100174 | A1 | 4/2013 | Yamada et al. |
| 2013/0334559 | A1 | 12/2013 | Vdovin et al. |
| 2014/0036498 | A1 | 2/2014 | Lee et al. |
| 2014/0070724 | A1 | 3/2014 | Gould et al. |
| 2014/0071673 | A1 | 3/2014 | Gould et al. |
| 2014/0117877 | A1 | 5/2014 | Mabel et al. |
| 2014/0133125 | A1 | 5/2014 | Di Trapani et al. |
| 2014/0328049 | A1 | 11/2014 | Hikmet et al. |
| 2015/0029718 | A1 | 1/2015 | Cook et al. |
| 2015/0163888 | A1 | 6/2015 | Fredricks |
| 2015/0184812 | A1 | 7/2015 | Van Bommel et al. |
| 2015/0226392 | A1 | 8/2015 | Gould et al. |
| 2015/0301781 | A1 | 10/2015 | Ekkaia et al. |
| 2015/0373806 | A1 | 12/2015 | Vissenberg et al. |
| 2015/0378083 | A1 | 12/2015 | Takakusaki |
| 2016/0010811 | A1 | 1/2016 | Benitez et al. |
| 2016/0227618 | A1 | 8/2016 | Meerbeek et al. |
| 2016/0245467 | A1 | 8/2016 | Lee et al. |
| 2016/0252231 | A1 | 9/2016 | Fujikawa et al. |
| 2016/0273723 | A1 | 9/2016 | Van Gheluwe et al. |
| 2016/0281960 | A1 | 9/2016 | Di Trapani et al. |
| 2016/0330838 | A1 | 11/2016 | Park et al. |
| 2016/0334066 | A1 | 11/2016 | Yuan et al. |
| 2016/0363710 | A1 | 12/2016 | Van Boven et al. |
| 2017/0051893 | A1 | 2/2017 | Di Trapani |
| 2017/0138551 | A1 | 5/2017 | Sussman et al. |
| 2017/0138572 | A1 | 5/2017 | Biron et al. |
| 2017/0257925 | A1 | 9/2017 | Forbis et al. |
| 2017/0322352 | A1 | 11/2017 | Fujii |
| 2018/0216791 | A1* | 8/2018 | Leung ..................... F21V 14/02 |
| 2018/0226014 | A1 | 8/2018 | Komanduri et al. |
| 2018/0376564 | A1 | 12/2018 | Van De Sluis et al. |

FOREIGN PATENT DOCUMENTS

| JP | 2008-223347 A | 9/2008 |
| JP | 2013-92616 A | 5/2013 |
| JP | 2015-207554 A | 11/2015 |
| JP | 2016-12540 A | 1/2016 |
| JP | 2016-514340 A | 5/2016 |
| WO | 2014/076656 A1 | 5/2014 |

OTHER PUBLICATIONS

Imperial Interiors, Web Page, Nov. 3, 2016 (Year: 2016).*
Virtual Sky LED Round Luminaire, YouTube, Oct. 21, 2015, Web Link, https://www.youtube.com/watch?v=svdTbKUscvg (Year: 2015).*
Mural Joe, How to Paint Clouds, YouTube, Jan. 24, 2016, Web Link, https://www.youtube.com/watch?v=vwbkKzDblRk (Year: 2016).*
U.S. Office Action issued in U.S. Appl. No. 15/934,363 dated Jun. 29, 2018.
www.apioptics.com/3m-display-film-spec.html, Mar. 12, 2014, pp. 1-3.
3M Optical System—Vikuiti Enhanced Specular Reflector, Mar. 12, 2014, 2 pages.
U.S. Office Action issued in U.S. Appl. No. 15/934,397 dated Aug. 9, 2018.
U.S. Office Action issued in U.S. Appl. No. 15/934,363 dated Dec. 20, 2018.
U.S. Office Action issued in U.S. Appl. No. 15/934,397 dated Feb. 4, 2019.
Office Action issued in related U.S. Appl. No. 15/934,644, dated Mar. 21, 2019.

(56) References Cited

OTHER PUBLICATIONS

Final Office Action issued in corresponding U.S. Appl. No. 15/934,644, dated Jul. 31, 2019.
Non-Final Office Action issued in corresponding U.S. Appl. No. 15/934,363, dated Aug. 5, 2019.
Non-Final Office Action issued in corresponding U.S. Appl. No. 15/934,397, dated Aug. 7, 2019.
Non-Final Office Action issued in corresponding U.S. Appl. No. 15/934,238, dated Sep. 18, 2019.
Non-Final Office Action issued in corresponding U.S. Appl. No. 15/934,644, dated Nov. 27, 2019.
Final Office Action issued in U.S. Appl. No. 15/934,397, dated Jan. 8, 2020.

* cited by examiner

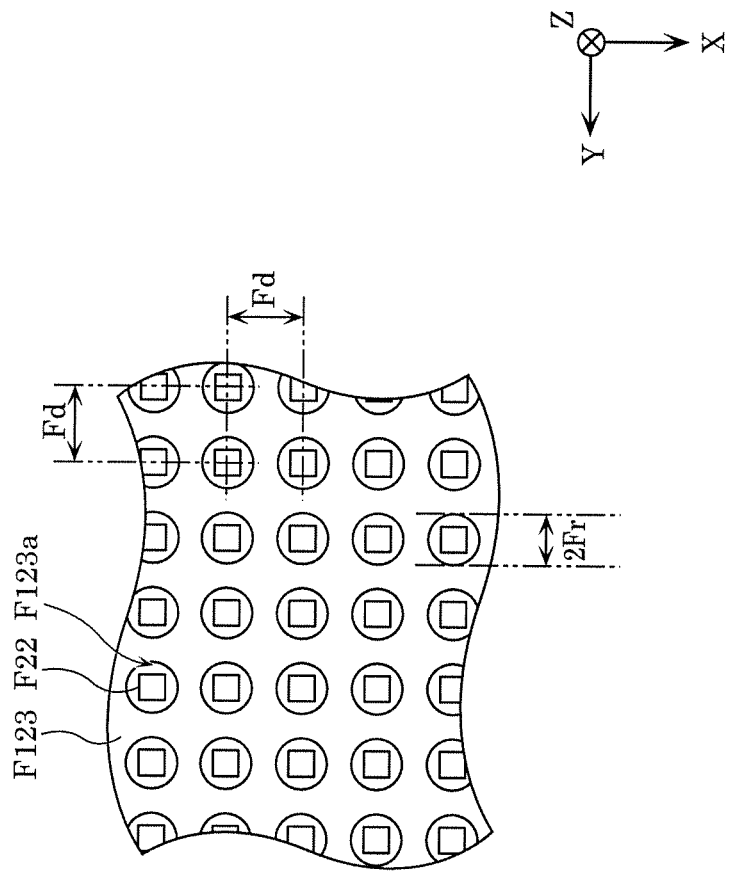

ARTIFICIAL SKYLIGHT UTILIZING LIGHT-GUIDES FOR ENHANCED DISPLAY

CROSS REFERENCE TO RELATED APPLICATION

This application claims the benefit of priority of Japanese Patent Application Number 2017-059791 filed on Mar. 24, 2017, Japanese Patent Application Number 2017-061973 filed on Mar. 27, 2017, Japanese Patent Application Number 2017-061985 filed on Mar. 27, 2017, Japanese Patent Application Number 2017-064017 filed on Mar. 28, 2017, Japanese Patent Application Number 2017-065504 filed on Mar. 29, 2017, and Japanese Patent Application Number 2017-065697 filed on Mar. 29, 2017, the entire contents of which are hereby incorporated by reference.

BACKGROUND

1. Technical Field

The present disclosure relates to an illumination apparatus and an illumination system that provide a user with a realistic feeling of looking at the sky through a window from indoors.

2. Description of the Related Art

Conventionally, an illumination apparatus that simulates natural light has been known. As an example of such kind of illumination apparatuses, Japanese Unexamined Patent Application Publication No. 2015-207554 (Patent Literature (PTL) 1) discloses an illumination apparatus including a light source that emits non-diffusing light having directivity, a light diffuser (a diffuser panel) that diffuses light, and an inner wall surface (a side wall) that is irradiated with light. This illumination apparatus irradiates the inner wall surface with light by diffusing, using the light diffuser, the non-diffusing light emitted from the light source, and partially transmitting the non-diffusing light without diffusion.

SUMMARY

For example, with a skylight, which is a window placed at a position deeper than a ceiling that is a part of a building, an inner wall surface is formed to connect the ceiling surface and the window in the direction intersecting the ceiling surface. In general, the look of the sky etc. seen through the skylight does not appear on the inner wall surface since natural light enters through the skylight. The illumination apparatus disclosed in PTL 1, however, emits artificial light, and thus, when, for example, light having a color is projected on the light diffuser, the inner wall surface is also irradiated with the light having the color. As a result, a user of the illumination apparatus may feel strange.

The present disclosure has an object to reduce a feeling of strangeness generated due to light irradiation of an inner wall surface of a part of a building or an inner wall surface of an illumination apparatus.

In order to achieve the above object, an illumination apparatus according to an aspect of the present disclosure includes: a case having an opening portion; a first light source disposed in the case and including a plurality of light-emitting elements; a light diffuser which is disposed in the opening portion, diffuses and transmits light emitted from the first light source, and from which the light diffused and the light transmitted exit; a light emission component disposed outside a light exit region of the light diffuser on a light exit surface side of the light diffuser; and a second light source that emits light to the light emission component to cause the light emission component to radiate light.

Furthermore, an illumination system according to an aspect of the present disclosure includes: an illumination apparatus including a case having an opening portion, a first light source disposed in the case and including a plurality of light-emitting elements, and a light diffuser which is disposed in the opening portion, diffuses and transmits light emitted from the first light source, and from which the light diffused and the light transmitted exit; light-emitting equipment including a light emission component disposed outside a light exit region of the light diffuser on a light exit surface side of the light diffuser, and a second light source that emits light to the light emission component to cause the light emission component to radiate light; and an illumination controller that controls light emission of the first light source and light emission of the second light source.

According to the present disclosure, it is possible to reduce a feeling of strangeness generated due to light irradiation of an inner wall surface of a part of a building or an inner wall surface of an illumination apparatus.

BRIEF DESCRIPTION OF DRAWINGS

The figures depict one or more implementations in accordance with the present teaching, by way of examples only, not by way of limitations. In the figures, like reference numerals refer to the same or similar elements.

FIG. 64 is a fragmentary plan view of the illumination apparatus according to Variation 9, in a state in which a light diffuser is omitted from FIG. 57.

DETAILED DESCRIPTION OF THE EMBODIMENTS

Figure 1:
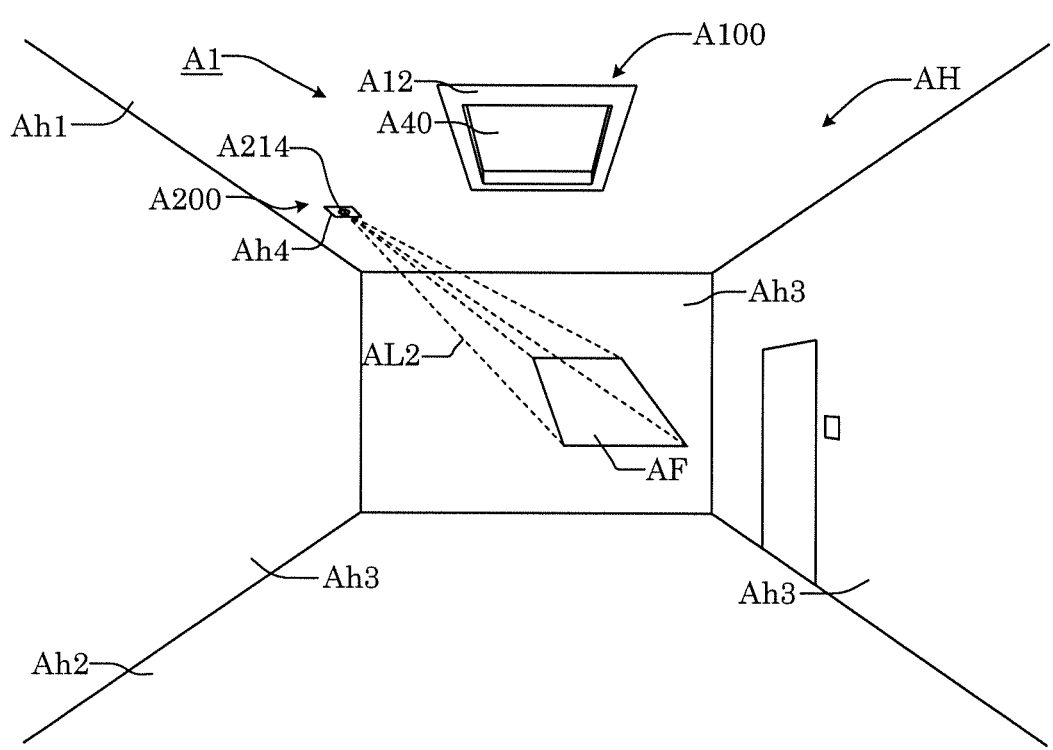
FIG. 1 is a diagram illustrating a schematic configuration of an illumination system according to Embodiment 1.

Hereinafter, Embodiments 1 to 6 of the present disclosure will be described with reference to the drawings. A configuration for achieving the above object will be described in Embodiment 4. Although each of the other embodiments has a unique object, it is possible to provide a more effective illumination apparatus and illumination system by combining Embodiment 4 and one or more of the other embodiments.

Moreover, the embodiments described below each represent a generic or specific example. As such, the numerical values, shapes, materials, structural components, the arrangement and connection of the structural components, etc. shown in the following embodiments are mere examples, and are not intended to limit the scope of the present disclosure. Therefore, among the structural components in the following embodiments, structural components not recited in any one of the independent claims which indicate the broadest concepts of the present disclosure are described as optional structural components.

Furthermore, the expression "substantially . . . ," described here using "substantially rectangular" as an example, is intended to include not only something that is exactly rectangular but also something that is acknowledged to be substantially rectangular. To put it differently, "substantially" used in the Specification means within manufacturing errors and dimensional tolerances. In addition, the expression "approximately . . . ," described here using "approximately aligned" as an example, is intended to include not only something that is completely aligned but also something that is acknowledged to be approximately aligned. Stated differently, "approximately" used in the Specification means within manufacturing errors and dimensional tolerances.

It should be noted that the figures are schematic diagrams and are not necessarily precise illustrations. Furthermore, in the figures, substantially identical components are assigned the same reference signs, and overlapping description may be omitted or simplified.

Furthermore, the drawings used for description in the following embodiments may show coordinate axes. The negative side of the Z axis represents a floor side, and the positive side of the Z axis represents a ceiling side. Moreover, the X-axis direction and the Y-axis direction are orthogonal to each other on a plane perpendicular to the Z-axis direction. The X-Y plane is a plane parallel to a light diffuser of an illumination apparatus. For example, in the following embodiments, "plan view" means seeing from the Z-axis direction. In addition, for example, in the following embodiments, "section view" means seeing a cross section of the illumination apparatus cut along a plane including a section line, from a perpendicular direction with respect to the cross section. When, for example, the illumination apparatus is cut along a plane defined by the Y axis and the Z axis (an exemplary plane cut along a section line), "section view" means seeing the section from the X-axis direction.

(Embodiment 1)

Conventionally, illumination systems capable of reproducing illumination by sunlight are known (e.g., see Japanese Unexamined Patent Application Publication No. 2016-514340). The illumination system gives a user the impression that light diffused by a light diffuser, which is part of the illumination system, looks like sunlight, by causing the user to perceive that an infinite space is present beyond the light diffuser.

The illumination system is, however, required to increase a distance between a light-emitting module and the light diffuser to allow the user to perceive a space beyond the light diffuser as the infinite space. Accordingly, the illumination system grows in size in a depth direction with the increase in distance.

In view of this, Embodiment 1 has an object to provide an illumination system and an illumination method that are capable of giving the impression that emitted light looks like sunlight, without having to increase a distance between a light-emitting module and a light diffuser.

[Illumination System]

The following describes illumination system A1 according to Embodiment 1 of the present disclosure.

FIG. 1 is a diagram illustrating a schematic configuration of illumination system A1 according to Embodiment 1. As illustrated in FIG. 1, illumination system A1 includes: first luminaire A100 that is of an internal lighting type; and second luminaire A200 that is of a projection type, and these luminaires are disposed in, for example, same space AH defined by a room in a building. Here, space AH is a space closed to a certain degree, and is defined by, for example, a corridor, a staircase, a bathroom, a kitchen, a toilet, an entrance, and a hall other than a room. Illumination system A1 is suitable for being disposed in, for example, space AH having no windows because illumination system A1 is capable of reproducing virtual sunlight. It should be noted that luminaires (first luminaire A100 and second luminaire A200) can be also referred to as illumination apparatuses.

Space AH is created by ceiling surface Ah1, floor surface Ah2, and wall surfaces Ah3. In Embodiment 1, a case is described in which first luminaire A100 and second luminaire A200 are disposed on ceiling surface Ah1.

[First Luminaire]

Figure 2:
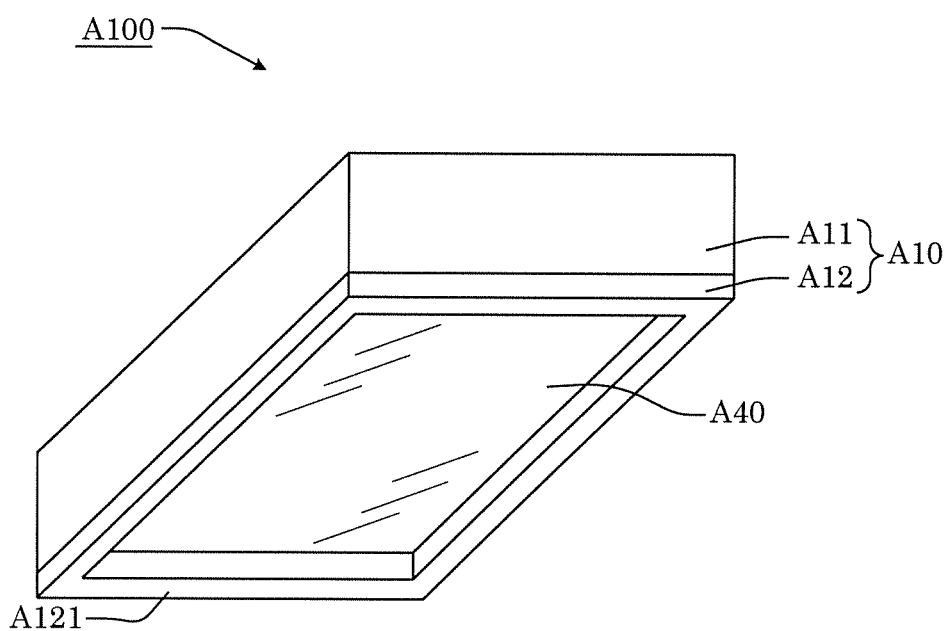
FIG. 2 is a perspective view illustrating a first luminaire according to Embodiment 1.
Figure 3:
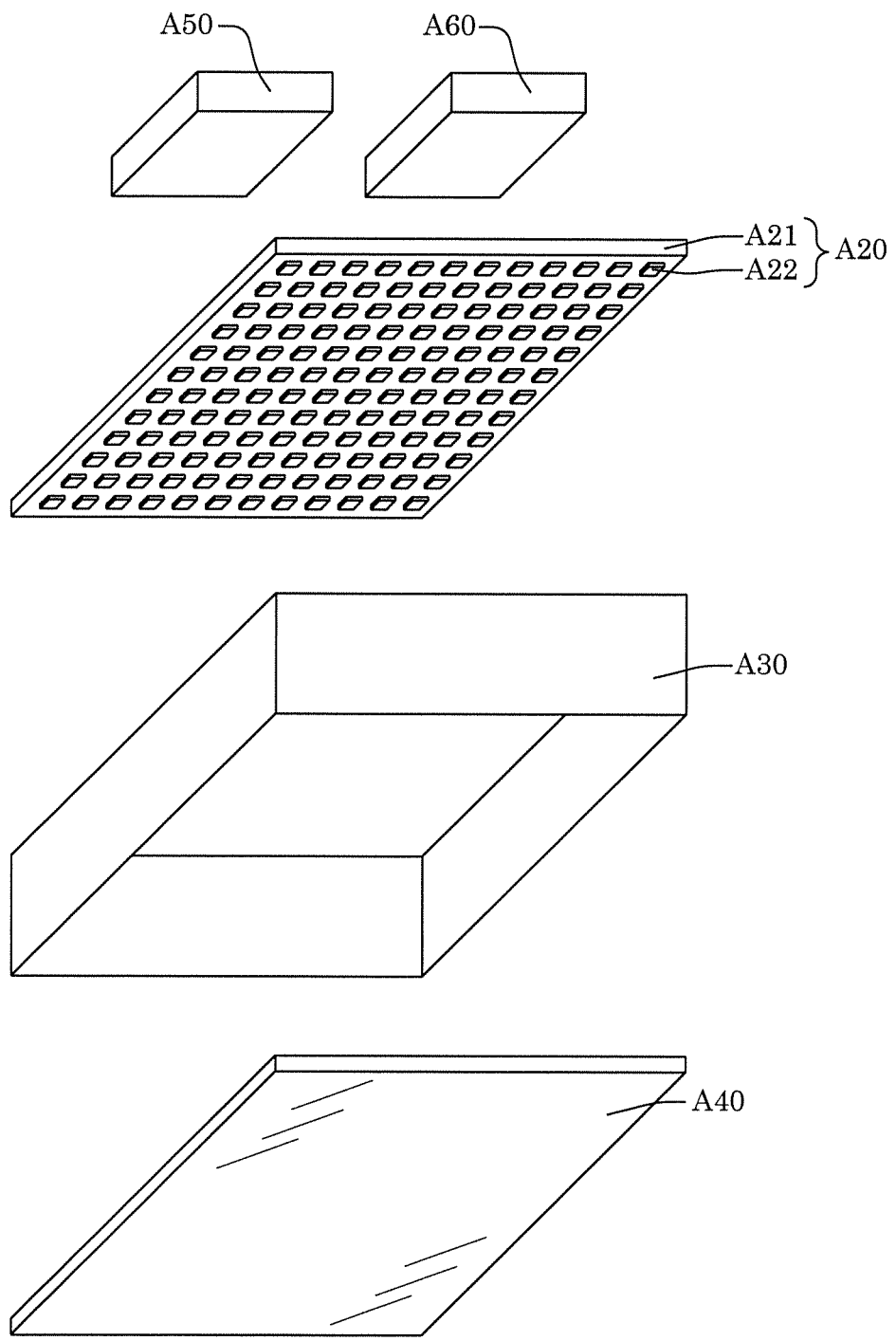
FIG. 3 is an exploded perspective view illustrating parts of the first luminaire according to Embodiment 1.

Next, the following describes first luminaire A100. FIG. 2 is a perspective view illustrating first luminaire A100 according to Embodiment 1. FIG. 3 is a perspective view illustrating parts of first luminaire A100 according to Embodiment 1.

As illustrated in FIG. 2 and FIG. 3, first luminaire A100 includes case A10, light-emitting module A20, light reflector A30, light diffuser A40, controller A50, and power source A60.

Case A10 is a box-like case body that houses light-emitting module A20, light reflector A30, light diffuser A40, controller A50, and power source A60.

Case A10 includes housing portion A11 and frame portion A12.

Housing portion A11 is a housing body that houses light-emitting module A20, light reflector A30, light diffuser A40, controller A50, and power source A60. It should be noted that house controller A50 and power source A60 need not be housed in housing portion A11, and may be disposed, for example, outside of case A10. Housing portion A11 has an opening in a bottom surface on a side facing floor surface Ah2, and houses light diffuser A40 to cover the opening.

Frame portion A12 is a frame-like member having a substantially rectangular shape in a plan view, and is disposed in an edge portion of the bottom surface of housing portion A11. Light diffuser A40 is framed and held by frame portion A12. In consequence, light diffuser A40 is exposed from the opening of frame portion A12. Moreover, frame portion A12 is embedded in a ceiling so that surface A121 opposite to housing portion A11 in frame portion A12 is flush with ceiling surface Ah1. For this reason, light diffuser A40 is disposed farther back than surface A121 of frame portion A12.

Light-emitting module A20 is a light source for emitting first illumination light having a color simulating a sky. As illustrated in FIG. 3, light-emitting module A20 is fixed to an end portion of light reflector A30 opposite to light diffuser A40. Light-emitting module A20 includes board A21 and first light sources A22 mounted on board A21.

Board A21 is a printed circuit board for mounting first light sources A22 and is formed in a substantially rectangular shape.

First light sources A22 are, for example, light-emitting elements such as light-emitting diodes (LEDs). In Embodiment 1, first light sources A22 are RGB-type LEDs that emit red light, green light, and blue light. First light sources A22 are disposed on a surface of board A21 on a side facing floor surface Ah2. For example, first light sources are disposed in a matrix on the surface of board A21 on the side facing floor surface Ah2. It should be noted that LEDs may be surface-mount device (SMD) LEDs or chip-on board (COB) LEDs.

In Embodiment 1, first light sources A22 are capable of emitting light having various colors, by adjusting luminance of blue light, green light, and red light, because first light sources A22 are the RGB-type LEDs.

Light reflector A30 is an optical member that is disposed to surround first light sources A22 and has reflectivity for light emitted by first light sources A22. In other words, light reflector A30 reflects light emitted by first light sources A22 and entering light reflector A30. In Embodiment 1, light reflector A30 is a frame-like member surrounding first light sources A22, and reflects light with an inner surface thereof.

Light reflector A30 is produced by, for example, performing a diffusion treatment on a reflecting plate made of a metal material such as aluminum (Al) and having a mirror surface. Examples of the diffusion treatment include a frosting treatment such as an anodizing treatment. It should be noted that the diffusion treatment may be performed at least on the inner surface of light reflector A30.

Light diffuser A40 has translucency and diffusibility for light emitted from light-emitting module A20. Light diffuser A40 is produced by, for example, diffusion processing on a resin material such as transparent acryl or polyethylene terephthalate (PET) or on a transparent plate made of glass. Light diffuser A40 is a rectangular plate in a plan view. Light diffuser A40 is fixed to an end portion of light reflector A30 opposite to light-emitting module A20. In other words, light diffuser A40 is opposite to light-emitting module A20 and is disposed to cover light-emitting module A20. As a result, light emitted from light-emitting module A20 and light reflected by light reflector A30 are diffused and emitted outward by light diffuser A40. In this case, light emitted by respective first light sources A22 of light-emitting module A20 is diffused by light diffuser A40, and becomes mixed together without causing granular appearance thereof. This allows light diffuser A40 to emit, for example, the first illumination light having the color simulating the sky such as a blue sky, a cloudy sky, and an evening sky without causing a sense of discomfort. In other words, light diffuser A40 is a light emitter that emits the first illumination light having the color simulating the sky. Light diffuser A40, the light emitter, represents a color simulating a virtual sky over a whole area. By observing light diffuser A40 from there, a user receives an impression as if the user were looking at a sky.

It should be noted that light emitted from respective first light sources A22 of light-emitting module A20 is emitted from light diffuser A40 with going through no wavelength converter layer because there are no other components between light diffuser A40 and light-emitting module A20.

Controller A50 is a control device that controls operations of light-emitting module A20 such as lighting up, turning off, dimming, and toning (adjustment of a color of emitted light or a color temperature). For example, controller A50 obtains information about a display image stored in a storage (not shown), and causes light-emitting module A20 to reproduce the display image according to the information. Specifically, when displaying a blue sky, controller A50 obtains information about the blue sky from the storage, and controls light-emitting module A20 based on the information obtained. It should be noted that controller A50 and light-emitting module A20 (first light sources A22) are electrically connected via a signal line.

In Embodiment 1, first light sources A22 are the RGB-type LEDs. For this reason, controller A50 outputs a control signal to first light sources A22 via the signal line, the control signal including information about luminance of each of blue LEDs, green LEDs, and red LEDs. First light sources A22 receiving the control signal emit blue light, green light, and red light based on the control signal.

Controller A50 is implemented by, for example, a microcomputer, a processor, or a dedicated circuit. In Embodiment 1, controller A50 is disposed on a surface of light-emitting module A20 opposite to light diffuser A40.

Power source A60 is, for example, a power converter circuit that converts AC power supplied from a power system such as a commercial power source, into DC power. Power source A60 includes a power circuit that generates power for causing first light sources A22 of light-emitting module A20 to emit light. For example, power source A60 converts AC power supplied from a commercial power source into DC power having a predetermined level, by rectifying, smoothing, stepping down, etc. the AC power, and supplies the DC power to light-emitting module A20. Power source A60 is electrically connected to the power system via, for example, a power line.

[Second Luminaire]

Next, the following describes second luminaire A200.

Second luminaire A200 is a luminaire that projects, on an object, second illumination light having a color simulating sunlight. Specifically, as illustrated in FIG. 1, second luminaire A200 creates projection area AF by projecting second illumination light AL2 having a color simulating sunlight on an object composed of floor surface Ah2 and wall surface Ah3 among the surfaces defining space AH. When light diffuser A40 of first luminaire A100 is assumed to be a window, projection area AF virtually represents a sunny place created on wall surface Ah3 by sunlight passing through the window. Second luminaire A200 further may be a kind of spotlight. Second luminaire A200 may be a cutter spotlight which is capable of changing a shape of light. Any kind of light which is capable of changing its lighting area or lighting color may be adapted to second luminaire A200.

In other words, first luminaire A100 virtually reproduces a sky, and second luminaire A200 virtually reproduces a sunny place and sunlight entering from the sky virtually reproduced by first luminaire A100.

The following describes second luminaire A200 in detail.

Figure 4:
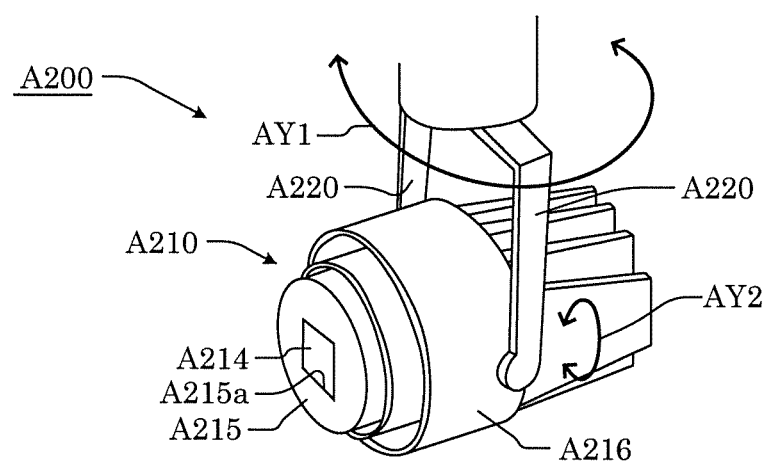
FIG. 4 is a perspective view illustrating a schematic configuration of a second luminaire according to Embodiment 1.
Figure 5:
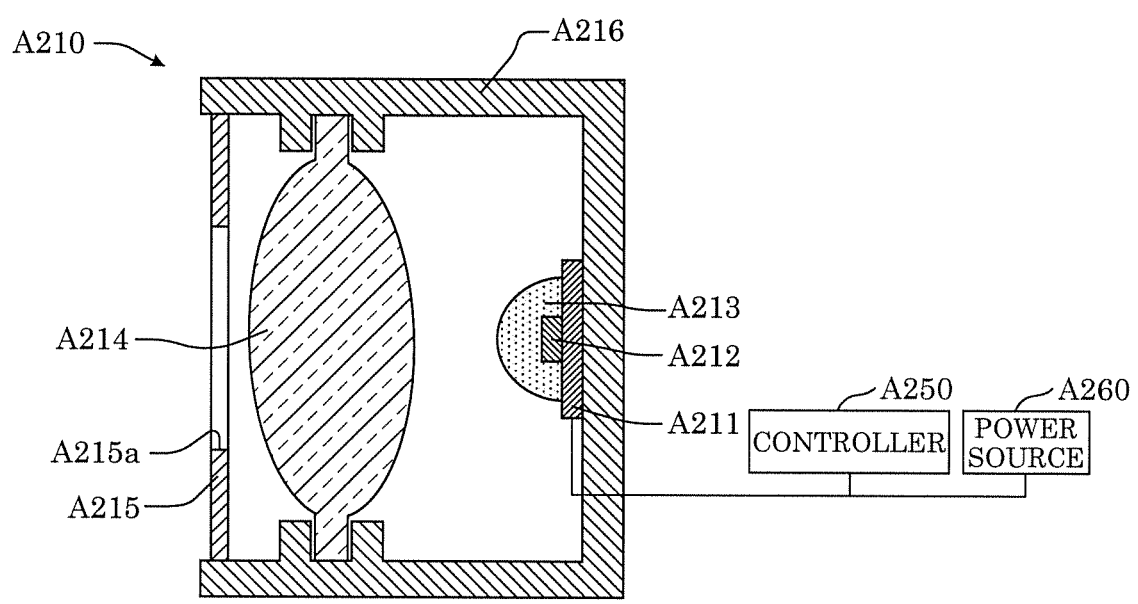
FIG. 5 is a fragmentary sectional view schematically illustrating an internal structure of the second luminaire according to Embodiment 1.

FIG. 4 is a perspective view illustrating a schematic configuration of second luminaire A200 according to Embodiment 1. FIG. 5 is a fragmentary sectional view schematically illustrating an internal structure of luminaire body A210 of second luminaire A200 according to Embodiment 1.

As illustrated in FIG. 4, second luminaire A200 is a spotlight and includes: luminaire body A210 that is cylindrical; and pair of arms A220 that holds luminaire body A210. As illustrated in FIG. 1, second luminaire A200 is installed in the ceiling so that luminaire body A210 is exposed from installation opening Ah4 provided in ceiling surface Ah1.

As illustrated in FIG. 5, luminaire body A210 includes board A211, second light source A212, wavelength converter layer A213, lens A214, mask A215, and supporting member A216.

Board A211 is a board on which second light source A212 is mounted, and includes a metal line for supplying power to second light source A212.

Second light source A212 is, for example, a light-emitting element such as an LED. In Embodiment 1, second light source A212 is, for example, a blue LED that emits blue light. It should be noted that the blue LED may be a surface-mount device (SMD) LED or a chip-on board (COB) LED. In addition, it is possible to use, as second light source A212, a laser diode other than an LED.

Wavelength converter layer A213 is a sealing layer that seals second light source A212. Specifically, wavelength converter layer A213 includes a translucent resin material containing, as a wavelength converter material, yellow phosphor particles. Although, for example, a silicon resin is used as the translucent resin material, an epoxy resin or a urea resin may be used. As the yellow phosphor particles, yttrium aluminum garnet (YAG)-based phosphor particles are used, for example.

With this configuration, the wavelength of a portion of the blue light emitted by second light source A212 is converted by the yellow phosphor particles contained in wavelength converter layer A213, which transforms the portion into yellow light. Subsequently, the blue light not absorbed by the yellow phosphor particles and the yellow light resulting from the wavelength conversion by the yellow phosphor particles are diffused and mixed. As a result, light having a color (white color) simulating sunlight is emitted from wavelength converter layer A213.

Lens A214 is a lens that controls distribution of light emitted from wavelength converter layer A213. Specifically, lens A214 is, for example, a biconvex lens and is disposed opposite to wavelength converter layer A213.

Mask A215 partially blocks light passing through lens A214 to provide second illumination light AL2. Specifically, mask A215 is a plate including a translucent member, and has opening A215a in the center area. Mask A215 is disposed opposite to lens A214, and a portion of lens A214 is exposed from opening A215a. Light passing through opening A215a becomes second illumination light AL2 to create projection area AF. In other words, the plan view shape of opening A215a determines the shape of projection area AF. Lens A214 the portion of which is exposed from opening A215a of mask A215 is a projector that projects, on an object, second illumination light AL2 having a color simulating sunlight.

Supporting member A216 is, for example, a metal case and includes board A211, second light source A212, wavelength converter layer A213, lens A214, and mask A215. Supporting member A216 is a member that gives an external appearance to luminaire body A210, and is supported by pair of arms A220 as illustrated in FIG. 4.

Pair of arms A220 is horizontally rotatable in installation opening Ah4 (see arrow AY1 in FIG. 4). In addition, pair of arms A220 holds luminaire body A210 vertically rotatably (see arrow AY2 in FIG. 4). It is possible to adjust the orientation of luminaire body A210 by combining horizontal rotation of pair of arms A220 and vertical rotation of luminaire body A210. Accordingly, it is also possible to adjust the location of projection area AF.

In Embodiment 1, it is assumed that the orientation of luminaire body A210 is manually adjusted. For this reason, when second luminaire A200 is installed in installation opening Ah4, an installer adjusts the orientation of luminaire body A210 in advance so that projection area AF is created at a desired location. Here, the desired location is a location in which a sunny place is estimated to appear when light diffuser A40 of first luminaire A100 is assumed to be a window and sunlight enters from the window.

It should be noted that providing a drive source for adjusting the orientation of second luminaire A200 to second luminaire A200 makes it possible to automatically adjust the orientation of luminaire body A210.

As shown in FIG. 5, second luminaire A200 includes controller A250 and power source A260.

Controller A250 is a control device that is electrically connected to second light source A212 and controls operations of second light source A212 such as lighting up and turning off. Controller A250 is implemented by, for example, a microcomputer, a processor, or a dedicated circuit.

Power source A260 is, for example, a power converter circuit that converts AC power supplied from a power system such as a commercial power source, into DC power. Power source A260 includes a power circuit that generates power for causing second light sources A212 to emit light. For example, power source A260 converts AC power supplied from a commercial power source into DC power having a predetermined level, by rectifying, smoothing, stepping down, etc. the AC power, and supplies the DC power to second light source A212. Power source A260 is electrically connected to the power system via, for example, a power line.

[Conditions for Second Illumination Light]

In Embodiment 1, it is assumed that second illumination light has luminance and a color temperature that are constant. Here, when the second illumination light satisfies conditions including a luminance condition and a color temperature condition, the second illumination light makes it possible to give reality to sunlight imitated by the second illumination light, using compositive visual effects with first illumination light emitted by first luminaire A100.

The luminance condition is defined as a condition in which a relationship between the real sky and sunlight is specified by luminance. Specifically, the luminance condition is defined as a condition in which, when the light emitter (light diffuser A40 of first luminaire A100) and the projector (lens A214 of second luminaire A200) are observed from a place not illuminated by second illumination light AL2, the light emitter is greater in luminance than the projector. In other words, when the light emitter is observed from the place not illuminated by second illumination light AL2, the projector appears dark. Stated differently, when a user observes the light emitter from the place not illuminated by second illumination light AL2, it is possible to strongly impress a sky reproduced by the light emitter on the user because the projector becomes less prominent from the place not illuminated by second illumination light AL2.

Moreover, the luminance condition may be defined as a condition in which, when the light emitter (light diffuser A40 of first luminaire A100) and the projector (lens A214 of second luminaire A200) are observed from a place illuminated by second illumination light AL2, the light emitter is less in luminance than the projector. In other words, when the light emitter is observed from the place illuminated by second illumination light AL2, the projector appears brighter. Stated differently, it is possible to impress, on the user, a shine when the sun is seen from a window.

It should be noted that at least one of the above-described luminance conditions may be satisfied. When the two luminance conditions are satisfied, it is possible to produce a more effective dramatic impact.

The color temperature condition is defined as a condition in which a relationship between the real sky and a sunny place is specified by a color temperature. Specifically, the color temperature condition is defined as a condition in which second illumination light AL2 is lower in color temperature than the first illumination light. For example, in a relationship between a real blue sky and a sunny place, the blue sky has a color temperature of at least 10000 K and at most 15000 K, and the sunny place has a color temperature of at least 4000 K and at most 6500 K. It should be noted that the blue sky may have a color temperature of at least 10000 K and at most 12000 K. In addition, the sunny place may have a color temperature of at least 6000 K and at most 6500 K.

In a relationship between a real evening sky and a sunny place, the evening sky has a color temperature of at least 3000 K and at most 3500 K, and the sunny place has a color temperature of at least 2000 K and at most 2700 K. As above, regarding a relationship between a daytime sky and a sunny place, the sunny place is lower in color temperature than the sky in either of the cases. In other words, as described above, under the color temperature condition in which second illumination light AL2 is lower in color temperature than the first illumination light, it is possible to surely reproduce a virtual sky and a sunny place using the first illumination light and second illumination light AL2.

[Positional Relationship Among Elements]

Next, the following describes a positional relationship among light diffuser A40 of first luminaire A100, lens A214 of second luminaire A200, and projection area AF.

As illustrated in FIG. 1, light diffuser A40 and lens A214 are higher than projection area AF by being disposed on ceiling surface Ah1. Sunlight streams down from mostly above during daytime. In other words, when light diffuser A40 is higher than projection area AF, first luminaire A100 and projection area AF make it possible to reproduce a positional relationship between the real sun and a sunny place.

Figure 6:
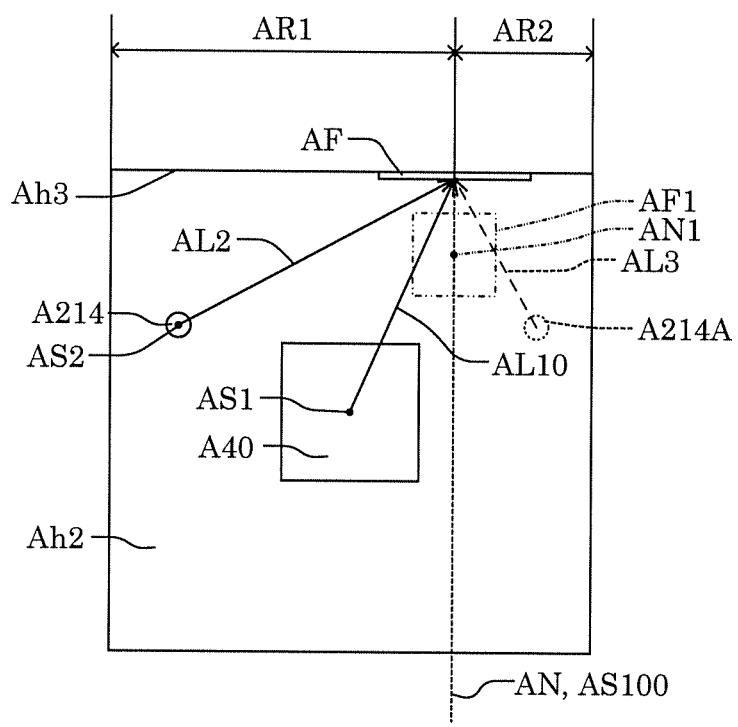
FIG. 6 is a ceiling plan illustrating a positional relationship among a light diffuser, a lens, and a projection area according to Embodiment 1 in a horizontal direction.

Next, the following describes a positional relationship among light diffuser A40, lens A214, and projection area AF in a horizontal direction. FIG. 6 is a ceiling plan illustrating a positional relationship among light diffuser A40, lens A214, and projection area AF according to Embodiment 1 in a horizontal direction. In other words, FIG. 6 illustrates the positional relationship among the elements when light diffuser A40 is seen in a plan view. It should be noted that FIG. 6 illustrates projection area AF which is increased in thickness for the purpose of convenience.

Second illumination light AL2 projected from lens A214 creates a shadow on projection area AF. Moreover, as mentioned above, projection area AF is created at the location in which the sunny place is estimated to appear when light diffuser A40 of first luminaire A100 is assumed to be the window and the sunlight enters from the window. For this reason, it is desirable to give the impression that the shadow created on projection area AF also looks like a shadow created by the sunlight.

As illustrated in FIG. 6, when reference plane AS100 that is a plane perpendicular to a plane when light diffuser A40 is seen in a plan view and that includes normal line AN passing the center of projection area AF is considered a boundary, a portion on the left of reference plane AS100 is referred to as first region AR1, and a portion on the right of reference plane AS100 is referred to as second region AR2, light diffuser A40 and lens A214 are both in first region AR1.

In other words, when light diffuser A40 is seen in a plan view, light diffuser A40 and lens A214 are both on the same side with reference plane AS100 as the boundary.

As just described, when light diffuser A40 and lens A214 are in first region AR1, sunlight AL10 entering from the window when light diffuser A40 is assumed to be the window and second illumination light AL2 projected from center AS2 of lens A214 travel in almost the same direction. In other words, the shadow created on projection area AF by second illumination light AL2 also extends in almost the same direction as a shadow created by sunlight AL10. Accordingly, it is possible to give the impression that the shadow created on projection area AF looks like the shadow created by sunlight AL10.

As a comparative example, a case will be described in which light diffuser A40 is in first region AR1 and lens A214A is in second region AR2. In this case, sunlight AL10 entering from a window when light diffuser A40 is assumed to be the window and second illumination light AL3 projected from the center of lens A214A significantly differ in traveling direction. In other words, a shadow created on projection area AF by second illumination light AL3 extends in a direction completely different from a direction in which a shadow created by sunlight AL10 extends, which gives the user a sense of discomfort.

For these reasons, in the case where light diffuser A40 and lens A214 are on the same side with reference plane AS100 as a boundary when light diffuser A40 is seen in a plan view, it is possible to give the impression that the shadow created on projection area AF looks like the shadow created by sunlight AL10. In particular, it is possible to create a more real shadow on projection area AF because closely arranging light diffuser A40 and lens A214 allows sunlight AL10 and second illumination light AL2 to be as parallel to each other as possible.

It should be noted that, in Embodiment 1, the case is described in which entire light diffuser A40 and entire lens A214 are on the same side with reference plane AS100 as the boundary when light diffuser A40 is seen in a plan view. It is sufficient, however, that centers AS1 and AS2 of light diffuser A40 and lens A214 are on the same side.

Moreover, in Embodiment 1, the case is described in which projection area AF is created on wall surface Ah3. Meanwhile, it is sufficient that a plane that is perpendicular to a plane when light diffuser A40 is seen in a plan view and has normal line AN passing the center of projection area AF1 created on floor surface Ah2 is used as reference plane AS100 also for projection area AF1.

[Advantageous Effects Etc.]

As described above, according to Embodiment 1, illumination system A1 includes: first luminaire A100 that is of an internal lighting type and includes a light emitter (light diffuser A40) that emits first illumination light having a color simulating a sky; and second luminaire A200 that is of a projection type and includes a projector (lens A214) that projects, on an object (floor surface Ah2), second illumination light AL2 having a color simulating sunlight. First luminaire A100 and second luminaire A200 are disposed in same space AH, and first luminaire A100 is disposed higher with respect to a floor than projection area AF created on the object by second illumination light AL2.

With this configuration, since second luminaire A200, which projects second illumination light AL2 simulating the sunlight, is included separately from first luminaire A100, which emits the first illumination light having the color simulating the sky, it is possible to give the impression that the light (first illumination light and second illumination light AL2) emitted by first luminaire A100 and second luminaire A200 looks like the sunlight, using compositive visual effects of the sky reproduced by first luminaire A100 and the sunlight (projection area AF) reproduced by second luminaire A200. In other words, it is possible to give the impression that the light (first illumination light and second illumination light AL2) emitted by first luminaire A100 and second luminaire A200, without having to increase a distance between light-emitting module A20 and light diffuser A40 in first luminaire A100.

Moreover, second illumination light AL2 is lower in color temperature than the first illumination light.

With this configuration, it is possible to surely reproduce a virtual sky and sunlight using the first illumination light and second illumination light AL2.

Moreover, when the light emitter and the projector are observed from a place not illuminated by second illumination light AL2, the light emitter is higher in luminance than the projector.

With this configuration, when a user observes the light emitter from the place not illuminated by second illumination light AL2, it is possible to strongly impress a sky reproduced by the light emitter on the user because the projector becomes less prominent from the place not illuminated by second illumination light AL2.

Moreover, when the light emitter and the projector are observed from a place illuminated by second illumination light AL2, the light emitter is lower in luminance than the projector. When the light emitter is observed from the place illuminated by second illumination light AL2, the projector appears brighter. Stated differently, it is possible to impress, on the user, a shine when the sun is seen from a window.

Moreover, when the light emitter is seen in a plan view, the light emitter and the projector are on a same side with a reference plane as a boundary, the reference plane being perpendicular to a plane defined in the plan view, and including a normal line passing the center of the projection area.

With this configuration, in the case where light diffuser A40 and lens A214 are on the same side with reference plane AS100 as a boundary when light diffuser A40 is seen in a plan view, it is possible to give the impression that a shadow created on projection area AF looks like a shadow created by sunlight.

Moreover, first luminaire A100 and second luminaire A200 are disposed on a same surface (ceiling surface Ah1) among surfaces defining same space AH.

With this configuration, it is possible to dispose first luminaire A100 and second luminaire A200 closer to each other because first luminaire A100 and second luminaire A200 are on the same surface. Consequently, it is possible to allow sunlight AL10 and second illumination light AL2 to be as parallel to each other as possible, and create a more real shadow on projection area AF, sunlight AL10 entering, when light diffuser A40 of first luminaire A100 is assumed to be a window, from the window.

Moreover, first luminaire A100 includes an LED as first light source A22, and light emitted from first light source A22 is emitted from the light emitter with going through no wavelength converter layer. Furthermore, second luminaire A200 includes one of an LED and a laser diode as second light source A212, and light emitted from second light source A212 is emitted from the projector via wavelength converter layer A213.

With this configuration, illumination system A1 including first luminaire A100 not having the wavelength converter layer and second luminaire A200 having wavelength converter layer A213 makes it possible to give the impression that the light (first illumination light and second illumination light AL2) emitted by first luminaire A100 and second luminaire A200 looks like sunlight.

Moreover, first luminaire A100 further includes frame portion A12 that holds the light emitter, and the light emitter is disposed farther back than a surface of frame portion A12 on a side facing same space AH.

For example, when light diffuser A40, the light emitter, is flush with ceiling surface Ah1, it seems to the user that the ceiling looks like a thin plate, which may make it difficult to reproduce a real sky. However, when the light emitter is disposed farther back than the surface of frame portion A12 on the side facing same space AH, it is possible to reproduce a more real sky.

[Variation 1]

In Embodiment 1, the case is described in which first luminaire A100 and second luminaire A200 are disposed on the same surface (ceiling surface Ah1) among the surfaces defining space AH. In Variation 1, a case is described in which first luminaire A100 and second luminaire A200 are disposed on different surfaces among the surfaces defining space AH. It should be noted that hereinafter descriptions of elements that are identical to those in Embodiment 1 may be omitted.

Figure 7:
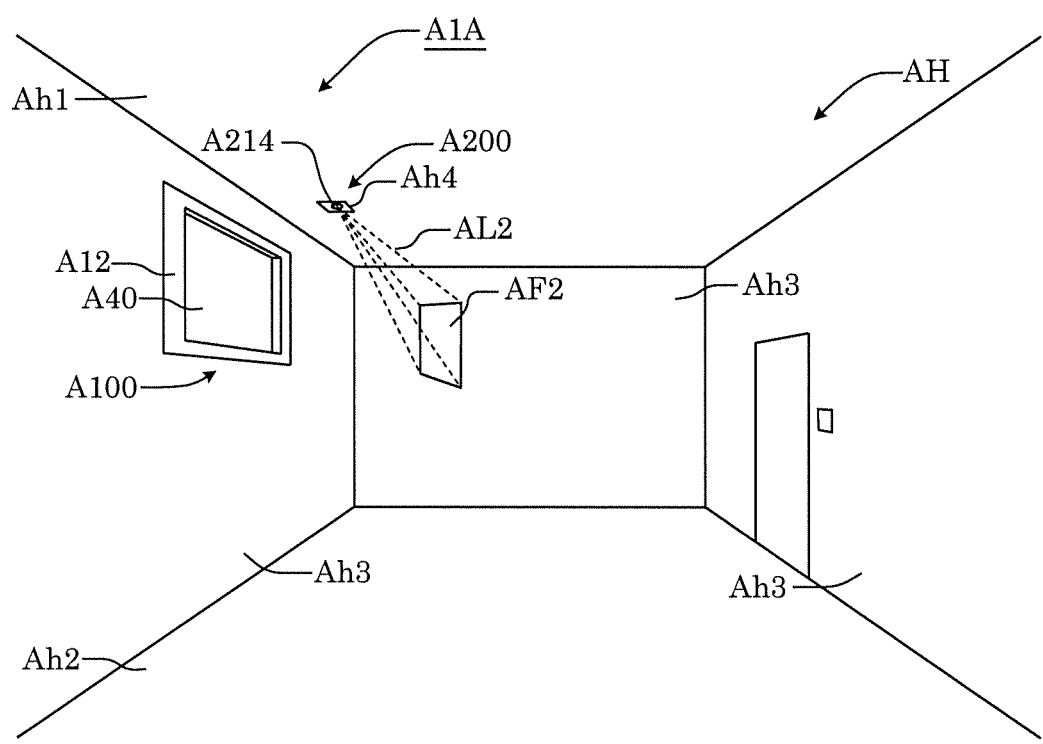
FIG. 7 is a diagram illustrating a schematic configuration of an illumination system according to Variation 1.

FIG. 7 is a diagram illustrating a schematic configuration of illumination system A1A according to Variation 1 of Embodiment 1. As illustrated in FIG. 7, although second luminaire A200 is disposed on ceiling surface Ah1 as with Embodiment 1, first luminaire A100 is disposed on wall surface Ah3. In this case, it is possible to give an impression of first luminaire A100 as a wall window. Second luminaire A200 creates projection area AF2 on wall surface Ah3 different from wall surface Ah3 in which first luminaire A100 is disposed. Here, sunlight is almost horizontal light at sunrise or sunset. In this case, when at least a portion of projection area AF is lower than light diffuser A40 of first luminaire A100, it is possible to reproduce a sunny place at sunrise or sunset in projection area AF2. In other words, a positional relationship between first luminaire A100 and projection area AF2 in this case is that first luminaire A100 is higher than projection area AF2.

As just described, it is possible to increase layout flexibility because first luminaire A100 and second luminaire A200 are disposed on the different surfaces (wall surface Ah3 and ceiling surface Ah1) among the surfaces defining space AH.

[Variation 2]

Moreover, in Embodiment 1, the case is described in which projection area AF is created on only one surface (wall surface Ah3) among the surfaces defining space AH. A projection area, however, may be continuously created on surfaces.

Figure 8:
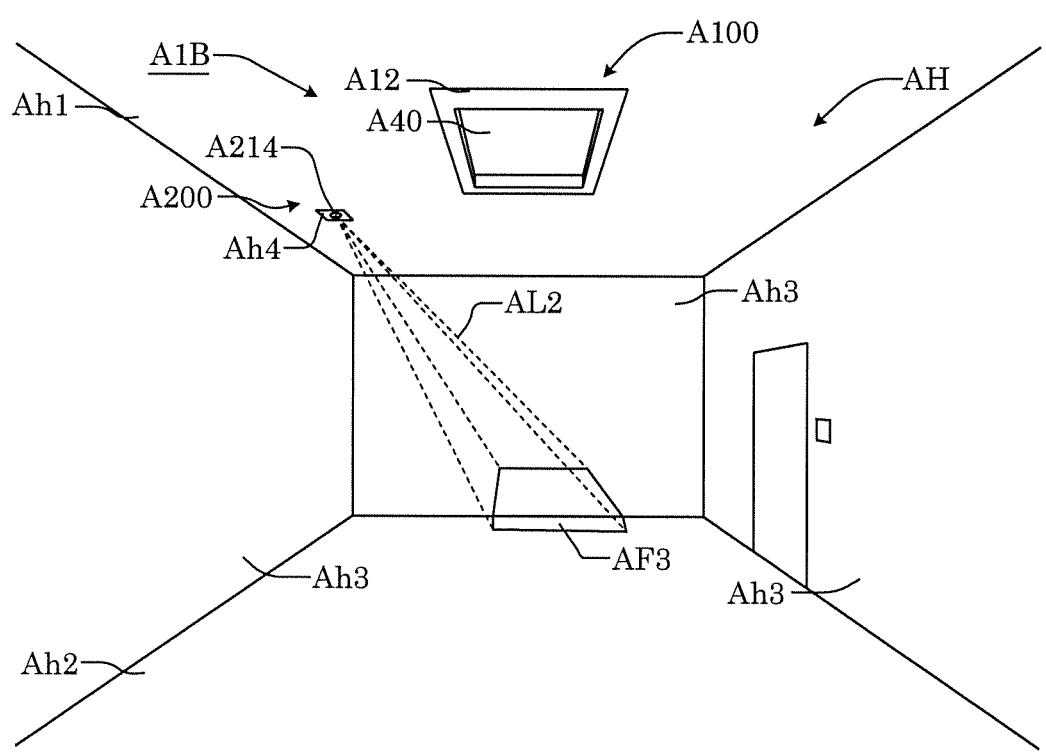
FIG. 8 is a diagram illustrating a schematic configuration of an illumination system according to Variation 2.

FIG. 8 is a diagram illustrating a schematic configuration of illumination system A1B according to Variation 2 of Embodiment 1. As illustrated in FIG. 8, projection area AF3 created by second luminaire A200 of illumination system A1B is continuously on wall surface Ah3 and floor surface Ah2. In order to create such projection area AF3, it is sufficient to adjust the orientation of luminaire body A210 of second luminaire A200, adjust the shape or size of opening A215a of mask A215, or the like.

As just described, projection area AF continuously created on the adjacent surfaces among the surfaces defining space AH makes it possible to produce more various dramatic impacts.

[Variation 3]

Although, in Embodiment 1, the case is described in which first luminaire A100 includes case A10, a first luminaire need not include a case. In this case, structural components (a light-emitting module, a light reflector, a light diffuser, a controller, a power source, etc.) of the first luminaire are directly installed in a ceiling.

Figure 9:
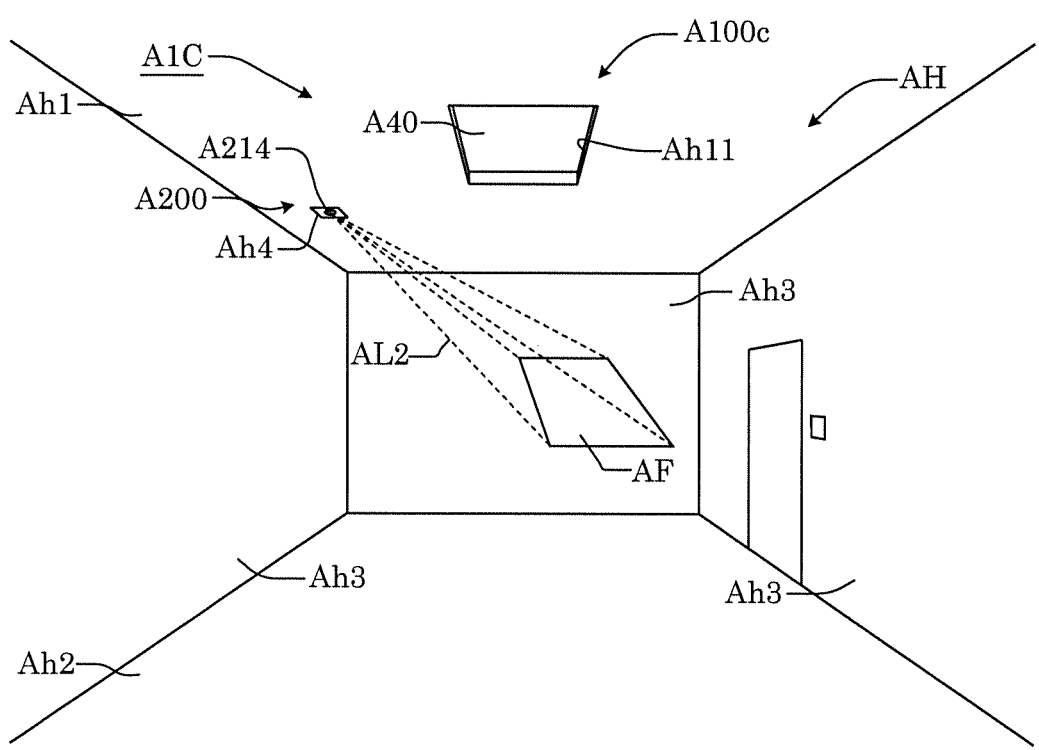
FIG. 9 is a diagram illustrating a schematic configuration of an illumination system according to Variation 3.

FIG. 9 is a diagram illustrating a schematic configuration of illumination system A1C according to Variation 3 of Embodiment 1. As illustrated in FIG. 9, light diffuser A40 is disposed in opening Ah11 in ceiling surface Ah1 and farther back than ceiling surface Ah1 because first luminaire A100c of illumination system A1C does not include a case. In other words, a light emitter may be disposed in opening Ah11 in one surface (ceiling surface Ah1) among the surfaces defining space AH and farther back than the one surface.

With this configuration, even when the case is absent, it is possible to reproduce a more real sky because the light emitter is disposed not flush with ceiling surface Ah1 but farther back than ceiling surface Ah1.

[Variation 4]

Although, in Embodiment 1, the case is described in which first luminaire A100 and second luminaire A200 are disposed at the different locations, a first luminaire and a second luminaire may be disposed at locations in which the first luminaire and the second luminaire overlap with each other. In other words, a projector of the second luminaire may be inside a light emitter of the first luminaire.

Figure 10:
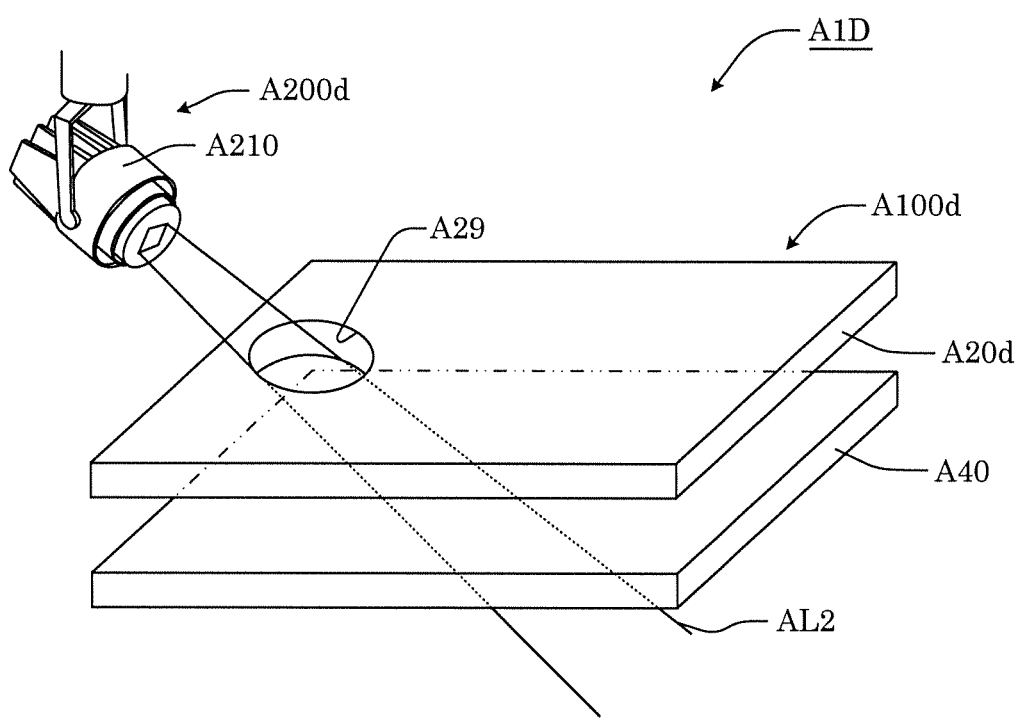
FIG. 10 is a diagram illustrating a schematic configuration of an illumination system according to Variation 4.

FIG. 10 is a diagram illustrating a schematic configuration of illumination system A1D according to Variation 4 of Embodiment 1. As illustrated in FIG. 10, in Variation 4, entire luminaire body A210 of second luminaire A200d is disposed more inwardly than light diffuser A40d (a light emitter) of first luminaire A100d. Light-emitting module A20d has through hole A29 through which second illumination light AL2 of second luminaire A200d passes. It should be noted that, when second luminaire A200d is outside of a case of first luminaire A100d, a through hole through which second illumination light AL2 passes may be provided to the case.

As just described above, disposing the projector of second luminaire A200 inside light diffuser A40d of first luminaire A100d causes light diffuser A40d to have luminance lower than luminance of the projector.

[Other Variations of Embodiment 1]

Although illumination system A1 according to Embodiment 1 has been described above, the present disclosure is not limited to Embodiment 1.

For example, although, in Embodiment 1, the case is described in which the luminance and the color temperature of second illumination light AL2 are held constant, it is possible that like first luminaire A100, second luminaire A200 controls dimming and toning of second illumination light AL2. In this case, second luminaire A200 may control the dimming and toning of second illumination light AL2 in conjunction with dimming and toning by first luminaire A100. When second luminaire A200 controls the dimming and toning of second illumination light AL2, as long as second illumination light AL2 satisfies the above-described conditions (the luminance condition and the color temperature condition), it is possible to reproduce a virtual sky and sunlight without causing a sense of discomfort. Moreover, first luminaire A100 may control dimming and toning of the first illumination light so that the first illumination light satisfies the conditions.

The second luminaire may be a luminaire other than a spotlight as long as the luminaire is of a projection type. Examples of the luminaire other than the spotlight include a projector device and a short-focus projector device. It should be noted that examples of the projector device include an image projector device and an illumination projector device.

Furthermore, the light diffuser may be disposed in a recess formed in one of surfaces defining the same place.

Moreover, the illumination system includes: the first luminaire that is of an internal lighting type and includes the light diffuser that emits first illumination light having a color simulating a sky; and the second luminaire that is of a projection type and includes the lens that projects, on an object, the second illumination light having a color simulating sunlight. The first luminaire and second luminaire emit the first illumination light and the second illumination light, respectively, into a same space in which the object is disposed. The first luminaire is disposed, in the space, at a location higher than the projection area on the object created by the second illumination light.

(Embodiment 2)

Conventionally, illumination systems capable of reproducing illumination by sunlight are known (e.g., see Japanese Unexamined Patent Application Publication (Translation of PCT Application) No. 2016-514340). The illumination system gives a user an impression that light diffused by a diffusing panel, which is part of the illumination system, looks like sunlight, by causing the user to perceive that infinite space is present beyond the diffusing panel.

In recent years, however, it is desired to reproduce various environments with illumination light.

In view of this, Embodiment 2 has an object to provide an illumination system and an illumination control method that are capable of reproducing various environments with illumination light.

[Illumination System]

The following describes illumination system B1 according to Embodiment 2 of the present disclosure.

Figure 11:
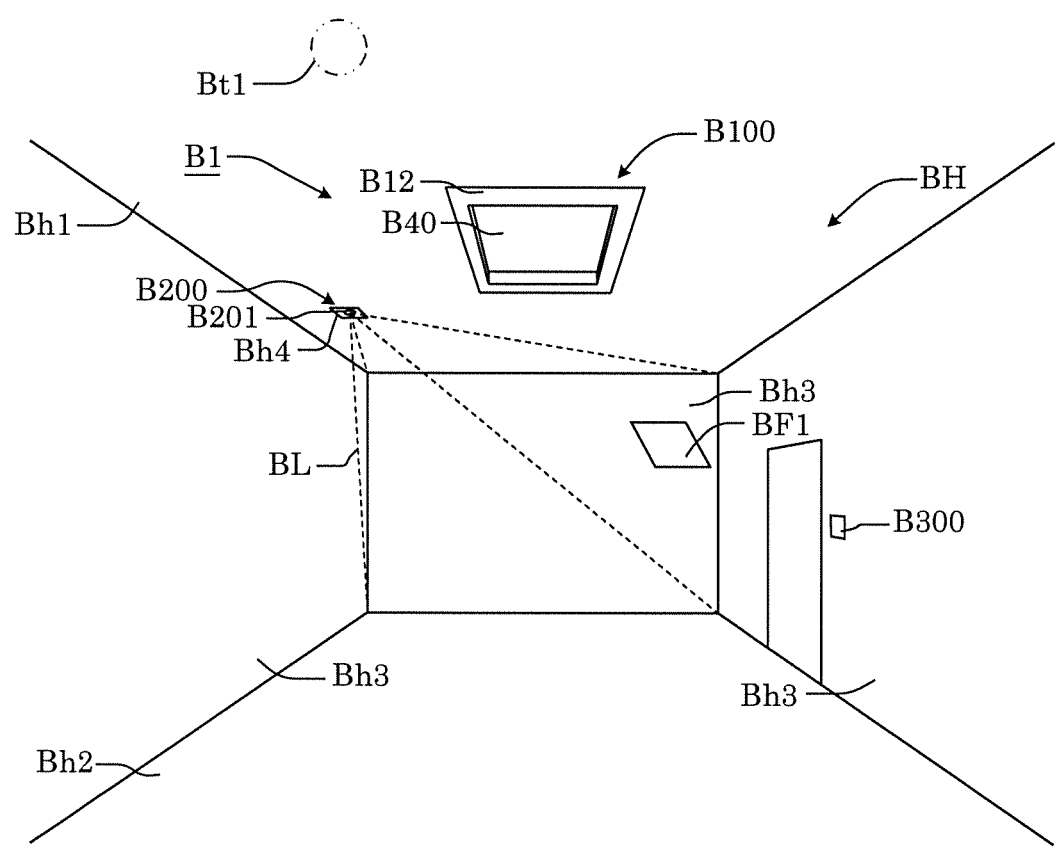
FIG. 11 is a diagram illustrating a schematic configuration of an illumination system according to Embodiment 2.

FIG. 11 is a diagram illustrating a schematic configuration of illumination system B1 according to Embodiment 2. As illustrated in FIG. 11, illumination system B1 includes: first luminaire B100 that is of an internal lighting type; and second luminaire B200 that is of a projection type, and these luminaires are disposed in, for example, same space BH defined by a room in a building. Here, space BH is a space closed to a certain degree, and is defined by, for example, a corridor, a staircase, a bathroom, a kitchen, a toilet, an entrance, and a hall other than a room. Illumination system B1 is suitable for being disposed in, for example, space BH having no windows because illumination system B1 is capable of reproducing virtual sunlight. It should be noted that luminaires (first luminaire A100 and second luminaire A200) can be also referred to as illumination apparatuses.

Space BH is created by ceiling surface Bh1, floor surface Bh2, and wall surfaces Bh3. In Embodiment 2, a case is described in which first luminaire B100 and second luminaire B200 are disposed on ceiling surface Bh1.

[First Luminaire]

Figure 12:
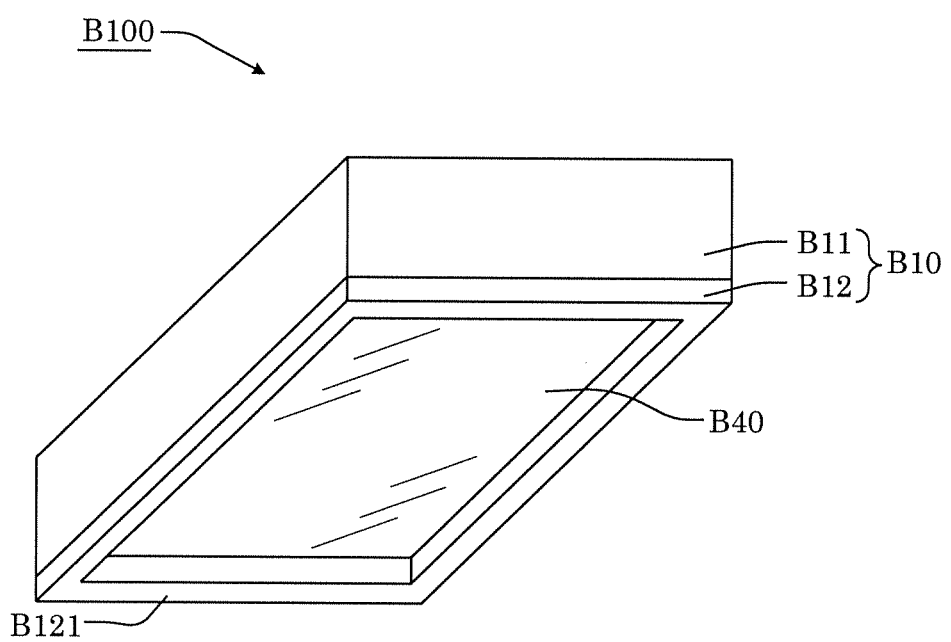
FIG. 12 is a perspective view illustrating a first luminaire according to Embodiment 2.
Figure 13:
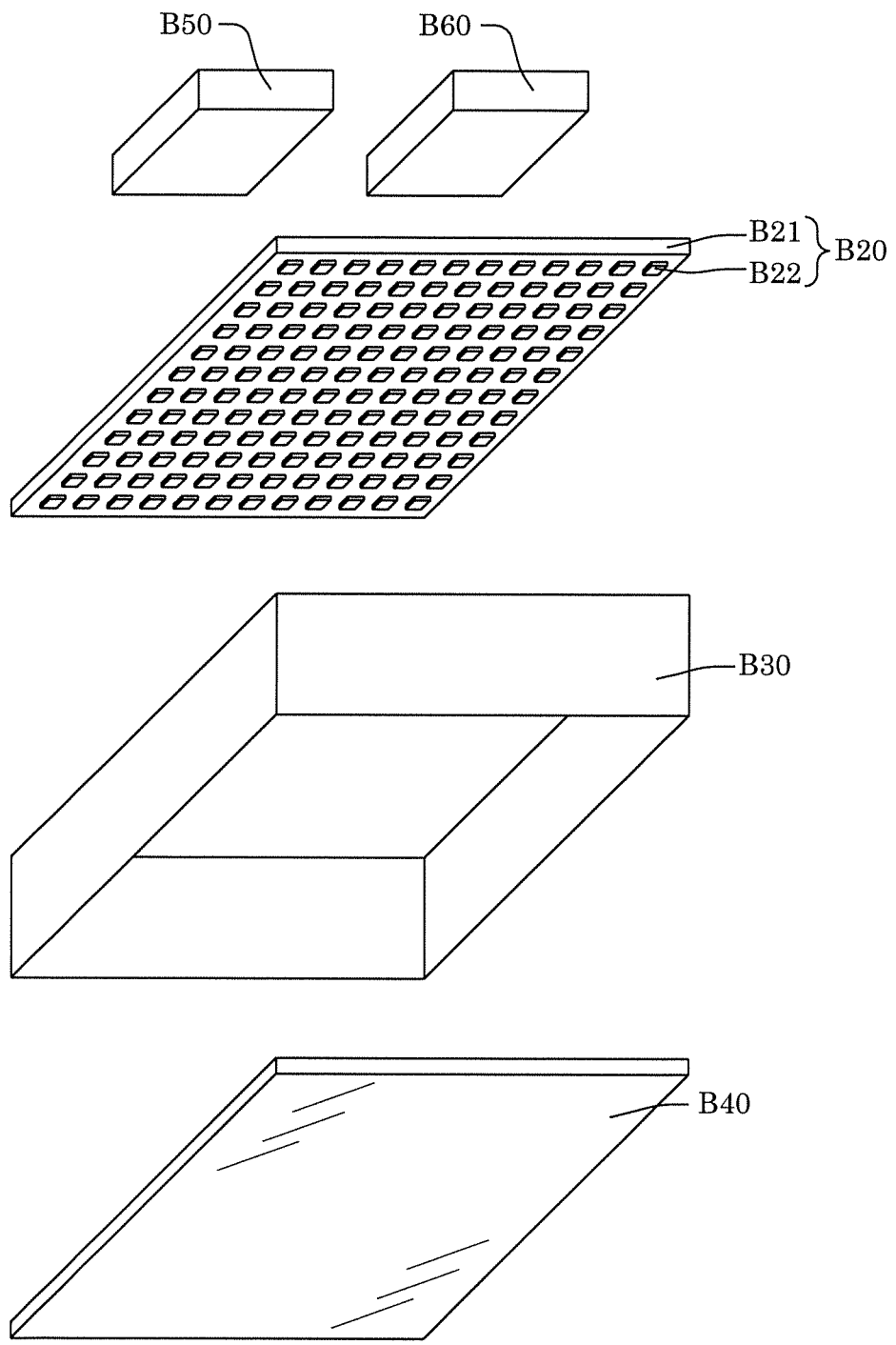
FIG. 13 is an exploded perspective view illustrating parts of the first luminaire according to Embodiment 2.

Next, the following describes first luminaire B100. FIG. 12 is a perspective view illustrating first luminaire B100 according to Embodiment 2. FIG. 13 is a perspective view illustrating parts of first luminaire B100 according to Embodiment 2.

It should be noted that except for a difference between controller A50 and controller B50, first luminaire B100 can be configured in the same manner as first luminaire A100 described in Embodiment 1.

As illustrated in FIG. 12 and FIG. 13, first luminaire B100 includes case B10, light-emitting module B20, light reflector B30, light diffuser B40, controller B50, and power source B60.

Case B10 is a box-like case body that houses light-emitting module B20, light reflector B30, light diffuser B40, controller B50, and power source B60.

Case B10 includes housing portion B11 and frame portion B12.

Housing portion B11 is a housing body that houses light-emitting module B20, light reflector B30, light diffuser B40, controller B50, and power source B60. It should be noted that house controller B50 and power source B60 need not be housed in housing portion B11, and may be disposed, for example, outside of case B10. Housing portion B11 has an opening in a bottom surface on a side facing floor surface Bh2, and houses light diffuser B40 to cover the opening.

Frame portion B12 is a frame-like member having a substantially rectangular shape in a plan view, and is disposed in an edge portion of the bottom surface of housing portion B11. Light diffuser B40 is framed and held by frame portion B12. In consequence, light diffuser B40 is exposed from the opening of frame portion B12. Moreover, frame portion B12 is recessed in a ceiling so that surface B121 opposite to housing portion B11 in frame portion B12 is flush with ceiling surface Bh1. For this reason, light diffuser B40 is disposed farther back than surface B121 of frame portion B12.

Light-emitting module B20 is a light source for emitting first illumination light having a color simulating a sky. As illustrated in FIG. 13, light-emitting module B20 is fixed to an end portion of light reflector B30 opposite to light diffuser B40. Light-emitting module B20 includes board B21 and first light sources B22 mounted on board B21.

Board B21 is a printed circuit board for mounting first light sources B22 and is formed in a substantially rectangular shape.

First light sources B22 are, for example, light-emitting elements such as light-emitting diodes (LEDs). In Embodiment 2, first light sources B22 are RGB-type LEDs that emit blue light, green light, and red light. First light sources B22 are disposed on a surface of board B21 on a side facing floor surface Bh2. For example, first light sources are disposed in a matrix on the surface of board B21 on the side facing floor surface Bh2. It should be noted that the LEDs may be surface-mount device (SMD) LEDs or chip-on-board (COB) LEDs.

In Embodiment 2, since first light sources B22 are the RGB-type LEDs, first light sources B22 are capable of emitting light having various colors, by adjusting luminance of blue light, green light, and red light.

Light reflector B30 is an optical member that is disposed to surround first light sources B22 and has reflectivity for light emitted by first light sources B22. In other words, light reflector B30 reflects light emitted by first light sources B22 and entering light reflector B30. In Embodiment 2, light reflector B30 is a frame-like member surrounding first light sources B22, and reflects light with an inner surface thereof.

Light reflector B30 is produced by performing, for example, a diffusion treatment on a reflecting plate made of a metal material such as aluminum (Al) and having a mirror surface. Examples of the diffusion treatment include a frosting treatment such as an anodizing treatment. It should be noted that the diffusion treatment may be performed on at least the inner surface of light reflector B30.

Light diffuser B40 has translucency and diffusibility for light emitted from light-emitting module B20. Light diffuser B40 is produced by performing, for example, diffusion processing on a resin material such as transparent acryl or polyethylene terephthalate (PET) or on a transparent plate made of glass. Light diffuser B40 is a rectangular plate in a plan view. Light diffuser B40 is fixed to an end portion of light reflector B30 opposite to light-emitting module B20. In other words, light diffuser B40 is opposite to light-emitting module B20 and is disposed to cover light-emitting module B20. As a result, light emitted from light-emitting module B20 and light reflected by light reflector B30 are diffused and emitted outward by light diffuser B40. In this case, light emitted by respective first light sources B22 of light-emitting module B20 is diffused by light diffuser B40, and becomes mixed together without causing granular appearance thereof. This allows light diffuser B40 to emit, for example, the first illumination light having the color simulating the sky such as a blue sky, a cloudy sky, and an evening sky without causing a sense of discomfort. In other words, light diffuser B40 is a light emitter that emits the first illumination light having the color simulating the sky. Light diffuser B40, the light emitter, represents a color simulating a virtual sky over a whole area. By observing light diffuser B40, a user receives an impression as if the user were looking at a sky from there.

Controller B50 is a control circuit that controls operations of light-emitting module B20 such as lighting up, turning off, dimming, and toning (adjustment of a color of emitted light or a color temperature). For example, controller B50 obtains information about a display image stored in a storage (not shown), and causes light-emitting module B20 to reproduce the display image according to the information. Specifically, when displaying a blue sky, controller B50 obtains information about the blue sky from the storage, and controls light-emitting module B20 based on the information obtained.

Moreover, controller B50 can be configured to further have the following function in addition to the function of controller A50. Controller B50 is capable of reproducing cloud in the sky by controlling a distribution of a color and luminance expressed by light-emitting module B20. It should be noted that controller B50 and light-emitting module B20 (first light sources B22) are electrically connected via a signal line.

In Embodiment 2, first light sources B22 are the RGB-type LEDs. For this reason, controller B50 outputs a control signal to first light sources B22 via the signal line, the control signal including information about luminance of each of blue LEDs, green LEDs, and red LEDs. First light sources B22 receiving the control signal emit blue light, green light, and red light based on the control signal.

Controller B50 is implemented by, for example, a microcomputer, a processor, or a dedicated circuit.

In Embodiment 2, controller B50 is disposed on a surface of light-emitting module B20 opposite to light diffuser B40.

Power source B60 is, for example, a power converter circuit that converts AC power supplied from a power system such as a commercial power source, into DC power. Power source B60 includes a power circuit that generates power for causing first light sources B22 of light-emitting module B20 to emit light. For example, power source B60 converts AC power supplied from a commercial power source into DC power having a predetermined level, by rectifying, smoothing, stepping down, etc. the AC power, and supplies the DC power to light-emitting module B20. Power source B60 is electrically connected to the power system via, for example, a power line.

[Second Luminaire]

Next, the following describes second luminaire B200.

Second luminaire B200 is a luminaire that projects, on an object, second illumination light having a color simulating sunlight to create a sunny portion on the object. Specifically, as illustrated in FIG. 11, second luminaire B200 creates sunny portion BF1 by projecting the second illumination light having the color simulating the sunlight, on, as the object, wall surface Bh3 among the surfaces defining space BH. Sunny portion BF1 can be also referred to as a projection area. When light diffuser B40 of first luminaire B100 is assumed to be a window, sunny portion BF1 virtually represents a sunny place created on wall surface Bh3 by sunlight passing this window. It should be noted that in FIG. 11, a chain double-dashed line indicates the position of sun Bt1 creating the sunny place. Sunny portion BF1 is created on an extension of sun Bt1 and the window.

Second luminaire B200 can be configured in the same manner as second luminaire A200.

In other words, first luminaire B100 virtually reproduces a sky, and second luminaire B200 virtually reproduces a sunny place and sunlight entering from the sky virtually reproduced by first luminaire B100.

Examples of second luminaire B200 include a projector and a short-focus projector. It should be noted that examples of the projector include an image projector and an illumination projector.

As illustrated in FIG. 11, second luminaire B200 includes projector lens B201 that emits projection light BL. Second luminaire B200 is installed in the ceiling so that projector lens B201 is exposed from installation opening Bh4 provided in ceiling surface Bh1. A projection range of projection light BL is set to overlap with entire one wall surface Bh3. Second luminaire B200 reproduces sunny portion BF1 by projecting an image on wall surface Bh3 using projection light BL. In other words, out of projection light BL, light reproducing sunny portion BF1 is the second illumination light having the color simulating the sunlight. Out of projection light BL, light other than the second illumination light reproduces a background. The light reproducing the background is darker than at least the second illumination light. In addition, it is desirable that the light reproducing the background be made bright to such a degree that the light does not cause discomfort to a color, pattern, etc. of wall surface Bh3.

Second luminaire B200 is capable of changing a position, shape, and color of sunny portion BF1 by controlling an image projected on wall surface Bh3.

It should be noted that the projection range of projection light BL of second luminaire B200 may cover the surfaces (ceiling surface Bh1, floor surface Bh2, wall surfaces Bh3) defining space BH. In this case, it is possible to create sunny portion BF1 covering the surfaces.

[Control Configuration]

Figure 14:
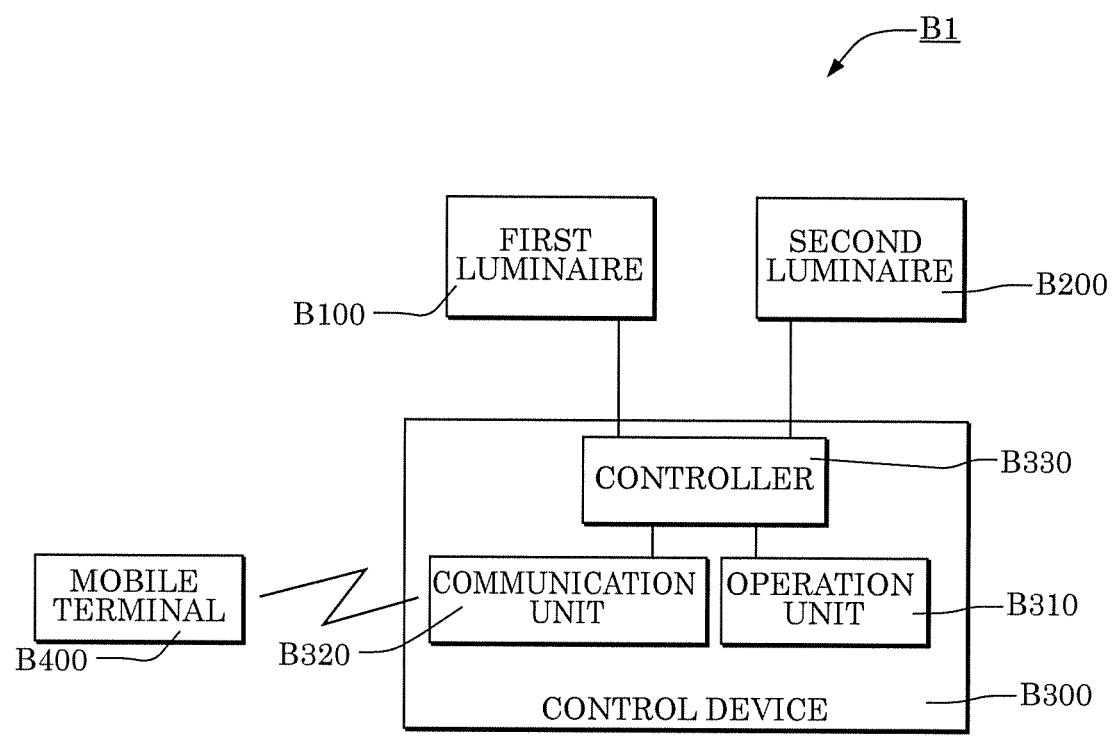
FIG. 14 is a block diagram illustrating a control configuration of the illumination system according to Embodiment 2.

Next, the following describes a control configuration of illumination system B1. FIG. 14 is a block diagram illustrating a control configuration of illumination system B1 according to Embodiment 2. As illustrated in FIG. 14, illumination system B1 includes control device B300 that centrally controls first luminaire B100 and second luminaire B200. Control device B300 includes operation unit B310, communication unit B320, and controller B330. Control device B300 is, for example, a control panel attached to wall surface Bh3 as illustrated in FIG. 11.

Operation unit B310 includes a touch panel, manual operation buttons, etc., and receives various instructions from a user. Examples of the various instructions include a power on/off instruction for first luminaire B100 and second luminaire B200.

Communication unit B320 includes an antenna, a wireless module, etc., and communicates with the Internet, an external device, etc. Specifically, communication unit B320 is, for example, an obtaining unit that wirelessly communicates with mobile terminal B400 owned by the user and obtains an environment reproduction condition created by mobile terminal B400. The environment reproduction condition is a condition for reproducing a certain environment in space BH, and is used in determining a color temperature, luminance, etc. of light (the first illumination light and the second illumination light) emitted by luminaires B100 and B200.

Controller B330 includes a central processing unit (CPU), a memory, etc., and controls first luminaire B100 and second luminaire B200 based on the various instructions received by operation unit B310 and the environment reproduction condition obtained by communication unit B320. Accordingly, the first illumination light emitted by first luminaire B100 and the second illumination light projected by second luminaire B200 are each caused to be light according to the environment reproduction condition. This illumination control method will be described later.

[Mobile Terminal]

Mobile terminal B400 may be a terminal that is carried and operable by the user. Mobile terminal B400 may be, for example, a dedicated device for setting environment reproduction condition or an information terminal such as a smartphone, a mobile phone, a tablet device, and a laptop computer. When mobile terminal B400 is an information terminal, mobile terminal B400 executes an application for setting environment reproduction condition. When the user specifies a user's desired environment according to this application, mobile terminal B400 creates an environment reproduction condition corresponding to the specified environment and outputs the environment reproduction condition to communication unit B320. Specifically, mobile terminal B400 allows selection between a present position mode and a specification mode when an environment reproduction condition is created.

Figure 15:
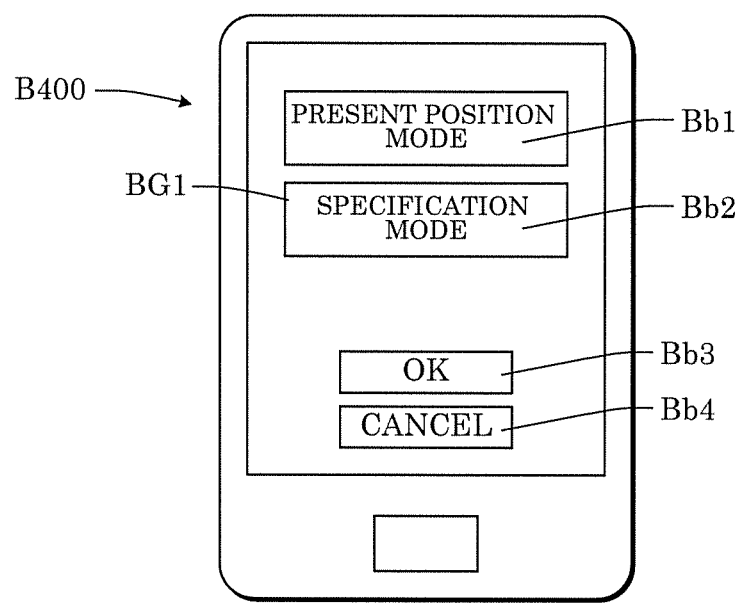
FIG. 15 is a schematic diagram illustrating a display screen when an application for setting environment reproduction condition is executed by a smartphone that is an exemplary mobile terminal according to Embodiment 2.

FIG. 15 is a schematic diagram illustrating a display screen when an application for setting environment reproduction condition is executed by a smartphone that is an example of mobile terminal B400 according to Embodiment 2. As illustrated in FIG. 15, display screen BG1 of mobile terminal B400 displays selection buttons Bb1 and Bb2, OK button Bb3, and cancel button Bb4. Out of selection buttons Bb1 and Bb2, selection button Bb1 is for selecting the present position mode, and selection button Bb2 is for selecting the specification mode. When the user touches one of selection buttons Bb1 and Bb2 and subsequently touches OK button Bb3, mobile terminal B400 executes the mode corresponding to the touched one of selection buttons Bb1 and Bb2. It should be noted that when the user touches one of selection buttons Bb1 and Bb2 and subsequently touches cancel button Bb4, mobile terminal B400 cancels the selection operation.

[Present Position Mode]

The present position mode is a mode in which a first environment reproduction condition is created based on a present position of illumination system B1. In the present position mode, mobile terminal B400 creates the first environment reproduction condition based on reference information and present position information about the present position of illumination system B1. The present position information includes the latitude and longitude of the present position of illumination system B1, and a date and time and weather at the present position. Mobile terminal B400 may obtain the present position information from the Internet or the present position information inputted by the user.

Mobile terminal B400 calculates a position (an altitude and azimuth) of sun Bt1 in the present position at the present time, based on the present position information. In addition, mobile terminal B400 calculates a color and brightness of the sky and a color temperature and luminance of sunlight at the present time, based on the position of sun Bt1 and the weather.

The reference information includes a size and position of wall surface Bh3, the object, among the surfaces defining space BH in which illumination system B1 is installed, and a size, shape, and position of light diffuser B40, the light emitter of first luminaire B100. The reference information is registered in mobile terminal B400 in advance before the illumination control method is executed.

Mobile terminal B400 calculates a shape and position of sunny portion BF1 projected on the object, based on the reference information and the position of sun Bt1 at the present time. Specifically, mobile terminal B400 calculates a relative positional relationship between the object and light diffuser B40 based on the size and position of wall surface Bh3, the object, and the size, shape, and position of light diffuser B40. When the relative positional relationship and the position of sun Bt1 at the present time are calculated, assuming that light diffuser B40 is a window, it is possible to calculate a shape and position of an actual sunny place created on the object by the sunlight passing the window. Mobile terminal B400 calculates the shape and position of sunny portion BF1 projected by second luminaire B200, based on the shape and position of the actual sunny place.

The color and brightness of the sky at the present time, the color temperature and luminance of the sunlight at the present time, and the shape and position of sunny portion BF1 thus calculated above constitute the first environment reproduction condition. After creating the first environment reproduction condition, mobile terminal B400 transmits the first environment reproduction condition to communication unit B320 of illumination system B1.

[Specification Mode]

The specification mode is a mode in which a second environment reproduction condition corresponding to an environment specified by the user is created. Here, examples of the environment specified by the user include an area and a date and time. It should be noted that hereinafter, an area specified by the user is referred to as a "specified area," and a date and time specified by the user is referred to as a "specified date and time."

Figure 16:
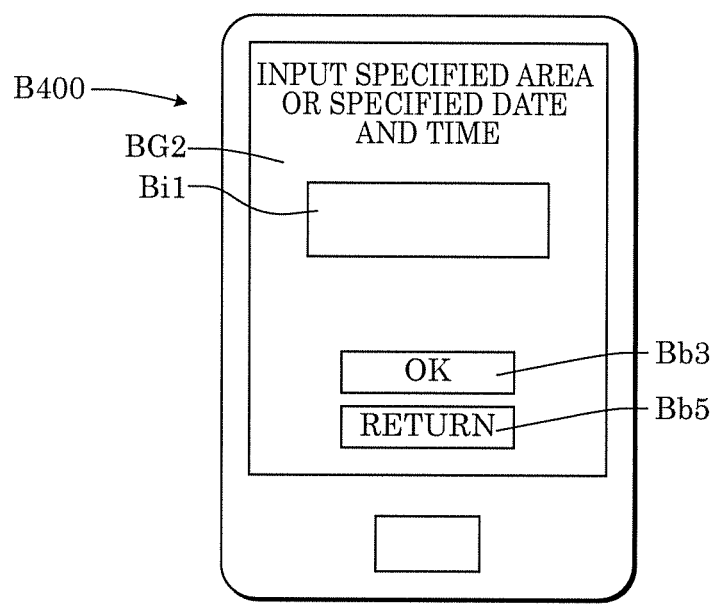
FIG. 16 is a schematic diagram illustrating a display screen when a specified area or a specified date and time is inputted on a smartphone that is an exemplary mobile terminal according to Embodiment 2.

FIG. 16 is a schematic diagram illustrating a display screen when a specified area or a specified date and time is inputted on a smartphone that is an example of mobile terminal B400 according to Embodiment 2. As illustrated in FIG. 16, display screen G2 of mobile terminal B400 displays entry field Bi1, OK button Bb3, and return button Bb5. When the user enters a specified area or a specified date and time in entry field Bi1 and subsequently touches OK button Bb3, mobile terminal B400 executes processing corresponding to the entry. It should be noted that when the user touches return button Bb5, mobile terminal B400 goes back to previous display screen BG1.

First, the following describes processing when a specified area is entered in the specification mode. In this case, a specified date and time is not entered.

Mobile terminal B400 creates the second environment reproduction condition based on position information of the specified area and reference information. The position information of the specified area includes the latitude and longitude of a representative place in the specified area, and a present date and time and weather at the place. Mobile terminal B400 obtains the position information of the specified area from the Internet.

Mobile terminal B400 calculates a position (an altitude and azimuth) of sun Bt1 in the specified area at the present time, based on the position information of the specified area. Moreover, mobile terminal B400 calculates a color and brightness of the sky and a color temperature and luminance of sunlight in the specified area at the present time, based on the position of sun Bt1 and the weather. Furthermore, mobile terminal B400 calculates a shape and position of sunny portion BF1 projected on the object, based on the reference information and the position of sun Bt1 in the specified area at the present time.

The color and brightness of the sky in the specified area at the present time, the color temperature and luminance of the sunlight in the specified area at the present time, and the shape and position of sunny portion BF1 thus calculated above constitute the second environment reproduction condition. After creating the second environment reproduction condition, mobile terminal B400 transmits the second environment reproduction condition to communication unit B320 of illumination system B1.

Next, the following describes processing when a specified date and time is further entered in the specification mode in addition to the specified area.

The specified date and time may be precisely specified using a specific date and time or may be specified on a daily basis, a monthly basis, or a seasonal basis. When a specified date and time is specified on a daily basis, a specified date including a representative time (e.g., noon) of the day is the specified date and time. Moreover, when a specified date and time is specified on a monthly basis or a seasonal basis, a specified month or a representative date and time of a specified season is the specified date and time.

Mobile terminal B400 creates the second environment reproduction condition based on date and time information of the specified date and time, and the reference information. The date and time information of the specified date and time include the latitude and longitude of the present position of illumination system B1, the specified date and time, and weather on the specified date and time. Mobile terminal B400 obtains the date and time information of the specified date and time from the Internet.

Mobile terminal B400 calculates a position (an altitude and azimuth) of sun Bt1 in the present position on the specified date and time, based on the date and time information of the specified date and time. In addition, mobile terminal B400 calculates a color and brightness of the sky and a color temperature and luminance of sunlight in the present position on the specified date and time, based on the position of sun Bt1 and the weather.

Furthermore, mobile terminal B400 calculates a shape and position of sunny portion BF1 projected on the object, based on the reference information and the position of sun Bt1 on the specified date and time.

The color and brightness of the sky on the specified date and time, the color temperature and luminance of the sunlight on the specified data and time, and the shape and position of sunny portion BF1 thus calculated above constitute the second environment reproduction condition. After creating the second environment reproduction condition, mobile terminal B400 transmits the second environment reproduction condition to communication unit B320 of illumination system B1.

It should be noted that the second environment reproduction condition may be created using both of the specified area and the specified date and time.

[Illumination Control Method]

Figure 17:
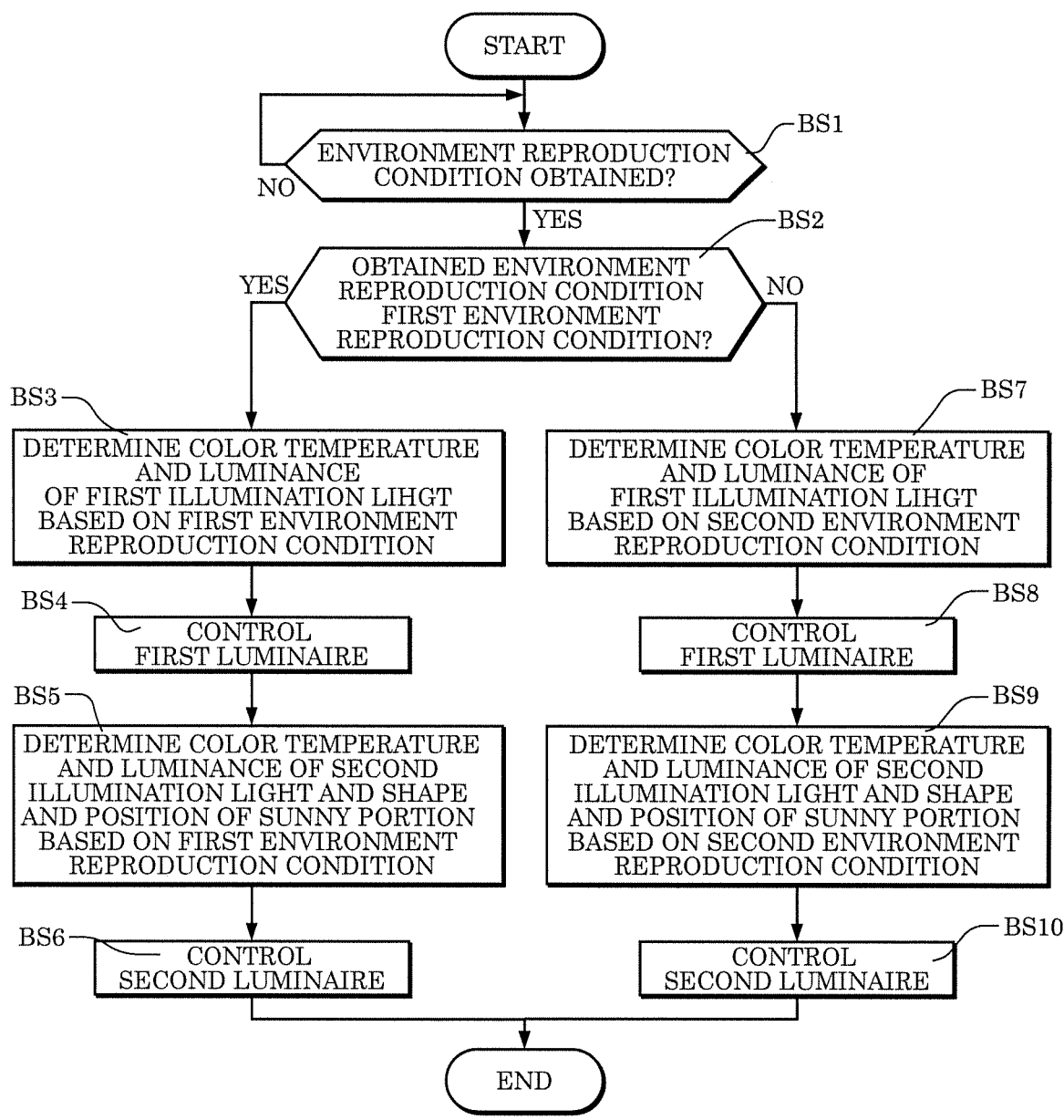
FIG. 17 is a flow chart illustrating a sequence of steps of an illumination control method according to Embodiment 2.

Next, the following describes the illumination control method executed by controller B330. FIG. 17 is a flow chart illustrating a sequence of steps of the illumination control method according to Embodiment 2.

First, in step BS1, controller B330 determines whether communication unit B320 obtained an environment reproduction condition. When determining that communication unit B320 did not obtain the environment reproduction condition (NO in step BS1), controller B330 stands ready as before. When determining that communication unit B320 obtained the environment reproduction condition (YES in step BS1), controller B330 proceeds to step BS2.

In step BS2, controller B330 determines whether the obtained environment reproduction condition is a first environment reproduction condition. When determining that the obtained environment reproduction condition is the first environment reproduction condition (YES in step BS2), controller B330 proceeds to step BS3. When determining that the obtained environment reproduction condition is not the first environment reproduction condition (NO in step BS2), controller 300 determines that the obtained environment reproduction condition is a second environment reproduction condition, and proceeds to step BS7.

In step BS3, controller B330 determines a color temperature and luminance of first illumination light to be emitted by first luminaire B100, based on the first environment reproduction condition. Specifically, controller B330 determines the color temperature and luminance of the first illumination light to be emitted by first luminaire B100, based on a color and brightness of a sky at the present time included in the first environment reproduction condition.

In step BS4, controller B330 controls first luminaire B100 to cause the first illumination light to have the color temperature and luminance determined in step BS3. Accordingly, first luminaire B100 virtually reproduces the sky in the present position at the present time.

In step BS5, controller B330 determines a color temperature and luminance of second illumination light to be emitted by second luminaire B200 and a shape and position of sunny portion BF1 to be created by the second illumination light, based on the first environment reproduction condition. Specifically, controller B330 determines the color temperature and luminance of the second illumination light and the shape and position of sunny portion BF1, based on a color temperature and luminance of sunlight and a shape and position of sunny portion BF1 included in the first environment reproduction condition.

In step BS6, controller B330 controls second luminaire B200 to cause the second illumination light to have the color temperature and luminance determined in step BS5 and create sunny portion BF1 having the shape and position determined in step BS5. In other words, when light diffuser B40 of first luminaire B100 is assumed to be a window, second luminaire B200 virtually reproduces, as sunny portion BF1, a sunny place created on wall surface Bh3 by sunlight at the present time passing the window.

In contrast, in step BS7, controller B330 determines a color temperature and luminance of first illumination light to be emitted by first luminaire B100, based on a second environment reproduction condition. Specifically, controller B330 determines the color temperature and luminance of the first illumination light to be emitted by first luminaire B100, based on a color and brightness of a sky in a specified area or on a specified data and time included in the second environment reproduction condition.

In step BS8, controller B330 controls first luminaire B100 to cause the first illumination light to have the color temperature and luminance determined in step BS7. Accordingly, first luminaire B100 virtually reproduces the sky in the specified area or on the specified date and time.

In step BS9, controller B330 determines a color temperature and luminance of second illumination light to be emitted by second luminaire B200 and a shape and position of sunny portion BF1 to be created by the second illumination light, based on the second environment reproduction condition. Specifically, controller B330 determines the color temperature and luminance of the second illumination light and the shape and position of sunny portion BF1, based on a color temperature and luminance of sunlight and a shape and position of sunny portion BF1 included in the second environment reproduction condition.

In step BS10, controller B330 controls second luminaire B200 to cause the second illumination light to have the color temperature and luminance determined in step BS9 and create sunny portion BF1 having the shape and position determined in step BS9. In other words, when light diffuser B40 of first luminaire B100 is assumed to be a window, second luminaire B200 virtually reproduces, as sunny portion BF1, a sunny place created on wall surface Bh3 by sunlight in the specified area or on the specified date and time passing the window.

(Advantageous Effects Etc.)

As described above, illumination system B1 according to Embodiment 2 includes: first luminaire B100 that emits first illumination light having a color simulating a sky; second luminaire B200 that is disposed in same space BH as first luminaire B100, second luminaire B200 projecting, on an object (wall surface Bh3), second illumination light simulating sunlight to create sunny portion BF1 on the object; and controller B330 that causes first luminaire B100 to emit the first illumination light according to an environment reproduction condition.

Moreover, an illumination control method according to Embodiment 2 is an illumination control method for controlling: first luminaire B100 that emits first illumination light having a color simulating a sky; and second luminaire B200 that is disposed in same space BH as first luminaire B100, second luminaire B200 projecting, on an object, second illumination light simulating sunlight to create sunny portion BF1 on the object. The illumination control method includes: obtaining an environment reproduction condition; and causing first luminaire B100 to emit the first illumination light according to the environment reproduction condition.

The obtaining unit obtains environment reproduction conditions corresponding to various environments. Since first luminaire B100 emits the first illumination light corresponding to the environment reproduction conditions obtained by the obtaining unit, it is possible to reproduce the various environments with the first illumination light. It is also possible to reproduce a real environment in same space BH as a result of a synergistic effect with sunny portion BF1 projected by second luminaire B200.

Moreover, controller B330 controls first luminaire B100 to cause at least one of a color temperature and luminance of the first illumination light to correspond to the environment reproduction condition.

According to this configuration, at least one of the color temperature and luminance of the first illumination light can be caused to correspond to the environment reproduction condition. With this, first luminaire B100 is allowed to reproduce a virtual sky that is more similar to a desired environment.

Moreover, controller B330 causes second luminaire B200 to emit second illumination light according to the environment reproduction condition obtained by the obtaining unit.

In addition, in the illumination control method, second luminaire B200 is caused to emit the second illumination light according to the environment reproduction condition.

According to this configuration, since second luminaire B200 emits the second illumination light corresponding to the environment reproduction condition obtained by the obtaining unit, it is possible to reproduce the various environments with the first illumination light and the second illumination light.

Moreover, controller B330 controls second luminaire B200 to cause at least one of a shape and a position of sunny portion BF1 created by the second illumination light and a color temperature and luminance of the second illumination light to correspond to the environment reproduction condition.

According to this configuration, at least one of the shape and the position of sunny portion BF1 created by the second illumination light and the color temperature and the luminance of the second illumination light can be caused to correspond to the environment reproduction condition. With this, second luminaire B200 is allowed to reproduce sunny portion BF1 that is more similar to a desired environment.

Moreover, the obtaining unit obtains, as the environment reproduction condition, an environment reproduction condition based on a present position of illumination system B1 (first environment reproduction condition), which is created in a present position mode, and an environment reproduction condition specified by a user (second environment reproduction condition), which is created in a specification mode.

According to this configuration, since the obtaining unit obtains, as the environment reproduction condition, the environment reproduction condition based on the present position of illumination system B1 and the environment reproduction condition specified by the user, it is possible to selectively use any of the environment reproduction conditions. In particular, when the environment reproduction condition based on the present position of illumination system B1 is used, first luminaire B100 and second luminaire B200 are capable of reproducing an environment in the present position at the present time. On the other hand, when the environment reproduction condition specified by the user is used, first luminaire B100 and second luminaire B200 are capable of reproducing an environment desired by the user.

Moreover, the obtaining unit obtains the environment reproduction condition based on an area specified by the user in the specification mode.

According to this configuration, since the obtaining unit obtains the environment reproduction condition based on the area specified by the user in the specification mode, first luminaire B100 and second luminaire B200 are capable of reproducing an environment of the specified area desired by the user.

Moreover, the obtaining unit obtains the environment reproduction condition based on a date and time specified by the user in the specification mode.

According to this configuration, since the obtaining unit obtains the environment reproduction condition based on the date and time specified by the user in the specification mode, first luminaire B100 and second luminaire B200 are capable of reproducing an environment on the specified date and time desired by the user.

(Variation 5)

Embodiment 2 illustrates the case in which the environment reproduced by illumination system B1 is constant. Illumination system B1, however, is also capable of causing a reproduced environment to change over time. Variation 5 of Embodiment 2 illustrates a case in which an environment in space BH is caused to change over time by controlling first luminaire B100 and second luminaire B200 over time. It should be noted that hereinafter, descriptions of elements that are identical to those in Embodiment 2 may be omitted.

Here, examples of a method for controlling first luminaire B100 and second luminaire B200 over time include a first method and a second method. In the first method, mobile terminal B400 creates, for each timing of switching, an environment reproduction condition corresponding to the timing, and transmits the environment reproduction condition to communication unit B320 of control device B300. The timing of switching is timing of switching manners of controlling first luminaire B100 and second luminaire B200. In other words, the timing of switching is timing with which a reproduced environment is switched. In this case, controller B330 controls first luminaire B100 and second luminaire B200 each time communication unit B320 obtains environment reproduction information. Accordingly, it is possible to cause an environment in space BH to change over time.

Moreover, in the second method, mobile terminal B400 creates a time table including temporal changes of an environment reproduction condition, and transmits the time table to communication unit B320. In this case, controller B330 controls first luminaire B100 and second luminaire B200 based on the time table obtained by communication unit B320. Accordingly, it is possible to cause an environment in space BH to change over time.

Figure 18:
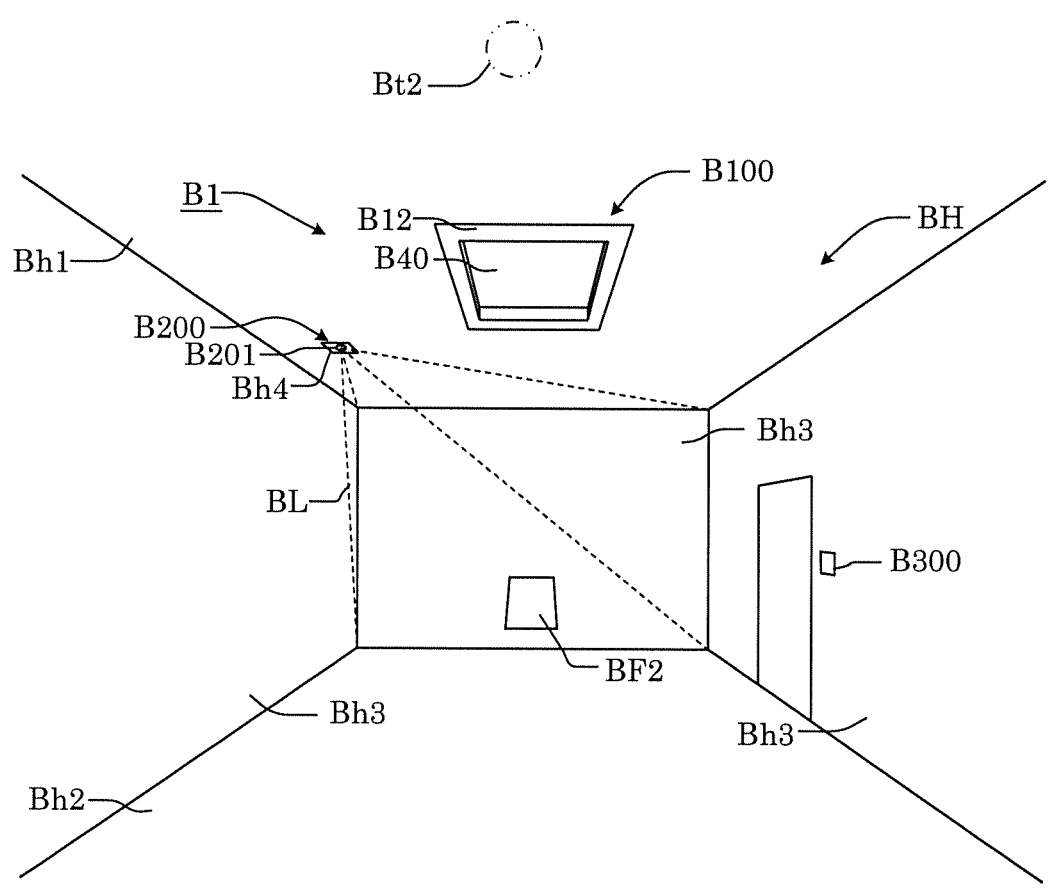
FIG. 18 is a schematic diagram illustrating an example when an environment in a space according to Variation 5 is caused to change over time.
Figure 19:
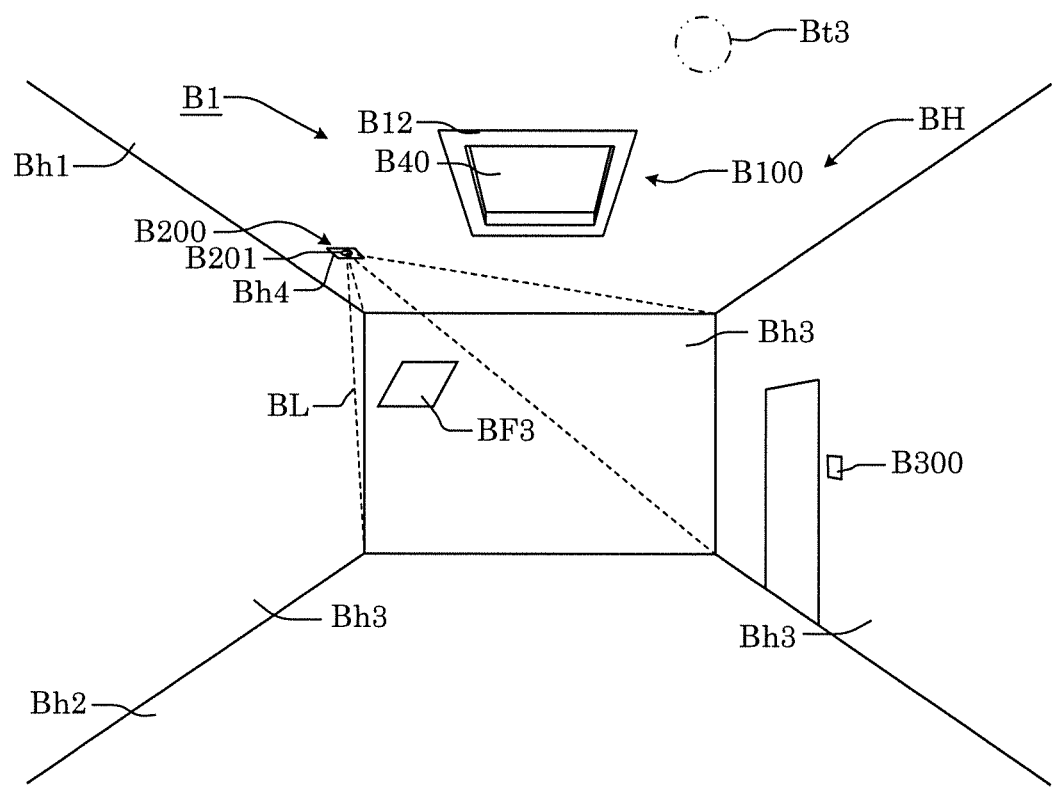
FIG. 19 is a schematic diagram illustrating an example when an environment in a space according to Variation 5 is caused to change over time.

FIG. 18 and FIG. 19 each are a schematic diagram illustrating an example when an environment in space BH according to Variation 5 is caused to change over time, and correspond to FIG. 11.

For example, it is assumed that sun Bt1 in FIG. 11, sun Bt2 in FIG. 18, and sun Bt3 in FIG. 19 are in the southeast, the south, and the southwest, respectively. In FIG. 11, a sunny place created by sun Bt1 in the southeast is reproduced using sunny portion BF1 projected by second luminaire B200. Moreover, the light emitter (light diffuser B40) of first luminaire B100 reproduces a color and brightness of a sky at that time. In FIG. 18, a time has passed since the state in FIG. 11, and a sunny place created by sun Bt2 in the south is reproduced using sunny portion F2 projected by second luminaire B200. Moreover, the light emitter of first luminaire B100 reproduces a color and brightness of a sky at that time. In FIG. 19, a time has passed since the state in FIG. 18, and a sunny place created by sun Bt3 in the southwest is reproduced using sunny portion F3 projected by second luminaire B200. Moreover, the light emitter of first luminaire B100 reproduces a color and brightness of a sky at that time.

As described above, it is possible to reproduce the changes of the environment in space BH due to the movement of suns Bt1, Bt2, and Bt3, by controller B330 controlling first luminaire B100 and second luminaire B200 over time.

It should be noted that a time between timings of switching may be set in such a manner that does not cause discomfort in changes of an environment. For example, if the state in FIG. 11 is suddenly changed to the state in FIG.

18, the user is to feel discomfort with the amount of change. For this reason, an amount of change decreases with a decrease in time between timings of switching, and it is possible to achieve an environment change without discomfort.

(Other Variations of Embodiment 2)

Although illumination system B1 and the illumination control method according to Embodiment 2 have been described above, the present disclosure is not limited to Embodiment 2.

For example, Embodiment 2 illustrates the case in which the environment reproduction condition is created by mobile terminal B400 and transmitted to communication unit B320 of control device B300. However, an environment reproduction condition may be created by a device other than mobile terminal B400. For example, controller B330 may obtain an environment reproduction condition by creating the environment reproduction condition. In this case, controller B330 serves as an obtaining unit. Moreover, controller B330 may input a necessary condition to a server device (e.g., a cloud server) that is external and communicable with communication unit B320 of controller B330, and the server device may create an environment reproduction condition.

When an environment reproduction condition is created by a device other than mobile terminal B400, as described in Variation 5, it is possible to control first luminaire B100 and second luminaire B200 over time. Assuming that the device other than mobile terminal B400 is controller B330, in the first method, controller B330 creates, for each timing of switching, an environment reproduction condition corresponding to the timing, and controls first luminaire B100 and second luminaire B200 each time controller B330 creates the environment reproduction condition. In addition, in the second method, controller B330 creates a time table including temporal changes of an environment reproduction condition, and controls first luminaire B100 and second luminaire B200 based on the time table.

Moreover, regarding the first environment reproduction condition based on the present position of illumination system B1, for example, a color and brightness of a sky, a position of the sun, and a color temperature and luminance of sunlight at the present time may be calculated from an image of an area around the present position obtained by a live camera or mobile terminal B400 etc.

Moreover, second luminaire B200 may be a luminaire other than a projector as long as the luminaire is of a projection type. Examples of the luminaire other than the projector include a spotlight. When the spotlight is used as second luminaire B200, an adjustable orientation of the body of the spotlight makes the position of a sunny portion created by the spotlight self-adjustable.

Moreover, when a mask is disposed in front of the spotlight in a light emission direction, the shape of a sunny portion is reproduced by an opening of the mask. In other words, by mounting self-switchable masks having different opening shapes to the spotlight and switching one of the masks in front of the spotlight to a different one of the masks, it is possible to change the shape of the sunny portion created by the spotlight.

Moreover, although Embodiment 2 illustrates the case in which a set of first luminaire B100 and second luminaire B200 is disposed in same space BH, sets of first luminaires B100 and second luminaires B200 may be disposed in same space BH. In this case, single control device B300 may control the sets of first luminaires B100 and second luminaires B200, or control device B300 may be provided for each of the sets. In either case, it is assumed that the sets of first luminaires B100 and second luminaires B200 are controlled based on the same environment reproduction condition. Accordingly, since the sets of first luminaires B100 and second luminaires B200 reproduce the same environment, it is possible to further enhance a sense of reality. Furthermore, when first luminaires B100 are assumed to be windows and sunny portions created by second illumination light emitted by second luminaires B200 are assumed to be sunny places, it is also possible to further enhance a sense of reality by disposing the sets of first luminaires B100 and second luminaires B200 to cause positional relationships between the windows and the sunny portions to be substantially parallel.

Moreover, the controller may control the first luminaire to cause a color temperature of the first illumination light to correspond to a color temperature specified by or determined from the environment reproduction condition.

Furthermore, the controller may control the first luminaire to cause luminance of the first illumination light to correspond to luminance specified by or determined from the environment reproduction condition.

Moreover, the controller may control the first luminaire to cause a color temperature and luminance of the first illumination light to correspond to a color temperature and luminance specified by or determined from the environment reproduction condition.

Furthermore, the environment reproduction condition may change over time.

Moreover, the environment reproduction condition may be renewed according to time.

Furthermore, the environment reproduction condition may be a present environment reproduction condition based on a present position and a date and time of the illumination system.

Moreover, the environment reproduction condition may be a specified area environment reproduction condition specified by a user.

Furthermore, the controller may control the first luminaire to cause the first luminaire to emit the first illumination light according to a first environment reproduction condition.

Moreover, the controller may control the second luminaire to cause the second luminaire to emit the second illumination light according to a second environment reproduction condition.

(Embodiment 3)

Conventionally, an illumination apparatus is disclosed which includes a light source that emits light and a light guide plate having a flat exit surface through which the light from the light source exits (see Japanese Unexamined Patent Application Publication No. 2016-12540, for example). This illumination apparatus has minute projections and recesses in the exit surface of the light guide plate. Even when the light is yellowish, the projections and recesses cause the light to scatter and complement blue light, so that the exiting light achieves color uniformity.

With such an illumination apparatus, the exiting light achieves color uniformity by light scattering. However, when, for example, an image that changes with time like the sky is projected on the illumination apparatus, a person near the illumination apparatus may feel strange depending on the projection condition.

In view of the above, Embodiment 3 has an object to provide an illumination apparatus and related technologies capable of reducing a feeling of strangeness generated when projecting a changing image.

Hereinafter, an illumination apparatus according to Embodiment 3 will be described with reference to the drawings. The illumination apparatus according to Embodiment 3 provides a user with a realistic feeling of looking at the sky through a window from indoors. For example, the illumination apparatus is installed indoors, and artificially produces light that looks like the natural sky (a blue sky or sunset, for example) seen through a window indoors (hereinafter, such light is referred to as artificial outdoor light).

When an image that changes like the sky is projected on the illumination apparatus, a user near the illumination apparatus may feel strange if the brightness or color of the image changes drastically. Thus, the illumination apparatus according to Embodiment 3 has a configuration that reduces the user's feeling of strangeness generated when a changing image is projected, by keeping the change in the brightness or color within a predetermined limit range, for example.

[Configuration of Illumination Apparatus]

Figure 20:
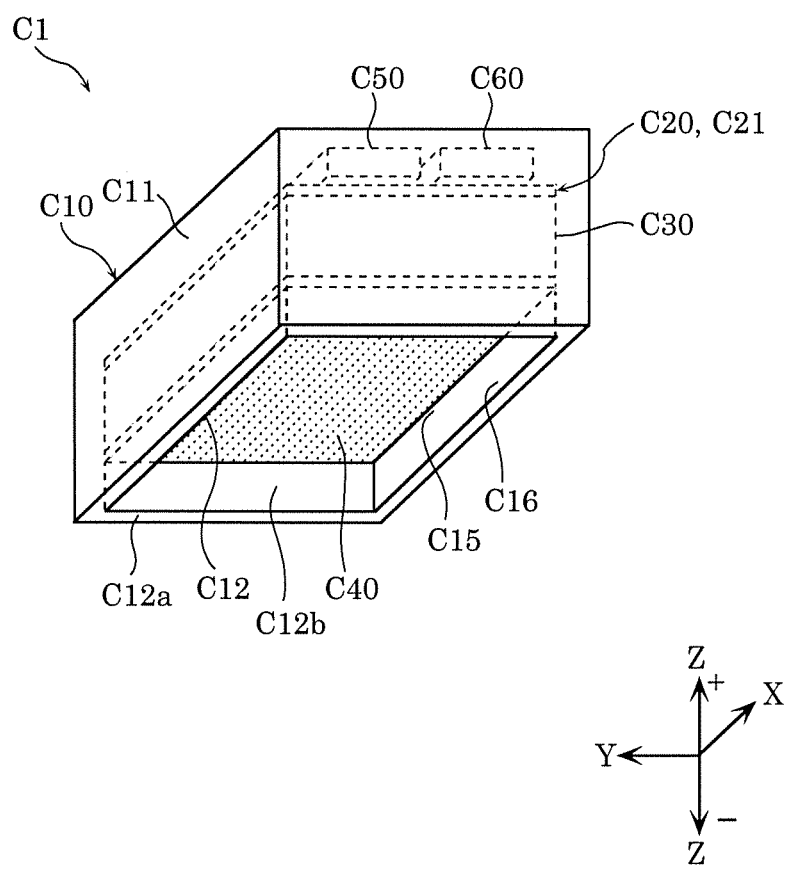
FIG. 20 is a perspective view illustrating an exterior appearance of an illumination apparatus according to Embodiment 3.
Figure 21:
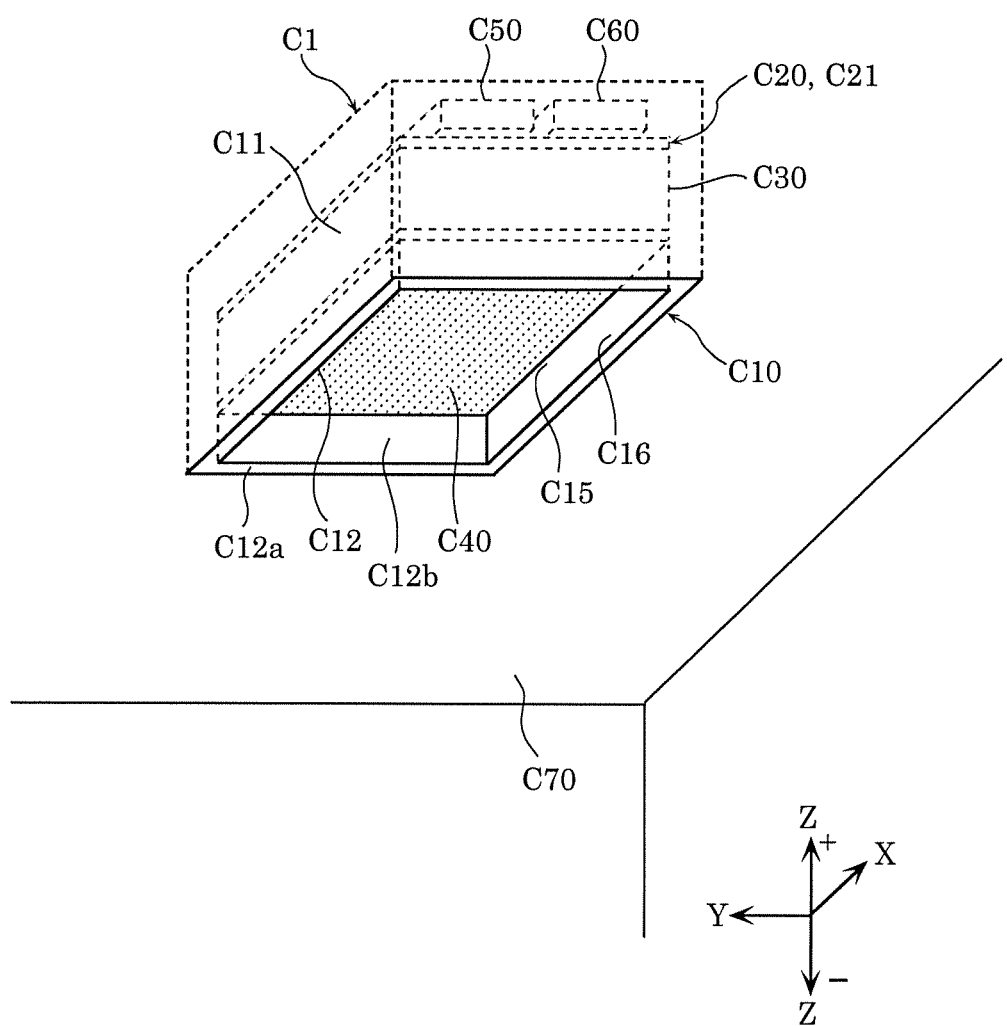
FIG. 21 illustrates the illumination apparatus according to Embodiment 3 installed in a ceiling.
Figure 22:
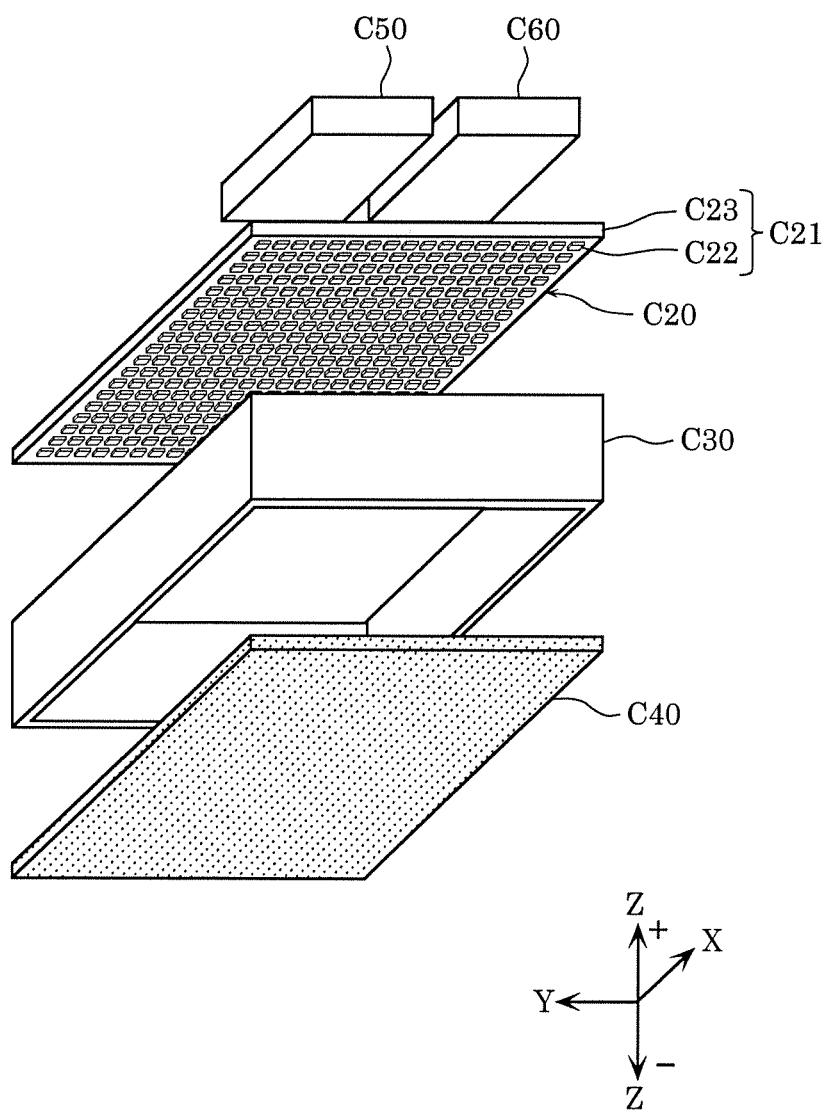
FIG. 22 is an exploded perspective view of a portion of the illumination apparatus according to Embodiment 3.

Hereinafter, illumination apparatus C1 according to Embodiment 3 will be described. FIG. 20 is a perspective view illustrating an exterior appearance of illumination apparatus C1. FIG. 21 is a perspective view illustrating illumination apparatus C1 installed in ceiling C70. FIG. 22 is an exploded perspective view of a portion of illumination apparatus C1.

As illustrated in FIG. 20 to FIG. 22, illumination apparatus C1 includes: case C10; light source C20 including light-emitting module C21; light reflector C30; light diffuser C40; controller C50; and power source C60.

Light-emitting module C21 can be configured in the same manner as light-emitting modules A20 and B20 in Embodiments 1 and 2. Further, light reflector C30 can be configured in the same manner as light reflectors A30 and B30. Furthermore, light diffuser C40 can be configured in the same manner as light diffusers A40 and B40.

Case C10 is a housing body that houses light-emitting module C21, light reflector C30, light diffuser C40, controller C50, and power source C60.

Case C10 is a flat box body, having a substantially rectangular shape in a plan view. Note that the shape of case C10 is not limited to the substantially rectangular shape, and case C10 may be substantially circular, substantially polygonal, or substantially semicircular, for example. The shape is not particularly limited.

Case C10 includes housing portion C11 and frame portion C12.

Housing portion C11 is a flat box body that houses light-emitting module C21, light reflector C30, light diffuser C40, controller C50, and power source C60. Note that controller C50 and power source C60 need not be housed in housing portion C11, and may be disposed outside case C10, for example. Housing portion C11 has an opening (hereinafter referred to as first opening portion C15) in a surface (hereinafter referred to as a bottom surface) of housing portion C11 on the floor side (the Z axis negative-side), and houses light diffuser C40 to cover first opening portion C15. In other words, the size of first opening portion C15 corresponds to the size of light diffuser C40. In Embodiment 3, the shape of first opening portion C15 is substantially rectangular.

Frame portion C12 is a loop-shaped (frame-shaped) member having a substantially rectangular shape in a plan view, and is disposed at the edge of the bottom surface of housing portion C11. In other words, frame portion C12 is disposed on the bottom surface of housing portion C11 to surround first opening portion C15 of housing portion C11. Thus, in a plan view of illumination apparatus C1, the opening of frame portion C12 (hereinafter referred to as second opening portion C16) and first opening portion C15 are substantially the same in shape. In Embodiment 3, second opening portion C16 has the same, substantially rectangular shape as first opening portion C15.

The light exiting from light diffuser C40 passes through second opening portion C16. Note that the shape of frame portion C12 is not limited to the substantially rectangular shape as long as the light exiting from light diffuser C40 can pass through frame portion C12. Frame portion C12 may be substantially circular, substantially polygonal, or substantially semicircular, for example. The shape is not particularly limited. For example, the outline of frame portion C12 may have the same shape as that of housing portion C11 in a plan view.

Frame portion C12 includes bottom surface C12a and rising portion C12b. As illustrated in FIG. 21, illumination apparatus C1 is recessed in ceiling C70 so that bottom surface C12a is flush with the ceiling surface. Rising portion C12b is formed substantially vertical toward the side opposite the floor (the direction on the Z axis positive side) from the end portion of bottom surface C12a on second opening portion C16 side. Note that the ceiling surface is an example of an installation surface of a building part.

Case C10 includes, for example, a metal material or a non-metal material having high thermal conductivity. An example of the non-metal material having high thermal conductivity is a resin having a high rate of thermal conductivity (a high thermal conductive resin). Use of a material having high thermal conductivity for case C10 allows heat generated by light-emitting module C21 to be dissipated outside via case C10. Note that housing portion C11 and frame portion C12 may include mutually different materials.

Note that housing portion C11 and frame portion C12 may be integrally formed to make up case C10, or, housing portion C11 and frame portion C12 may be separately formed and make up case C10 by adhesion with each other.

Light-emitting module C21 is a light source that emits light for forming an image. Light-emitting module C21 is fixed to the end portion of light reflector C30 on the side opposite light diffuser C40 (the end portion on the Z axis positive side). Light-emitting module C21 includes board C23 and a plurality of light-emitting elements C22 mounted on board C23.

Board C23 is a printed wiring board for mounting the plurality of light-emitting elements C22, and is substantially rectangular in shape. For example, a resin board that mainly includes a resin, a metal-based board that mainly includes a metal, a ceramic board including a ceramic, etc., can be used as board C23.

Each light-emitting element C22 includes light emitting diode (LED) elements. In Embodiment 3, each light emitting element C22 is an RGB-type element that emits blue light, green light, and red light (that is, light of three primary colors). A plurality of light-emitting elements C22 are disposed on the floor-side surface of board C23. For example, the plurality of light-emitting elements C22 are arranged in rows and columns on the floor-side surface of board C23. For example, the plurality of light-emitting elements C22 are equally spaced.

Note that the LED elements may be surface mount device (SMD) type LED elements, or may be chip on board (COB) type light-emitting elements. The light emitted from each light-emitting element C22 is not limited to the RGB three colors, and may be RGBW four colors or may be BW (blue and white) two colors.

Although not illustrated, disposed on board C23 are signal lines that transmit a control signal from controller C50 and power lines that supply power from power source C60. For example, the signal lines and the power lines are formed to connect the plurality of light-emitting elements C22 in series. Each light-emitting element C22 receives the supply of power from power source C60 via the power lines, and emits predetermined light based on the control signal received via the signal lines. Since light-emitting elements C22 in Embodiment 3 are RGB type light-emitting elements, it is possible to emit light in various colors by controlling the emission of blue light, green light, and red light. That is to say, it is possible to emit light including an image simulating, for example, a blue sky, a white cloud, a cloudy sky, an evening sky, or a sunset, by controlling the light emission from each light emitting element C22 via controller C50.

Light reflector C30 is tubular, and is at least partially disposed between light-emitting module C21 and light diffuser C40. Light reflector C30 is an optical member that reflects the light emitted from light-emitting module C21. Specifically, light reflector C30 reflects light incident on the inner surface of light reflector C30 (in other words, the surface of light reflector C30 on light-emitting module C21 side) from light-emitting module C21, toward light diffuser C40 side. The user sees a combined image of (i) an image formed by light emitted from light-emitting module C21 and entering light diffuser C40 without through light reflector C30 and (ii) an image formed by light emitted from light-emitting module C21 and entering light diffuser C40 after being reflected by light reflector C30.

Light reflector C30 is formed by, for example, performing mirror surface treatment or diffusion treatment on a surface formed from a metal material such as aluminum. The mirror surface treatment is polishing or lapping, for example. The diffusion treatment is, for example, matting such as anodizing. Note that it is only necessary that the diffusion treatment is performed on at least the inner surface of light reflector C30. Furthermore, light reflector C30 does not necessarily have to undergo the mirror surface treatment or the diffusion treatment, and may remain untreated by the mirror surface treatment or the diffusion treatment.

Light diffuser C40 is an optical member which diffuses and transmits the light entering from light-emitting module C21 side, toward the floor. Specifically, light diffuser C40 is a diffuser panel which transmits and diffuses the light entering from a light entrance surface (the surface on the Z axis positive side) of light diffuser C40, and allows the light to exit from a light exit surface of light diffuser C40.

Light diffuser C40 is a plate member that is rectangular in a plan view. Light diffuser C40 is fixed to the end portion of light reflector C30 on a side opposite light-emitting module C21 (the end portion on the Z axis negative side). In other words, light diffuser C40 is opposed to light-emitting module C21 and is disposed covering light-emitting module C21. Furthermore, light diffuser C40 is disposed covering first opening portion C15 of case C10.

Light diffuser C40 has the property of transmitting and diffusing the light emitted from light-emitting module C21. For example, light diffuser C40 is manufactured by performing diffusion treatment on a transparent plate including glass or a resin material such as transparent acrylic or polyethylene terephthalate (PET). Since light diffuser C40 is formed from a transparent material, light diffuser C40 has a high transmittance. For example, the all-light transmittance of light diffuser C40 is 80% or greater, preferably 90% or greater.

The diffusion treatment is performed on at least one of the light entrance surface and the light exit surface of light diffuser C40. One example of the diffusion treatment is prism processing by which a prism including minute dot-shaped holes (recesses) is formed. The diffusion treatment is not limited to the prism processing, and may be performed by texturing or printing.

The haze value of light diffuser C40 that has undergone the diffusion treatment is, for example, at least 10% and at most 90%. By making the haze value at least 10%, it is possible to inhibit light-emitting elements C22 of light-emitting module C21 from appearing as granular to the user, even when light diffuser C40 is formed from a transparent material. Moreover, by making the haze value at most 90%, it is possible to maintain, to some extent, the outline of the image projected on light diffuser C40 (for example, the outline of a cloud in a blue sky). Note that the haze value is adjustable according to the shape and size of the prism formed by the prism processing, for example.

Figure 23:
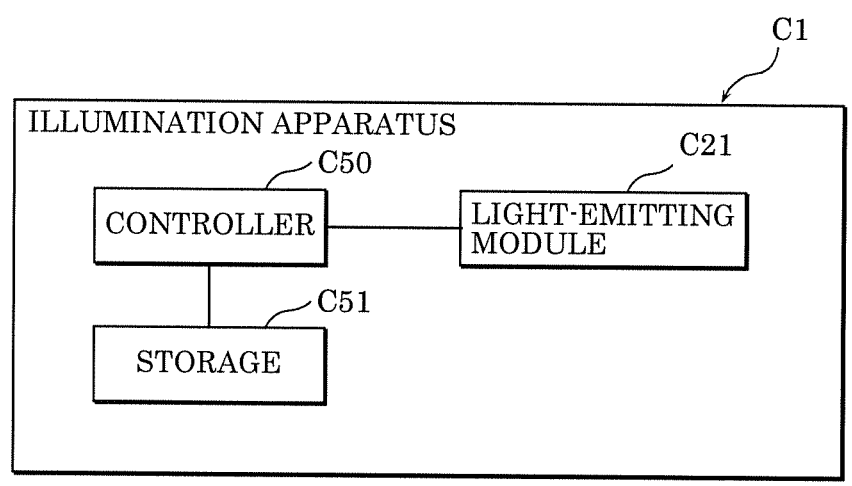
FIG. 23 is a block diagram illustrating a control configuration of the illumination apparatus according to Embodiment 3.

FIG. 23 is a block diagram illustrating a control configuration of illumination apparatus C1.

When focusing on the control configuration of illumination apparatus C1, illumination apparatus C1 includes controller C50, storage C51, and light-emitting module C21.

Controller C50 is a control device that controls operations such as turning on and off, control of the light intensity, and control of the tone (adjustment of the light color or the color temperature) of light-emitting module C21. Controller C50 is realized by a microcomputer, a processor, or a specialized circuit, for example. Note that power source C60 is a structural element included in controller C50 and thus omitted in FIG. 23. Power source C60 converts AC power supplied from a commercial power source into DC power at a predetermined level through rectification, smoothing, and stepping-down, for example, and supplies the DC power to light-emitting module C21.

Controller C50 obtains information on an image stored in storage C51, and controls light-emitting module C21 according to the information. For example, when a blue sky is to be projected on light diffuser C40, controller C50 obtains information on a blue sky from storage C51, and controls the light emission from the plurality of light-emitting elements C22 based on the information obtained. By the plurality of light-emitting elements C22 emitting light, an image is projected on light diffuser C40.

Controller C50 and light-emitting module C21 (the plurality of light-emitting elements C22) are electrically connected via the signal lines. Controller C50 outputs a control signal including information on the brightness of the blue LED, the green LED, and the red LED to each light-emitting element C22 via the signal lines according to the information obtained from storage C51. Receiving the control signal, each light-emitting element C22 emits blue light, green light, and red light based on the control signal.

Controller C50 outputs the control signal to light-emitting module C21 at time intervals at which the motion of the image does not become unnatural, for example. For example, controller C50 outputs the control signal 20 times in about one second. This enables representation of a more natural motion when displaying an image simulating a cloud moving in a blue sky, for example.

When changing the light emission from the plurality of light-emitting elements C22 to display a changing image as described above, controller C50 of illumination apparatus C1 controls the light emission from the plurality of light-emitting elements C22 to keep a change in at least one of (i) the light amount, (ii) the color temperature, and (iii) the spectral distribution of light exiting from light diffuser C40 of illumination apparatus C1 within a predetermined range.

Hereinafter, an image display method performed by illumination apparatus C1 will be described.

[Image Display Method Performed by Illumination Apparatus]

With reference to FIG. 24 to FIG. 27, an image display method performed by illumination apparatus C1 will be described.

Figure 24:
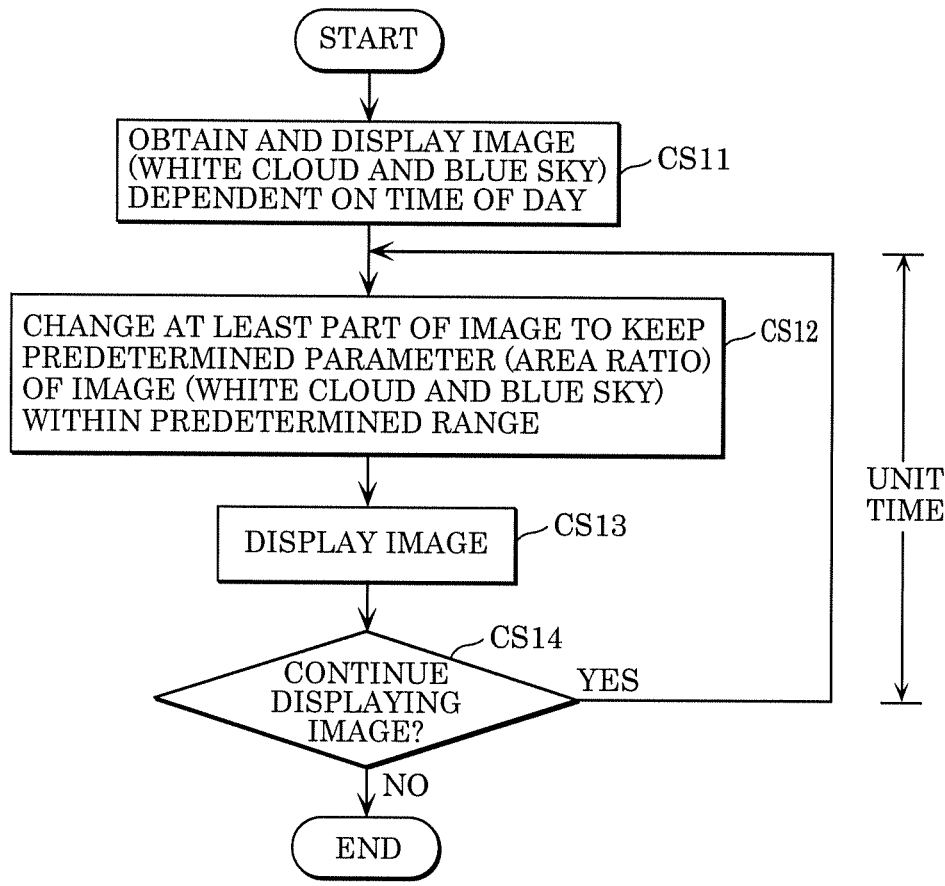
FIG. 24 is a flow chart for displaying an image on the illumination apparatus according to Embodiment 3.

FIG. 24 is a flow chart for displaying an image on illumination apparatus C1.

First, as illustrated in FIG. 24, an image dependent on a time of day is obtained from storage C51 and displayed on light diffuser C40 (CS11). Specifically, when a producer (user) wishes to display a daytime sky, controller C50 obtains an image simulating a sky of the daytime stored in storage C51, e.g., an image including a white cloud and a blue sky, and causes the plurality of light-emitting elements C22 to emit light based on the image.

Next, at least a part of the image is changed to keep a predetermined parameter of the image within a predetermined range (CS12). Specifically, controller C50 changes at least a part of the image so that the area ratio between the white cloud and the blue sky in the image equals the area ratio for a previously projected image (for example, white cloud region/blue sky region=0.3). Note that controller C50 may read from storage C51 an image which is at least partially changed in advance to satisfy this condition, and use this image as the changed image.

Note that the area ratio may be defined as a ratio of the white cloud region to the image. The area ratio may also be defined as a ratio of the blue sky region to the image.

The changed image is then displayed on light diffuser C40 (CS13). Next, whether or not to continue displaying the image is determined (CS14). Whether or not to continue displaying the image is determined as appropriate according to an input from the user. When it is determined to continue displaying the image (YES in CS14), the processing returns to CS12, and the image displayed in Step CS13 is changed to keep a predetermined parameter (the area ratio, for example) of the image within a predetermined range (CS12).

By repeatedly performing Steps CS12, CS13, and CS14 in such a manner, the image is continuously displayed during a predetermined time of day. In FIG. 24, the one cycle of performing Steps CS12, CS13, and CS14 in sequence and returning to Step CS12 again is the unit time of the image display performed by illumination apparatus C1. The unit time is a short period of time, e.g., at least 0.001 seconds and at most 1 second, and is, for example, 0.05 seconds in Embodiment 3.

When it is determined in Step CS14 not to continue displaying the image (NO in CS14), the display of the image is finished.

The above description of the processing flow has presented a control method by which the area ratio between the white cloud and the blue sky in the image is made equal to the area ratio for a previously projected image. As illustrated in Step CS12, the control may also be performed to keep a predetermined parameter (the area ratio) within a certain range.

Figure 25:
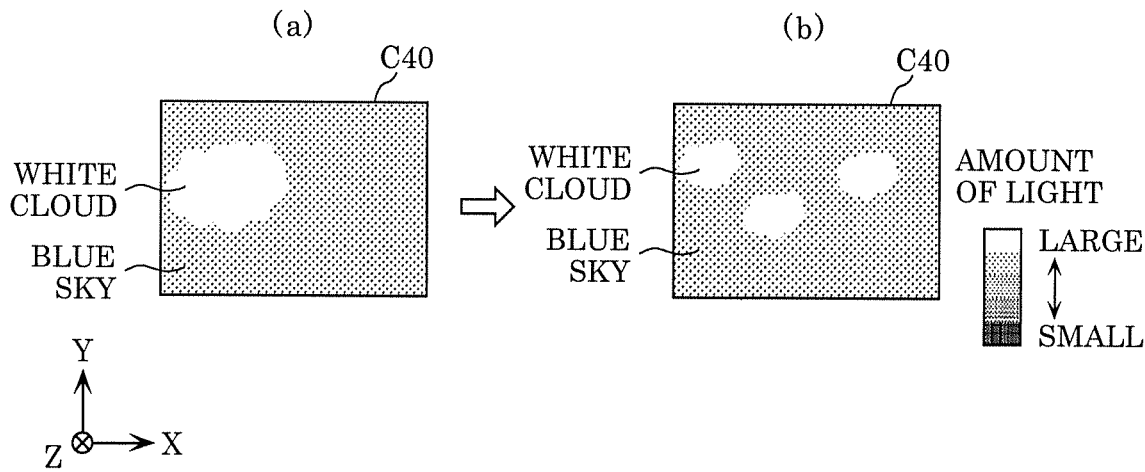
FIG. 25 illustrates the amount of light of images projected on the illumination apparatus according to Embodiment 3.

FIG. 25 illustrates the amount of light of images projected on illumination apparatus C1. (a) and (b) of FIG. 25 illustrate the difference in the amount of light exiting from light diffuser C40 in the form of dot gradation.

(a) of FIG. 25 is an image projected on light diffuser C40 at a particular time, and shows one large white cloud with a blue sky in the background. (b) of FIG. 25 is an image projected on light diffuser C40 after a predetermined time period has passed from (a), and shows three small white clouds with a blue sky in the background. (b) of FIG. 25 is an image after five minutes have passed from (a), for example.

In Embodiment 3, controller C50 changes at least a part of the image to keep a change in the amount of light exiting from light diffuser C40 within a predetermined range. For example, controller C50 may change at least a part of the image so that a ratio of the white cloud region to the image as a whole in (a) of FIG. 25 and a ratio of the white cloud region to the image as a whole in (b) of FIG. 25 become substantially equal. Further, controller C50 may change at least a part of the image so that a ratio of the blue sky region to the image as a whole in (a) of FIG. 25 and a ratio of the blue sky region to the image as a whole in (b) of FIG. 25 become substantially equal. For example, controller C50 may change at least a part of the image so that the area ratio between the white cloud region and the blue sky region in (a) of FIG. 25 and the area ratio between the white cloud region and the blue sky region in (b) of FIG. 25 become substantially equal. When doing so, for example, controller C50 may change at least a part of the image so that both of these area ratios between the white cloud region and the blue sky region become at least 0.2 and at most 0.4. This allows the change in the amount of light exiting from light diffuser C40 to be kept within a predetermined range. The area of each of the white cloud region and the blue sky region projected on light diffuser C40 can be derived by, for example, binarizing the image projected on light diffuser C40 according to the color, i.e., white and blue.

In such a manner, when changing the image, i.e., when changing the light emission from light-emitting elements C22, controller C50 performs control to keep a change in the amount of light exiting from light diffuser C40 within a predetermined range. This makes it possible to reduce the feeling of strangeness generated when the changing image is projected on illumination apparatus C1. If a change in the amount of light emitted from an illumination apparatus projecting a changing image is large, a person in the space illuminated with the light from the illumination apparatus may feel strange due to the change in the amount of light. With the configuration according to Embodiment 3, however, such a feeling of strangeness can be reduced.

Figure 26:
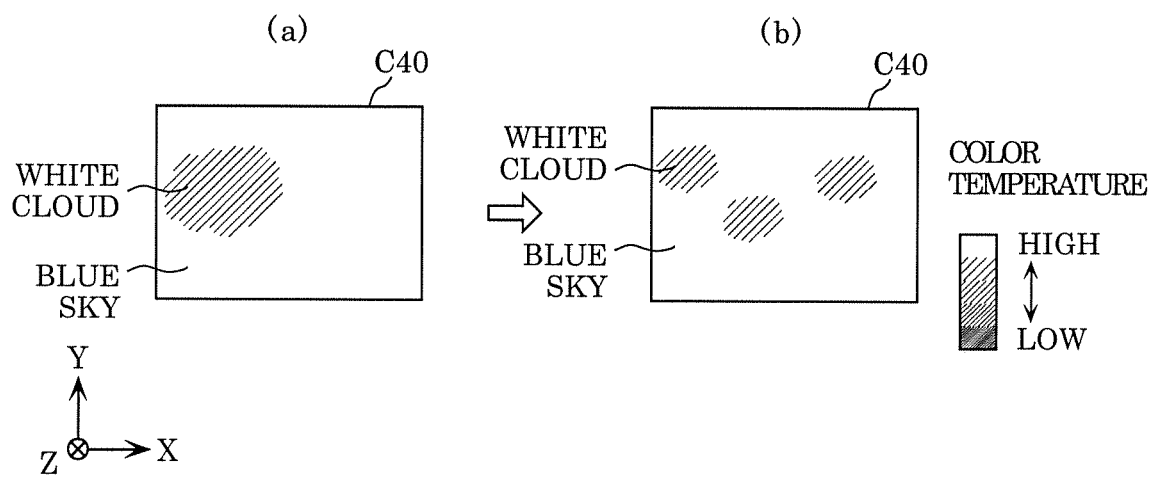
FIG. 26 illustrates the color temperature of images projected on the illumination apparatus according to Embodiment 3.

FIG. 26 illustrates the color temperature of images projected on illumination apparatus C1. The images in (a) and (b) of FIG. 26 correspond to the images in (a) and (b) of FIG. 25, respectively, and the difference in color temperature of light exiting from light diffuser C40 is indicated by the difference in hatching width.

As illustrated in FIG. 26, when changing the image, i.e., when changing the light emission from light-emitting elements C22, controller C50 of illumination apparatus C1 performs control to keep a change in the color temperature of light exiting from light diffuser C40 within a predetermined range. This makes it possible to reduce the feeling of strangeness generated when an image is projected on illumination apparatus C1. For example, when the color temperature suddenly changes from 5500 K equivalent to white to several tens of thousands of K or greater equivalent to blue, the illuminated object suddenly looks blue, causing the user to have a feeling of strangeness. To overcome this, the light emission from light-emitting elements C22 is controlled to keep the change in the color temperature within a predetermined range like the change from the state in (a) of FIG. 26 to the state in (b) of FIG. 26, so that the user's feeling of strangeness can be reduced.

Figure 27:
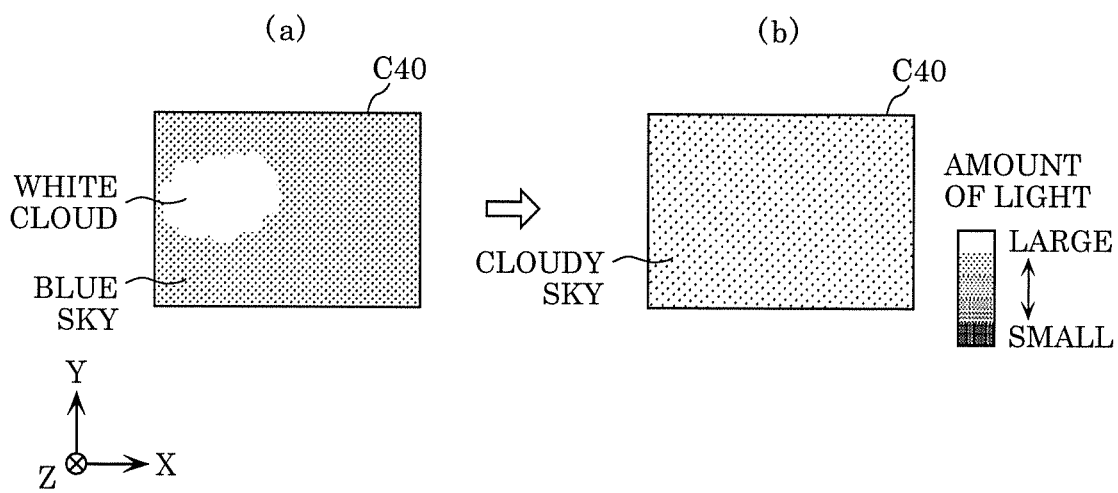
FIG. 27 illustrates another example of images projected on the illumination apparatus according to Embodiment 3.

FIG. 27 illustrates another example of images projected on illumination apparatus C1. (a) and (b) of FIG. 27 illustrate the difference in the amount of light exiting from light diffuser C40 in the form of dot gradation.

(a) of FIG. 27 is an image projected on light diffuser C40 at a particular time, and shows one large white cloud with a blue sky in the background. (b) of FIG. 27 is an image projected on light diffuser C40 after a predetermined time period has passed from (a), no longer showing the white cloud or blue sky but a cloudy sky. (b) of FIG. 27 is an image after 10 minutes have passed from (a), for example.

In the example illustrated in FIG. 27, controller C50 changes at least a part of the image to keep a change in the light flux ratio between white light and blue light projected on light diffuser C40 within a predetermined range.

Specifically, controller C50 changes at least a part of the image so that the light flux ratio between the white light and the blue light in (a) of FIG. 27 and the light flux ratio between the white light and the blue light in (b) of FIG. 27 become substantially equal. This makes it possible to keep the change in the amount of light exiting from light diffuser C40 within a predetermined range, and reduce the feeling of strangeness generated when the changing image is projected on illumination apparatus C1. Note that the light flux of the white light and the light flux of the blue light in the image simulating the cloudy sky can be derived by, for example, extracting the white light component and the blue light component in the image simulating the cloudy sky.

[Advantageous Effects Etc.]

Illumination apparatus C1 according to Embodiment 3 includes: case C10 having opening portion C15; light source C20 disposed in case C10, light source C20 including a plurality of light-emitting elements C22; light diffuser C40 which is disposed in opening portion C15, and diffuses and transmits light emitted from the plurality of light-emitting elements C22; and controller C50 that controls light emission from light source C20. Controller C50: controls light emission from the plurality of light-emitting elements C22 to project an image on light diffuser C40, the image changing with time; and when changing the light emission from the plurality of light-emitting elements C22 changing the image, controls the light emission from light source C20 to keep a change in at least one of (i) a light amount, (ii) a color temperature, and (iii) a spectral distribution of light emitted from illumination apparatus 1C within a predetermined range.

In such a manner, when changing an image based on the light emission from light-emitting elements C22, it is possible to reduce the feeling of strangeness generated when the image (the changing image) is projected on illumination apparatus C1, by controlling the light emission from light source C20 to keep the change in the amount of light emitted from illumination apparatus C1 within a predetermined range. Furthermore, it is possible to reduce the feeling of strangeness generated when the image is projected on illumination apparatus C1, by performing control to keep the change in the color temperature of light emitted from illumination apparatus C1 within a predetermined range. That is to say, illumination apparatus C1 makes it possible to reduce the strangeness felt by a person present in the space illuminated with the light from illumination apparatus C1 projecting the changing image.

Note that although the above description has presented the case where control is performed to keep the change in the light amount or color temperature of light within a predetermined range, the present disclosure is not limited to this case. The light emission from light source C20 may be controlled to keep a change in the spectral distribution of light within a predetermined range. That is to say, when changing the light emission from the plurality of light-emitting elements C22, controller C50 may control the light emission from light source C20 to keep a change in at least one of (i) the light amount, (ii) the color temperature, and (iii) the spectral distribution of light emitted from illumination apparatus C1 within a predetermined range.

Further, as the control of the light emission from light source C20 described above, when changing the light emission from the plurality of light-emitting elements C22, controller C50 may control the light emission from light source C20 to keep a change in at least one of (i) the light amount and (ii) the color temperature of light exiting from light diffuser C40 of illumination apparatus C1 within a predetermined range.

In such a manner, when changing an image based on the light emission from light-emitting elements C22, it is possible to reduce the feeling of strangeness generated when the image (the changing image) is projected on illumination apparatus C1, by controlling the light emission from light source C20 to keep the change in the amount of light exiting from light diffuser C40 within a predetermined range. Furthermore, it is possible to reduce the feeling of strangeness generated when the image is projected on illumination apparatus C1, by performing control to keep the change in the color temperature of light exiting from light diffuser C40 within a predetermined range.

Controller C50 may change at least a part of the image to keep a change in at least one of (i) the light amount and (ii) the color temperature of the light within the predetermined range.

In such a manner, it is possible to reduce the feeling of strangeness generated when the changing image is projected on illumination apparatus C1, by changing at least a part of the image to keep the change in the light amount or color temperature of light exiting from light diffuser C40 within a predetermined range.

When the image is an image simulating a cloud and a blue sky, controller C50 may change at least a part of the image to keep at least one of a change in the ratio of a cloud region to the image as a whole and a change in the ratio of a blue sky region to the image as a whole within a predetermined range. Here, the cloud region is a region of the cloud, and the blue sky region is a region of the blue sky.

In such a manner, it is possible to keep the light amount or color temperature of the sum of light emitted from illumination apparatus C1 within a predetermined range, by changing at least a part of the image to keep a change in the above ratio within a predetermined range. This makes it possible to reduce the feeling of strangeness generated when the changing image is projected on illumination apparatus C1.

When the image is projected using white light and blue light, controller C50 may change at least a part of the image to keep a change in the light flux ratio within a predetermined range.

In such a manner, it is possible to keep the light amount or color temperature of light emitted from illumination apparatus C1 within a predetermined range, by changing at least a part of the image to keep, for example, the light flux ratio between the white light and the blue light within a predetermined range. This makes it possible to reduce the feeling of strangeness generated when the changing image is projected on illumination apparatus C1. In order to keep the amount of light emitted from illumination apparatus C1 within a predetermined range, control may be performed to keep the amount of light emitted from each light-emitting element C22 within a predetermined range, or, control may be performed to keep the light amount of the sum of light emitted from illumination apparatus C1 within a predetermined range. When significantly changing the brightness and color of light emitted from each light-emitting element C22, control is performed to keep the sum of light emitted from illumination apparatus C1 within a predetermined range.

Controller C50 may keep a change in at least one of (i) the light amount, (ii) the color temperature, and (iii) the spectral distribution of the light within the predetermined range during a unit time.

This makes it possible to reduce the feeling of strangeness about illumination apparatus C1 during a determined unit time. For example, when the unit time is determined to be at least 0.001 seconds and at most 1 second, it is possible to reduce the feeling of strangeness about illumination apparatus C1 during this short period of time.

Controller C50 may control the light emission from light source C20 to keep a change in at least one of (i) the light amount, (ii) the color temperature, and (iii) the spectral distribution of the light emitted from illumination apparatus C1 within the predetermined range during a predetermined time of day. The predetermined time of day may be around dawn, in morning, daytime, in evening, or around dusk. Around dawn may be a time during an hour before and after sunrise. Around dusk may be a time during an hour before and after sunset.

This makes it possible to reduce the feeling of strangeness about illumination apparatus C1 during a predetermined time of day. For example, when a day is divided into morning, daytime, evening, and night, and the daytime is determined as the predetermined time of day, it is possible to reduce the feeling of strangeness about illumination apparatus C1 during the daytime. That is to say, controller C50 may control the light emission from light source C20 to keep a change in at least one of (i) the light amount, (ii) the color temperature, and (iii) the spectral distribution of the light emitted from illumination apparatus C1 within a predetermined range during a time of dawn, morning, daytime, or evening.

(Variation 6)

[Configuration of Illumination Apparatus]

Next, illumination apparatus C1A according to Variation 6 will be described. Illumination apparatus C1A according to Variation 6 includes a plurality of light-emitting sources C26 different from light-emitting module C21, in addition to the structural elements of illumination apparatus C1 according to Embodiment 3.

Figure 28:
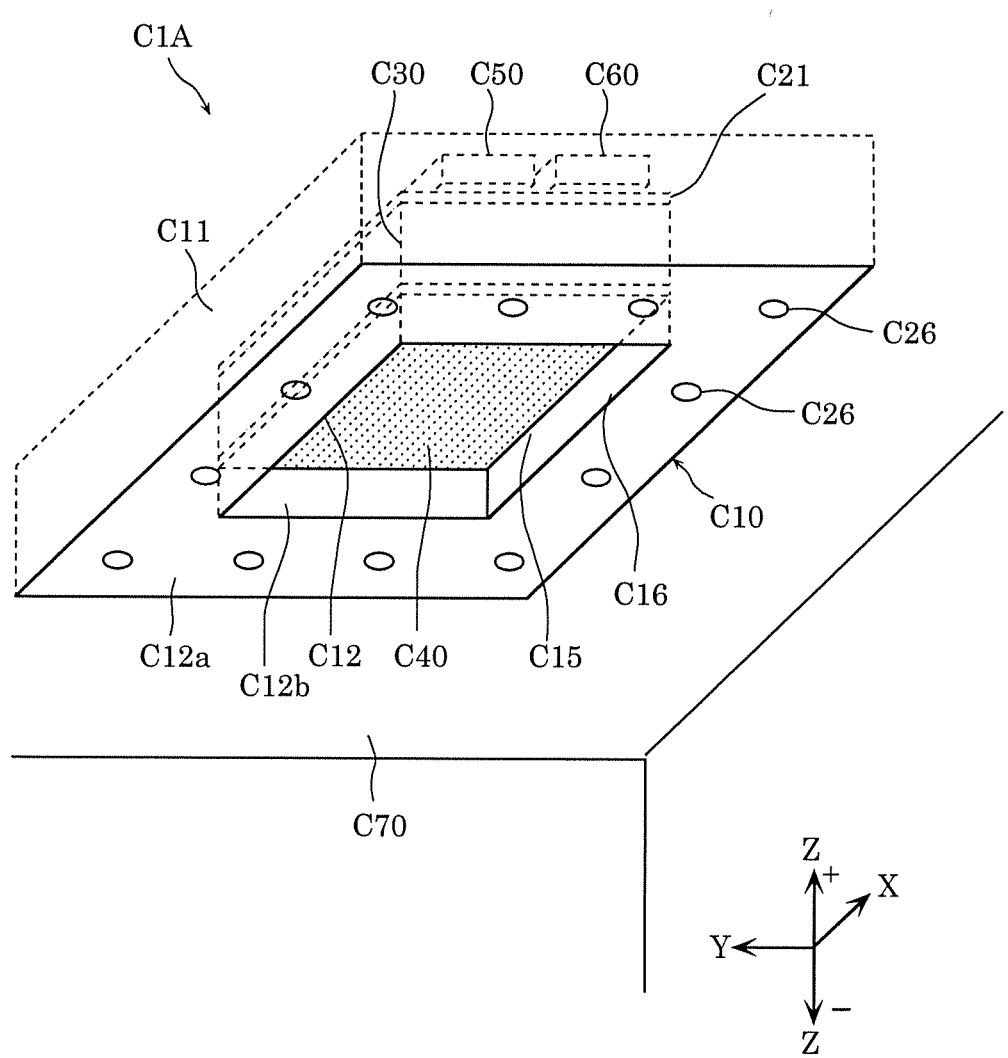
FIG. 28 is a perspective view illustrating an illumination apparatus according to Variation 6 installed in a ceiling.
Figure 29:
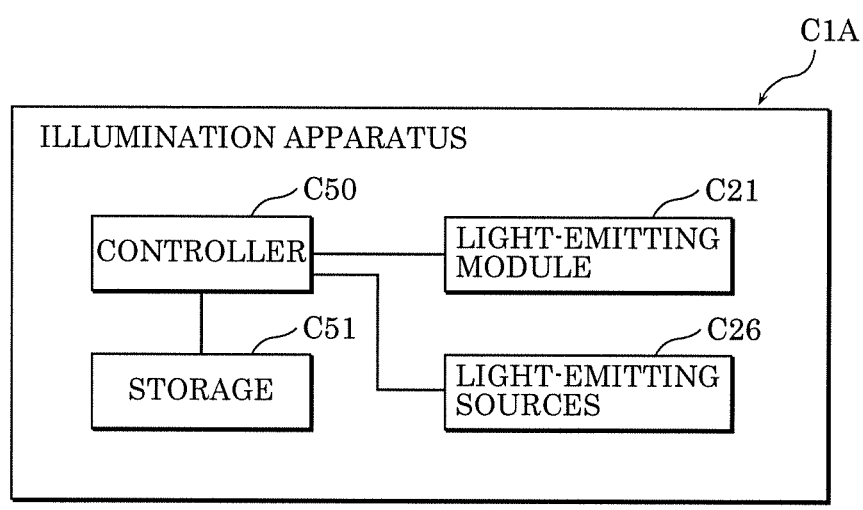
FIG. 29 is a block diagram illustrating a control configuration of the illumination apparatus according to Variation 6.

FIG. 28 is a perspective view illustrating illumination apparatus C1A installed in ceiling C70. FIG. 29 is a block diagram illustrating a control configuration of illumination apparatus C1A.

As illustrated in FIG. 28, illumination apparatus C1A includes: case C10; light source C20 including light-emitting module C21 and the plurality of light-emitting sources C26; light reflector C30; light diffuser C40; controller C50; and power source C60. Light-emitting module C21, light reflector C30, light diffuser C40, controller C50, and power source C60 of illumination apparatus C1A have a configuration substantially the same as that of illumination apparatus C1 described in Embodiment 3 above. Thus, the description thereof will be omitted.

Case C10 of illumination apparatus C1A includes housing portion C11 and frame portion C12. Bottom surface C12a of frame portion C12 is wider than bottom surface C12a according to Embodiment 3 described above. In the present variation, a plurality of indentations (recesses) are formed in this wide bottom surface C12a, and the plurality of light-emitting sources C26 are recessed in the indentations.

The plurality of light-emitting sources C26 are disposed outside second opening portion C16 to surround second opening portion C16 in a plan view. Each light-emitting source C26 is, for example, a downlight including a light-emitting element and an opening cover. As illustrated in FIG. 29, the plurality of light-emitting sources C26 are connected to controller C50.

Controller C50 controls light emission from light-emitting module C21 and light emission from the plurality of light-emitting sources C26. Specifically, when changing the light emission from light-emitting module C21, controller C50 of illumination apparatus C1A controls the light emission from the plurality of light-emitting sources C26 to keep the change in the light amount, color temperature, or spectral distribution of light exiting from illumination apparatus C1A within a predetermined range.

[Image Display Method Performed by Illumination Apparatus]

Figure 30:
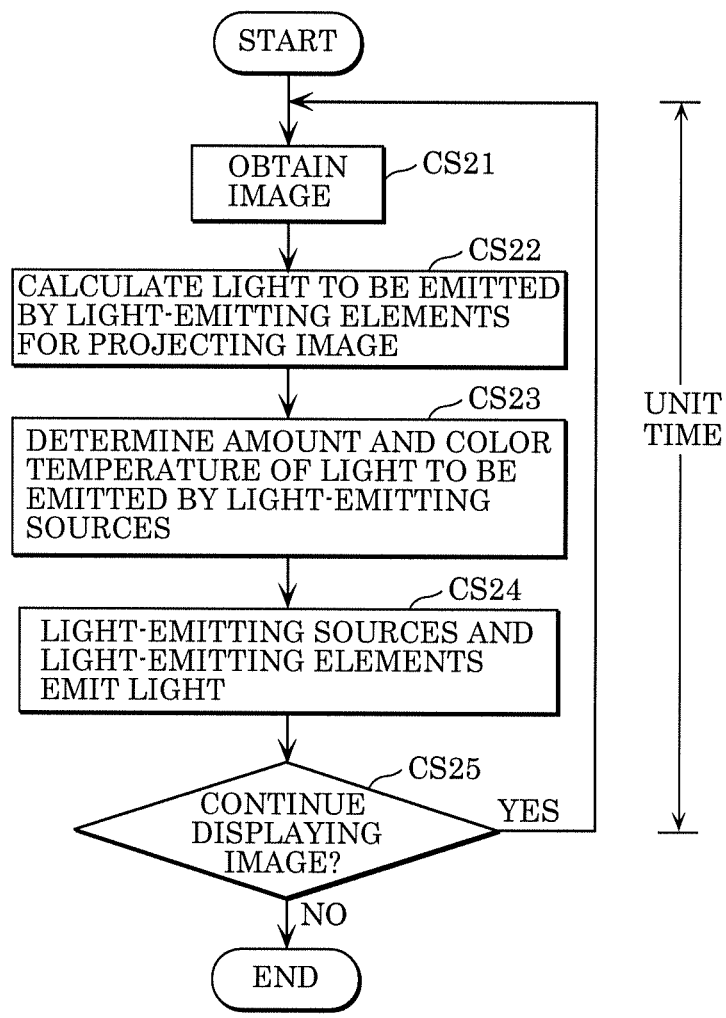
FIG. 30 is a flow chart for displaying an image on the illumination apparatus according to Variation 6.

FIG. 30 is a flow chart for displaying an image on illumination apparatus C1A.

First, an image dependent on a time of day is obtained from storage C51 (CS21). For example, controller C50 obtains an image simulating a sky of the daytime stored in storage C51, e.g., an image including a white cloud and a blue sky.

Next, light to be emitted by the plurality of light-emitting elements C22 for projecting an image is calculated (CS22). Specifically, controller C50 computes the amount and color temperature of light to be emitted by light-emitting elements C22, based on an image signal obtained from storage C51.

Next, the amount and color temperature of light to be emitted by the plurality of light-emitting sources C26 are determined according to the calculated light to be emitted by light-emitting elements C22 (C523). Controller C50 determines the amount and color temperature of light in such a manner that the amount and color temperature of light to be emitted from illumination apparatus C1A as a whole fall within a predetermined range. That is to say, the determination is made based on the light amount and color temperature of light to be emitted by both light-emitting module C21 and the plurality of light-emitting sources C26 making up light source C20.

Then, light-emitting elements C22 emit light and project an image, and the plurality of light-emitting sources C26 emit light based on the determined amount and color temperature of light (C524). Next, whether or not to continue displaying an image is determined (C525). Whether or not to continue displaying an image is determined as appropriate according to an input from the user. When it is determined to continue displaying an image (YES in CS25), the processing returns to Step CS21, and a new, next image is obtained (C521).

Note that in the case of obtaining an image in Step CS21, the actual environmental light may be obtained from a separately provided optical sensor, and the amount and color temperature of light may be derived based on the environmental light.

By repeatedly performing Steps CS21 to CS25 in such a manner, an image is continuously displayed during a predetermined time of day. In FIG. 30, the one cycle of performing Steps CS21 to CS25 in sequence and returning to Step CS21 again is the unit time of the image display performed by illumination apparatus C1A. The unit time is a short period of time, e.g., at least 0.001 seconds and at most 1 second.

When it is determined not to continue displaying an image in Step CS25 (NO in CS25), the display of the image is finished.

Figure 31:
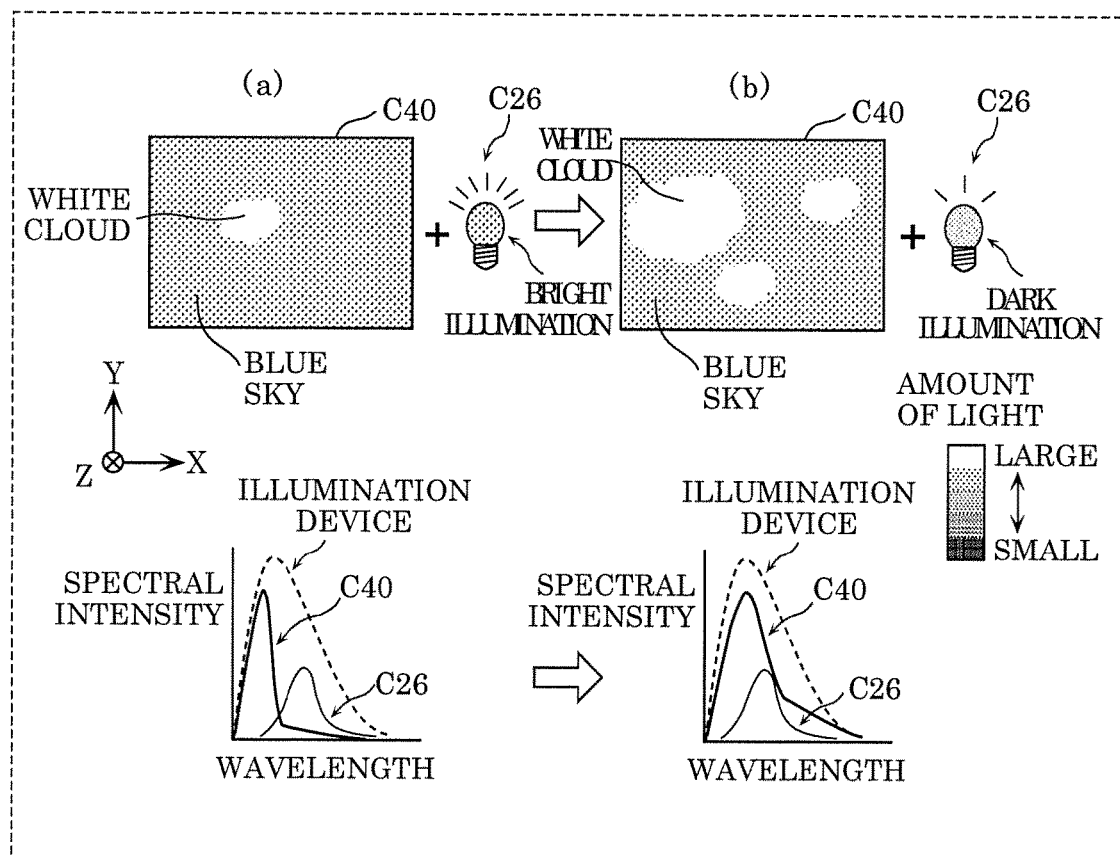
FIG. 31 illustrates the spectral distribution of images projected on the illumination apparatus according to Variation 6.

FIG. 31 illustrates the amount of light of images projected on illumination apparatus C1A. (a) and (b) of FIG. 31 illustrate the difference in the amount of light exiting from light diffuser C40 in the form of dot gradation. On the lower side of (a) and (b) of FIG. 31, spectral distribution charts of the light exiting from light diffuser C40 are shown.

(a) of FIG. 31 is an image projected on light diffuser C40 at a particular time, and shows one small white cloud with a blue sky in the background. In the spectral distribution chart, as for light diffuser C40, the spectral intensity corresponding to the wavelengths for blue is high since the blue sky region is large, and as for the plurality of light-emitting sources C26, the spectral intensity corresponding to the wavelengths for red is high since the plurality of light-emitting sources C26 are emitting bright light. (b) of FIG. 31 is an image projected on light diffuser C40 after a predetermined time period has passed from (a), and shows one large white cloud, two small white clouds, and a blue sky in the background. In the spectral distribution chart, as for light diffuser C40, the spectral intensity corresponding to the wavelengths for yellow or red has increased since the white cloud region has increased, and as for the plurality of light-emitting sources C26, the spectral intensity corresponding to the wavelengths for red has decreased since the plurality of light-emitting sources C26 are emitting dark light.

When changing the state in (a) of FIG. 31 to the state in (b) of FIG. 31, controller C50 according to the present variation controls the light emission from the plurality of light-emitting sources C26 to keep the change in the spectral distribution of light emitted from illumination apparatus C1A within a predetermined range. Specifically, in the spectral distribution charts in (a) and (b) of FIG. 31, controller C50 controls the light emission from the plurality of light-emitting sources C26 so that a sum (the dashedline in the spectral distribution charts) of the intensity of light exiting from light diffuser C40 and the intensity of light emitted from the plurality of light-emitting sources C26 is substantially equal between (a) and (b). In other words, controller C50 controls the light intensity of the plurality of light-emitting sources C26 according to the amount of light exiting from light diffuser C40, and controls the tone of the plurality of light-emitting sources C26 according to the color of light exiting from light diffuser C40. In such a manner, the feeling of strangeness generated when the changing image is projected on illumination apparatus C1 is reduced by keeping the change in the spectral distribution of light emitted from illumination apparatus C1A within a predetermined range.

[Advantageous Effects Etc.]

Illumination apparatus C1A according to the present variation includes: case C10 having opening portion C15; light source C20 disposed in case C10 and including a plurality of light-emitting elements C22 and a plurality of light-emitting sources C26 different from the plurality of light-emitting elements C22; light diffuser C40 which is disposed in opening portion C15, and diffuses and transmits light emitted from the plurality of light-emitting elements C22; and controller C50 that controls light emission from the plurality of light-emitting elements C22 and light emission from the plurality of light-emitting sources C26. Controller C50: controls the light emission from the plurality of light-emitting elements C22 to project an image on light diffuser C40, the image changing with time; and when changing the light emission from the plurality of light-emitting elements C22 changing the image, controller C50 controls light emission from the plurality of light-emitting sources C26 to keep a change in the spectral distribution of the light emitted from illumination apparatus C1A within a predetermined range.

In such a manner, when changing the image based on the light emission from light-emitting elements C22, it is possible to reduce the feeling of strangeness generated when the image (the changing image) is projected on illumination apparatus C1A, by controlling the plurality of light-emitting sources C26 to keep the change in the spectral distribution of light emitted from illumination apparatus C1A within a predetermined range. Furthermore, having light-emitting sources C26 different from light-emitting elements C22 makes it possible to produce a free image without placing restrictions on the image.

Note that although the above description has presented the case where the light emission from the plurality of light-emitting sources C26 is controlled to keep the change in the spectral distribution of light within a predetermined range, the present disclosure is not limited to this case. The light emission from the plurality of light-emitting sources C26 may be controlled to keep the change in the amount and color temperature of light within a predetermined range. That is to say, when changing the light emission from the plurality of light-emitting elements C22, controller C50 may control light emission from the plurality of light-emitting sources C26 to keep a change in at least one of (i) the light amount, (ii) the color temperature, and (iii) the spectral distribution of the light emitted from illumination apparatus MA within the predetermined range.

Controller C50 may control the light intensity of the plurality of light-emitting sources C26 according to the amount of light exiting from light diffuser C40, or may control the tone of the plurality of light-emitting sources C26 according to the color of the light exiting from light diffuser C40.

In such a manner, it is possible to reduce the feeling of strangeness generated when the changing image is projected on illumination apparatus C1A, by controlling the light intensity or tone of the plurality of light-emitting sources C26 via controller C50.

Further, controller C50 may control at least one of a light intensity and a tone of the plurality of light-emitting sources C26 according to a change of the image.

Note that controller C50 may derive the amount or color of the light based on the value of current supplied to light-emitting elements C22, may derive the amount or color of the light by detecting the current supplied to light-emitting elements C22, or may detect the amount or color of the light using an optical sensor provided externally.

(Variation 7)

Next, illumination system C2 according to another variation (Variation 7) of Embodiment 3 will be described. In illumination system C2 according to Variation 7, light-emitting sources C26 of illumination apparatus C1A in Variation 6 are installed in ceiling C70.

Figure 32:
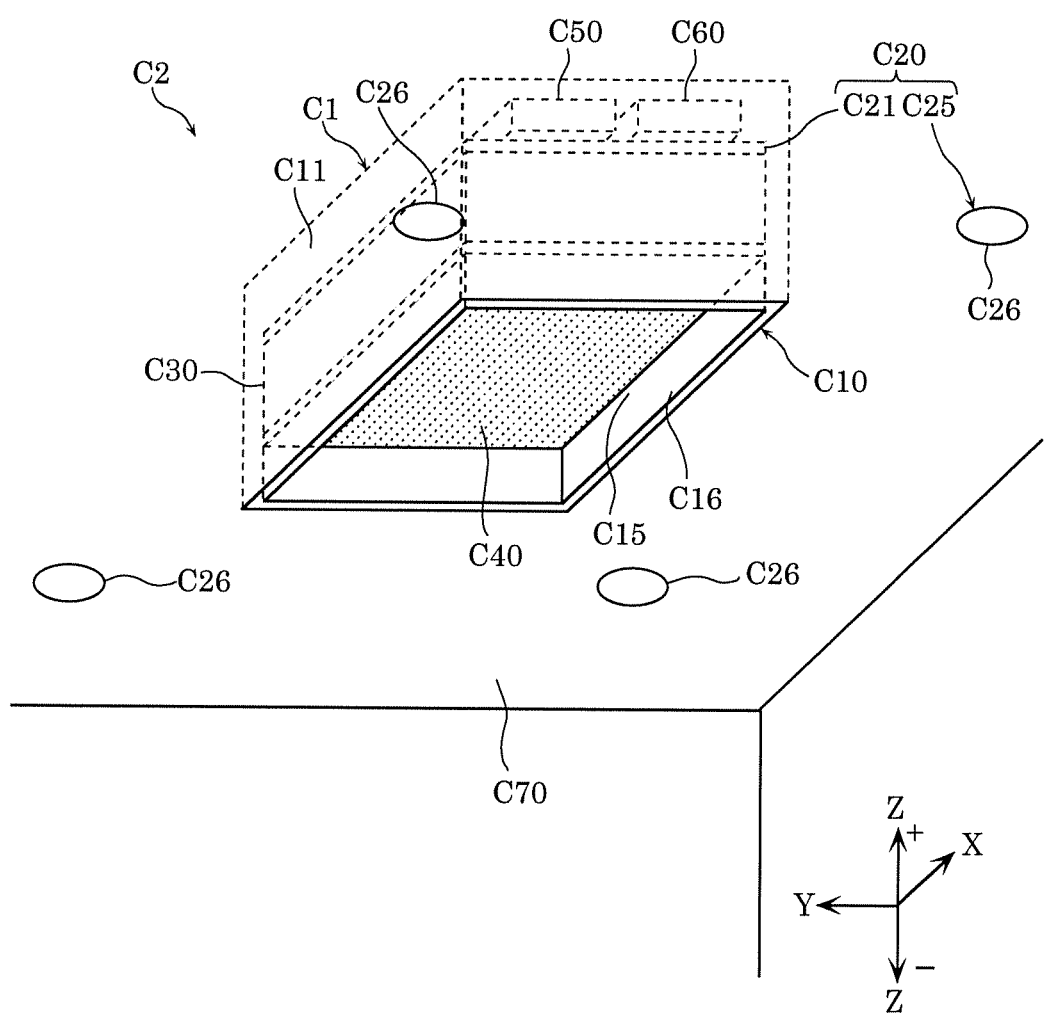
FIG. 32 is a perspective view illustrating an illumination system according to Variation 7.
Figure 33:
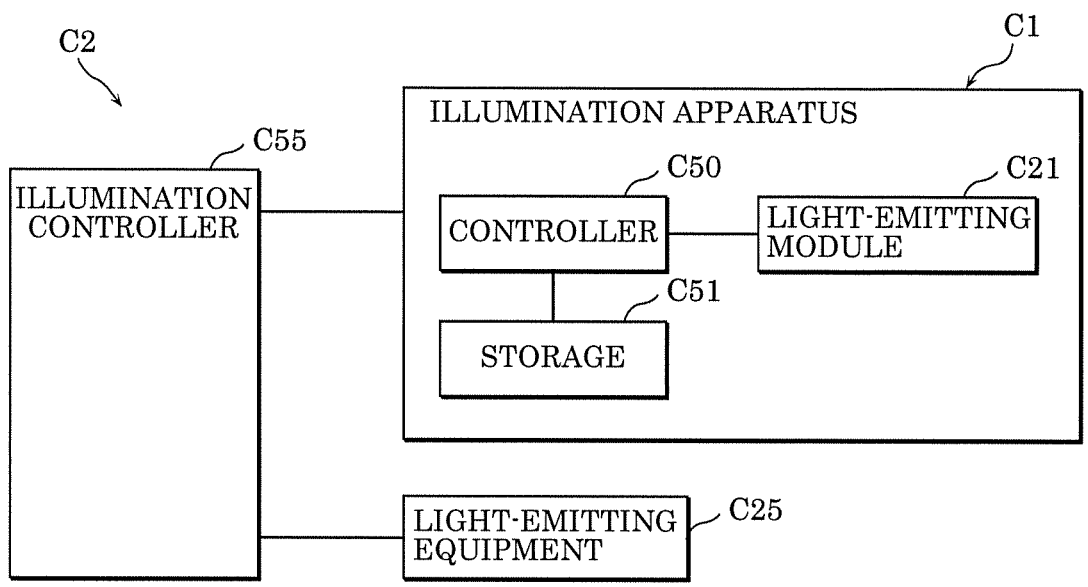
FIG. 33 is a block diagram illustrating a control configuration of the illumination system according to Variation 7.

FIG. 32 is a perspective view illustrating illumination system C2 according to Variation 7. FIG. 33 is a block diagram illustrating a control configuration of illumination system C2 according to Variation 7.

As illustrated in FIG. 32 and FIG. 33, illumination system C2 includes: illumination apparatus C1 in Embodiment 3 described above; light-emitting equipment C25 including light-emitting sources C26 different from light-emitting elements C22 of illumination apparatus C1; and illumination controller C55 that controls light emission from illumination apparatus C1 and light emission from light-emitting equipment C25.

In illumination system C2, indentations (recesses) are formed in ceiling C70, and light-emitting equipment C25 is recessed in each of these indentations. Light-emitting equipment C25 can be also referred to as a luminaire or an illumination apparatus.

Light-emitting equipment C25 includes a plurality of light-emitting sources C26. The plurality of light-emitting sources C26 are disposed outside second opening portion C16. Each light-emitting source C26 is, for example, an LED bulb including a light-emitting element. As illustrated in FIG. 33, light-emitting equipment C25 is connected to illumination controller C55.

Illumination controller C55 controls the light emission from light-emitting module C21 and the light emission from light-emitting equipment C25. More specifically, illumination controller C55: controls the light emission from the plurality of light-emitting elements C22 to project, on light diffuser C40, an image that changes with time; and when changing the light emission from the plurality of light-emitting elements C22, controls the light emission from light-emitting equipment C25 to keep a change in at least one of (i) the light amount, (ii) the color temperature, and (iii) the spectral distribution of light emitted from illumination system C2 within a predetermined range. This makes it possible to reduce the feeling of strangeness generated when the changing image is projected on illumination apparatus C1.

Note that the number of illumination apparatuses 1 in illumination system C2 is not limited to one, and two or more illumination apparatuses 1 may be provided. For example, illumination system C2 may have such a configuration that, when each illumination apparatus C1 outputs a different image, the feeling of strangeness about the light illuminating the space as a whole is reduced by controlling the intensity or color of light emitted from light-emitting equipment C25.

(Other Variations of Embodiment 3)

Hereinbefore, the present disclosure has been described based on Embodiment 3; however, the present disclosure is not limited to Embodiment 3.

Figure 34:
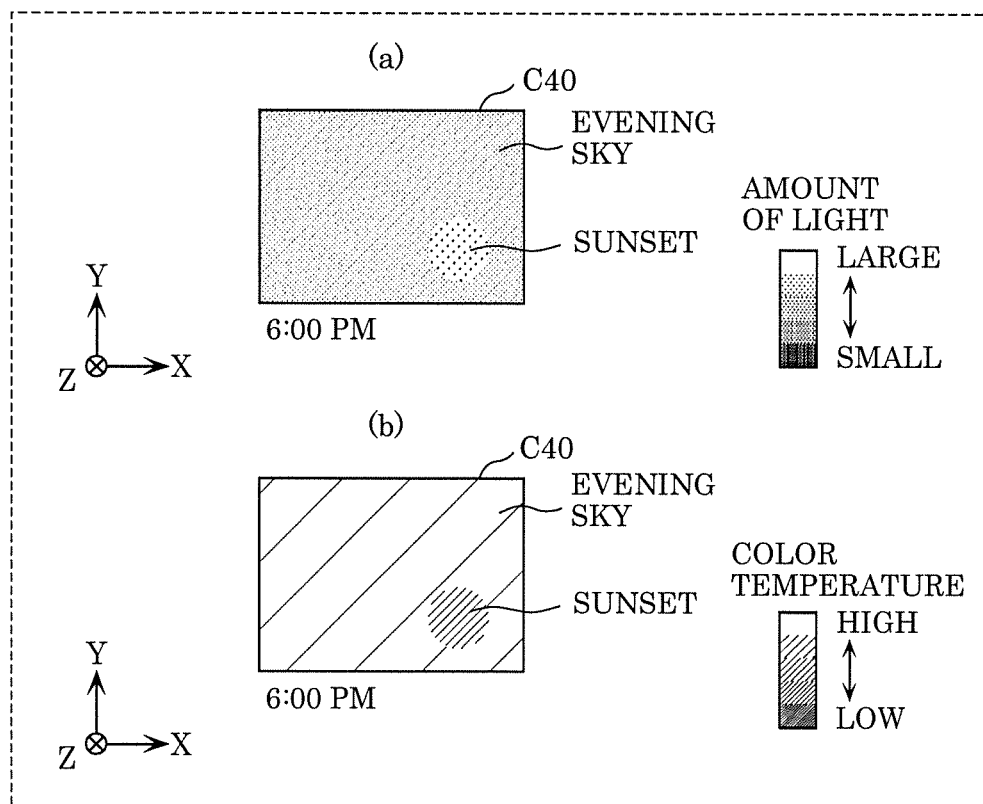
FIG. 34 illustrates images projected on an illumination apparatus according to another variation.

Embodiment 3 etc. have presented the example where an image simulating a white cloud and a blue sky is projected on light diffuser C40; however, the image is not limited to this example. For example, as illustrated in (a) and (b) of FIG. 34, an image simulating a sunset and an evening sky may be projected on light diffuser C40. In this case too, when changing the light emission from the plurality of light-emitting elements C22, light emission from light source C20 is controlled to keep a change in at least one of (i) the light amount, (ii) the color temperature, and (iii) the spectral distribution of the light emitted from illumination apparatus C1, C1A, or illumination system C2 within a predetermined range. This makes it possible to reduce the feeling of strangeness generated when an image is projected on illumination apparatus C1, C1A or illumination system C2.

Further, although Embodiment 3 etc. have illustrated the example where case C10 includes frame portion C12, the present disclosure is not limited to this example. For example, frame portion C12 may be configured as a portion of a building part.

Furthermore, although Embodiment 3 etc. have illustrated the example where illumination apparatus C1 or C1A is recessed in ceiling C70, the present disclosure is not limited to this example. For instance, illumination apparatus C1 or MA may be recessed in a wall, for example. In this case, the wall is an example of a building part.

Furthermore, although Embodiment 3 etc. have presented the example where light diffuser C40 is manufactured by performing diffusion treatment on a transparent plate (for example, a transparent acrylic plate), the present disclosure is not limited to this example. For example, light diffuser C40 may be prepared by providing a diffusion sheet on a transparent plate. In this case, it is only necessary that a diffusion sheet is provided on at least one surface of the transparent plate, i.e., either the surface on the floor side or the surface on light-emitting module C21 side. In addition, light diffuser C40 may be a milky white diffuser having a light diffusing material (for example, light-reflective microparticles such as silica particles) dispersed therein. Such a diffuser is manufactured by resin molding, into a predetermined shape, a light-transmissive resin material having a light diffusing material mixed therein. Note that although the color of light diffuser C40 may be milky white, light diffuser C40 may be, for example, a transparent resin material on which diffusion treatment is performed, in a viewpoint of reducing light loss.

As described above, according to Embodiment 3 etc., in a space illuminated with light emitted from an illumination apparatus in such a great amount that the emitted light substantially controls the brightness of the space, it is possible to reduce the strangeness that a person in the space (user) feels (i) when the appearance of an object in the space significantly changes due to a change in the color or intensity of light of an image or due to a change in the spectral wavelength characteristics of the spatial light or (ii) when a significant departure occurs from spatial light black body radiation.

For example, illumination apparatus C1 according to Embodiment 3 includes: case C10 having opening portion C15; light source C20 disposed in case C10 and including a plurality of light-emitting elements C22; light diffuser C40 which is disposed in opening portion C15, and diffuses and transmits light emitted from the plurality of light-emitting elements C22; and controller C50 that controls light emission from light source C20. Controller C50: controls light emission from the plurality of light-emitting elements C22 to project an image on light diffuser C40, the image changing with time; and when changing the light emission from the plurality of light-emitting elements C22 changing the image, controls the light emission from light source C20 to keep a change in the amount of light exiting from light diffuser C40 of illumination apparatus C1 within a predetermined range during a unit time.

For example, controller C50 may: control the light emission from the plurality of light-emitting elements C22 to project an image on light diffuser C40, the image changing with time; and when changing the light emission from the plurality of light-emitting elements C22, control the light emission from light source C20 to keep a change in the color temperature of the light exiting from light diffuser C40 of illumination apparatus C1 within a predetermined range during the unit time.

For example, controller C50 may: control the light emission from the plurality of light-emitting elements C22 to project an image on light diffuser C40, the image changing with time; and when changing the light emission from the plurality of light-emitting elements C22, control the light emission from light source C20 to keep a change in the spectral distribution of the light exiting from light diffuser C40 of illumination apparatus C1 within a predetermined range during the unit time.

For example, the unit time may be at least 0.001 seconds and at most 1 second.

For example, an illumination apparatus according to an aspect of the present disclosure may be an illumination apparatus including: a case having an opening portion; a first light source including a plurality of light-emitting elements disposed in the case; a second light source different from the first light source and disposed outside the case; a light diffuser which is disposed in the opening portion, and diffuses and transmits light emitted from the plurality of light-emitting elements; and a controller that controls light emission from the first light source and light emission from the second light source. The controller: may control light emission from the plurality of light-emitting elements to project an image simulating a sky on the light diffuser, the image changing with time; and when changing the image, control the light emission from at least one of the first light source and the second light source to keep a change in at least one of (i) a light amount, (ii) a color temperature, and (iii) a spectral distribution of light emitted from the illumination apparatus within a predetermined range.

Note that controller C50 may be configured to have the functions of at least one of controllers A50 and B50.

(Embodiment 4)

Conventionally, an illumination apparatus that simulates natural light has been known. As an example of such kind of illumination apparatuses, Japanese Unexamined Patent Application Publication No. 2015-207554 discloses an illumination apparatus including a light source that emits non-diffusing light having directivity, a light diffuser (a diffuser panel) that diffuses light, and an inner wall surface (a side wall) that is irradiated with light. This illumination apparatus irradiates the inner wall surface with light by diffusing, using the light diffuser, the non-diffusing light emitted from the light source, and partially transmitting the non-diffusing light without diffusion.

For example, with a skylight, which is a window placed at a position deeper than a ceiling that is a part of a building, an inner wall surface is formed to connect the ceiling surface and the window in the direction intersecting the ceiling surface. In general, the look of the sky etc. seen through the skylight does not appear on the inner wall surface since natural light enters through the skylight. The illumination apparatus disclosed in Japanese Unexamined Patent Application Publication No. 2015-207554, however, emits artificial light, and thus, when, for example, light having a color is projected on the light diffuser, the inner wall surface is also irradiated with the light having the color. As a result, a user of the illumination apparatus may feel strange.

In view of the above, Embodiment 4 has an object to reduce a feeling of strangeness generated due to light irradiation of an inner wall surface of a part of a building or an inner wall surface of an illumination apparatus.

[Configuration of Illumination Apparatus]

First, a schematic configuration of illumination apparatus D1 according to Embodiment 4 will be described.

Figure 35:
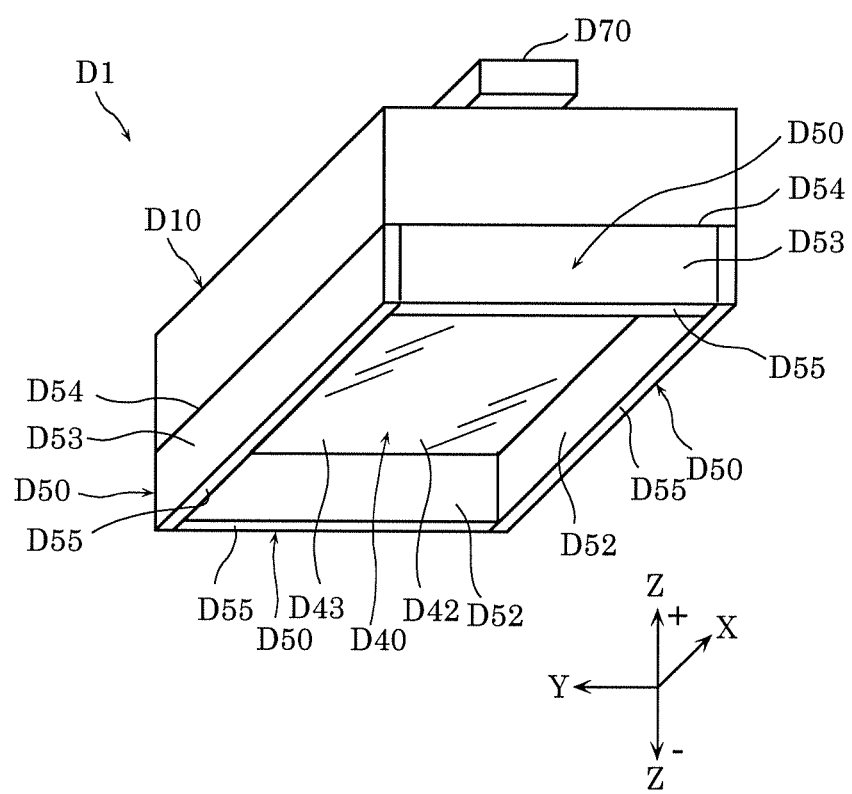
FIG. 35 is a perspective view illustrating an exterior appearance of an illumination apparatus according to Embodiment 4.
Figure 36:
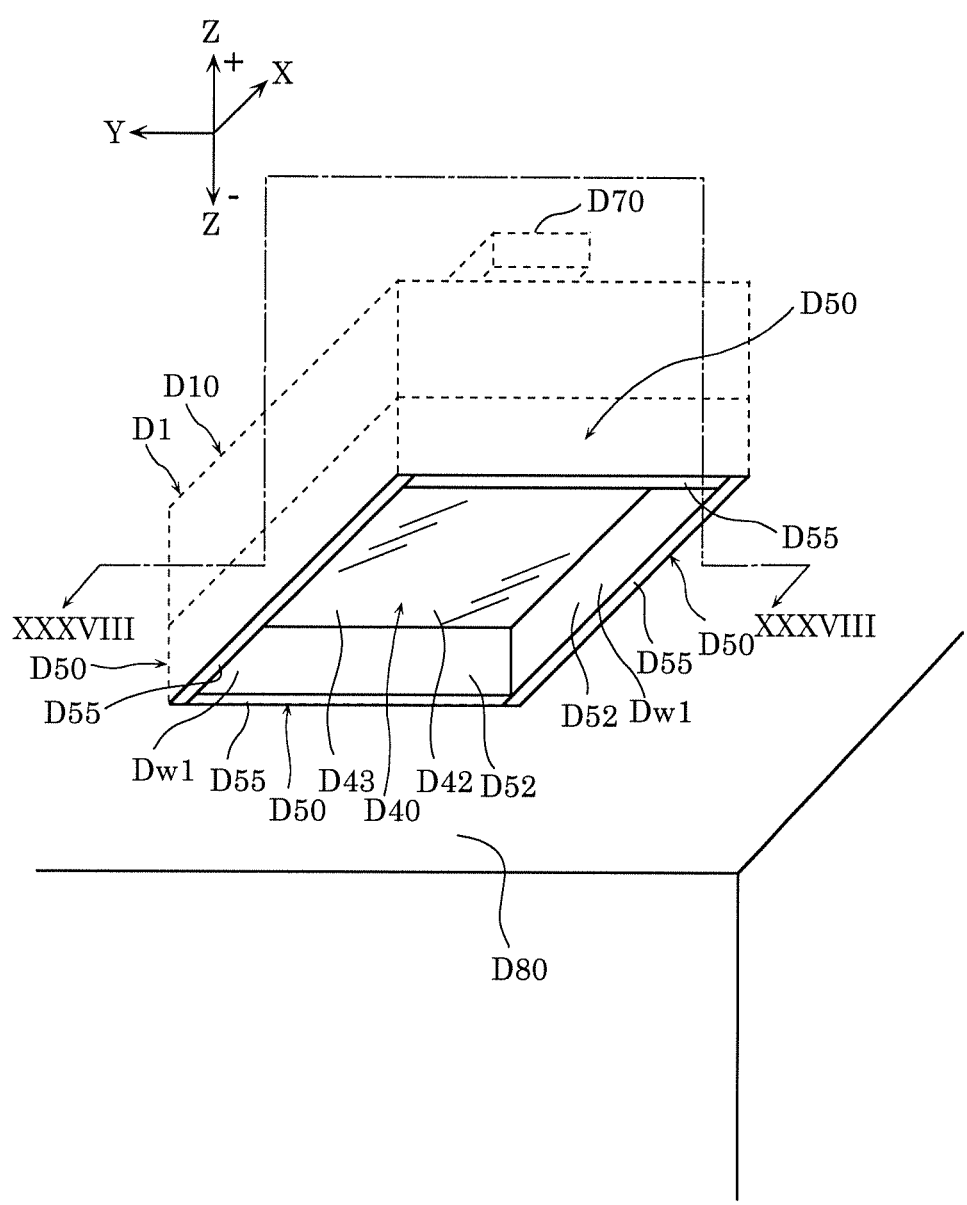
FIG. 36 illustrates the illumination apparatus according to Embodiment 4 installed in a ceiling.
Figure 37:
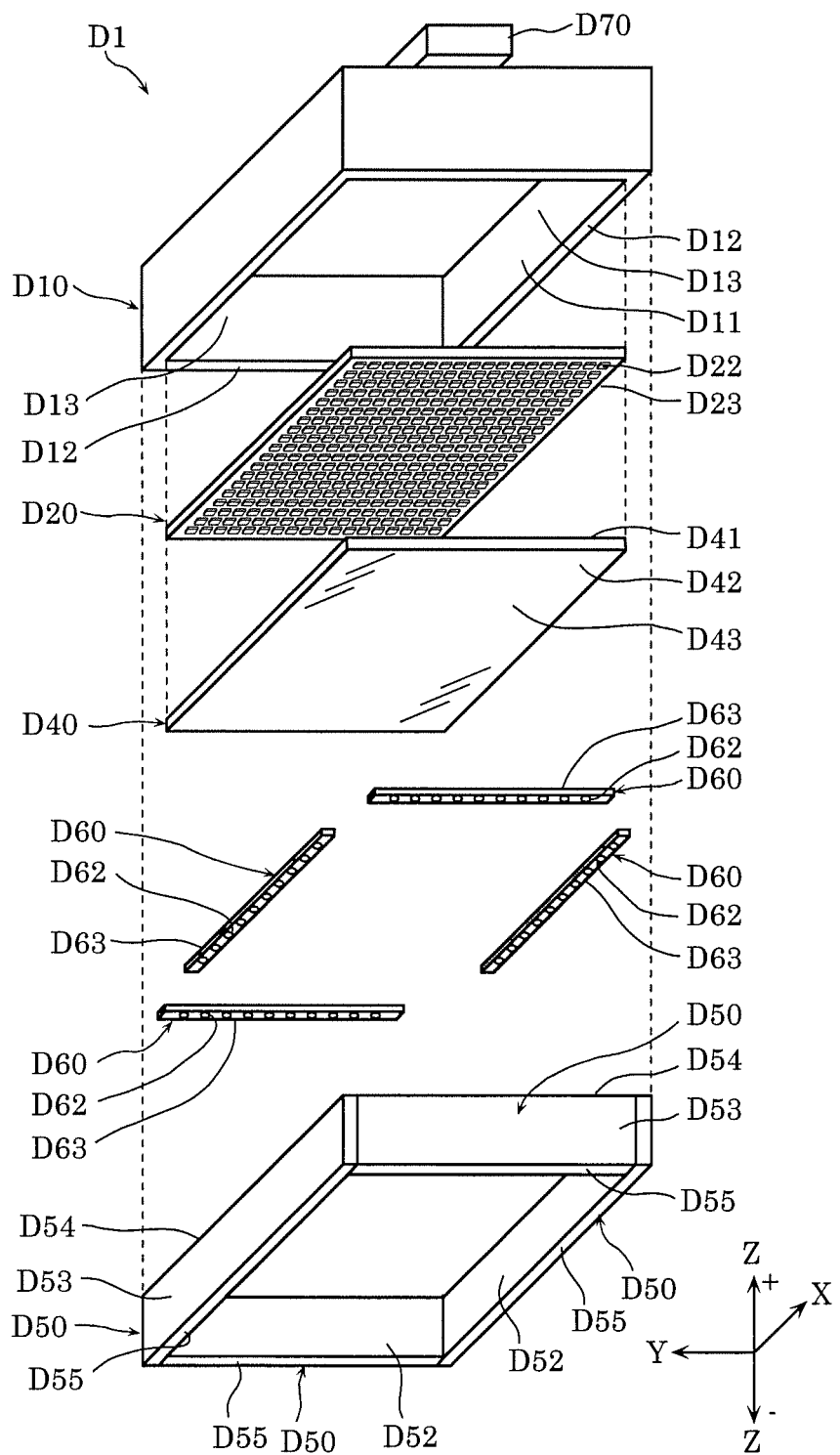
FIG. 37 is an exploded perspective view of portions of the illumination apparatus according to Embodiment 4.
Figure 38:
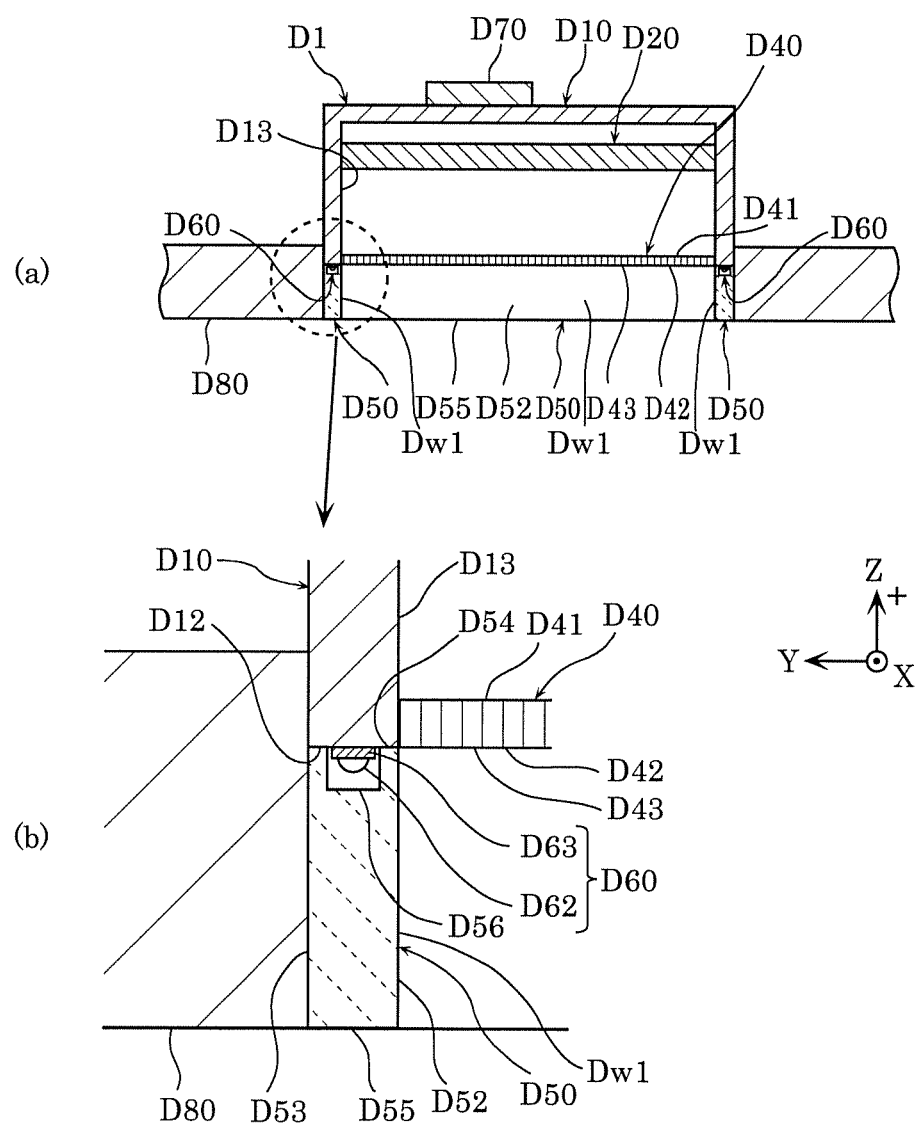
FIG. 38 is a cross sectional view of the illumination apparatus illustrated in FIG. 36, taken along line XXXVIII-XXXVIII.

FIG. 35 is a perspective view illustrating an exterior appearance of illumination apparatus D1. FIG. 36 is a perspective view illustrating illumination apparatus D1 installed in ceiling D80. FIG. 37 is an exploded perspective view of portions of illumination apparatus D1. FIG. 38 is a cross sectional view of the illumination apparatus illustrated in FIG. 36, taken along line XXXVIII-XXXVIII.

Illumination apparatus D1 provides a user with a realistic feeling of looking at the sky through a window from indoors. As illustrated in FIG. 36, for example, illumination apparatus D1 is installed in ceiling D80 etc., that is an example of a part of a building, and projects light simulating a natural sky, such as a blue sky or a sunset, on light diffuser D40.

In the case of installing illumination apparatus D1 in ceiling D80, light diffuser D40 is disposed at a position deeper than the ceiling surface, and thus, inner wall surface Dw1 connecting the ceiling surface and light diffuser D40 in the direction intersecting the ceiling surface is formed between the ceiling surface and light diffuser D40. Illumination apparatus D1 according to Embodiment 4 includes light emission component D50 at a position corresponding to inner wall surface Dw1 and causes light emission component D50 to radiate light, thus inhibiting light from light diffuser D40 from appearing on inner wall surface Dw1, that is, light emission component D50.

Hereinafter, each structural element of illumination apparatus D1 will be described.

As illustrated in FIG. 35 to FIG. 37, illumination apparatus D1 includes case D10, first light source D20, light diffuser D40, light emission component D50, second light source D60, and controller D70.

Case D10 can be configured in the same manner as cases A10, B10, and C10. First light source D20 can be configured in the same manner as light-emitting modules A20, B20, and C21. Light diffuser D40 can be configured in the same manner as light diffusers A10, B30, and C30.

Case D10 has a rectangular parallelepiped shape, and is approximately rectangular in a plan view. Case D10 houses first light source D20 and light diffuser D40. Case D10 has rectangular opening portion D11 on the floor surface side (on the Z axis negative side). Light diffuser D40 is disposed in opening portion D11 of case D10. Light emission component D50 and second light source D60 are disposed on the floor surface side of case D10. Controller D70 is disposed outside case D10. Note that controller D70 may be housed in case D10.

Case D10 includes, for example, a metal material or a non-metal material having excellent thermal conductive properties. An example of the non-metal material having excellent thermal conductive properties is a resin having a high thermal conductivity. The shape of case D10 is not limited to approximately rectangular, and may be, for example, approximately circular, approximately polygonal, or approximately semicircular.

First light source D20 is a light-emitting module including board D23 and a plurality of light-emitting elements D22 mounted on board D23. As controller D70 performs illumination control on the plurality of light-emitting elements D22, first light source D20 emits light having an image of a blue sky, for example.

Board D23 is a printed wiring board for mounting thereon the plurality of light-emitting elements D22, and is approximately rectangular in shape. For example, a resin board that mainly includes a resin, a metal-based board that mainly includes a metal, a ceramic board made of a ceramic, etc., can be used as board D23.

Each light-emitting element D22 includes light emitting diode (LED) elements. The plurality of light-emitting elements D22 are arranged in rows and columns at equal spaces on board D23. Each light-emitting element D22 is disposed on, of the two main surfaces of board D23, a main surface opposed to light diffuser D40. In other words, first light source D20 is disposed such that the plurality of light-emitting elements D22 face light diffuser D40.

Each light-emitting element D22 is an RGB element that emits blue light, green light, and red light, that is, light of three primary colors. Since each light-emitting element D22 is an RGB element, it is possible to emit light in various colors by controlling the emission of blue light, green light, and red light. Light-emitting elements D22 may be surface mount device (SMD) elements, or may be chip on board (COB) elements.

For example, light diffuser D40 is manufactured by performing diffusion treatment on a transparent plate including glass or a resin material such as transparent acrylic, a polycarbonate resin, or polyethylene terephthalate (PET). In the case of a resin material, the resin material may contain a material having light diffusion properties. The diffusion treatment is performed on at least one of light entrance surface D41 and light exit surface D42 of light diffuser D40. One example of the diffusion treatment is prism processing by which a prism including minute dot-shaped holes (recesses) is formed. The diffusion treatment is not limited to the prism processing, and may be performed by texturing or printing.

Light diffuser D40 is an optical member which transmits and diffuses light emitted from first light source D20, and from which the transmitted light and the diffused light exit toward the floor surface side. Specifically, light diffuser D40 receives, through light entrance surface D41, the light emitted from first light source D20, and transmits and diffuses the received light. The transmitted light and the diffused light exit from light diffuser D40 through light exit surface D42. Light diffuser D40 has, on light exit surface D42 side, rectangular light exit region D43 through which the diffused light exits.

Illumination apparatus D1 in Embodiment 4 adopts light diffuser D40 so that, when the user sees an image projected on illumination apparatus D1, the depth of the image appears easily. For example, light diffuser D40 located closer to the user allows the light emitted from light source D20 located farther from the user to exit in a blurred manner. With this, illumination apparatus D1 allows easy appearance of the depth of the projected image.

As illustrated in FIG. 38, light diffuser D40 is disposed such that an outer edge portion of light diffuser D40 is in contact with opening portion D11 of case D10 to block opening portion D11 of case D10. Further, light diffuser D40 is disposed at a position where light exit surface D42 and edge surface D12 of opening portion D11 are flush with each other so as not to expose inner surface D13 of case D10 from light exit surface D42 toward the floor surface. Note that light diffuser D40 may be attached to case D10 such that light exit surface D42 is located closer to the floor surface than edge surface D12 is.

As described above, light emission component D50 and second light source D60 are disposed on the floor surface side of case D10.

Second light source D60 is a light emission source that emits light toward light emission component D50 to cause light emission component D50 to radiate light. Second light source D60 is disposed on edge surface D12 of case D10. Second light source D60 is an LED line module including board D63 and a plurality of light-emitting elements D62 mounted on board D63.

Board D63 is a printed wiring board for mounting thereon the plurality of light-emitting elements D62. Board D63 is long and narrow, and approximately rectangular in shape. For example, a resin board that mainly includes a resin, a metal-based board that mainly includes a metal, a ceramic board made of a ceramic, etc., can be used as board D63.

Each light-emitting element D62 includes LED elements. The plurality of light-emitting elements D62 are arranged in a line at equal spaces on board D63. Second light source D60 is fixed to edge surface D12 of case D10 such that the plurality of light-emitting elements D62 face light emission component D50.

Each light-emitting element D62 is an RGB element that emits light of three primary colors. Since each light-emitting elements D62 is an RGB element, it is possible to emit light in various colors by controlling the emission of blue light, green light, and red light. Light-emitting elements D62 may be SMD elements, or may be COB elements.

Light emission component D50 is a light guide plate which is of an edge light type and has light emission surface D52 from which light is radiated. Light emission component D50 is disposed on light exit surface D42 side of light diffuser D40 in a direction orthogonal to light diffuser D40. Light emission component D50 is disposed outside light exit region D43 in a direction along light exit surface D42. Illumination apparatus D1 in Embodiment 4 includes four light emission components D50. Four light emission components D50 are disposed around rectangular light exit region D43 to correspond to the four sides of light exit region D43. Each light emission component D50 is disposed such that light emission surface D52 intersects light exit surface D42 of light diffuser D40 and faces the inside of light exit region D43 opposite the outside of light exit region D43.

Light emission component D50 includes: outer surface D53 opposite light emission surface D52; upper surface D54 located on the side where edge surface D12 of opening portion of case D10 is provided; and bottom surface D55 located on the floor surface side opposite the side where upper surface D54 is disposed. Recess D56 is formed in upper surface D54. Light emission component D50 is attached to edge surface D12 of case D10 with the above-described second light source housed in recess D56. Light emission component D50 is fixed to case D10 by adhesion or screwing, for example. Light emission component D50 receives, through upper surface D54, the light emitted from second light source D60, and radiates light from light emission surface D52 via the light guide plate.

Light emission component D50 is formed using, for example, a glass material or a resin material such as an acrylic or polycarbonate resin or PET. Light emission component D50 may be transparent or may be non-transparent. A matrix of recesses or projections may be formed in light emission surface D52 by printing etc.

Illumination apparatus D1 is installed in ceiling D80 such that bottom surface D55 of light emission component D50 is flush with (lies in the same surface as) the ceiling surface. Bottom surface D55 is formed in the same color as the color of the ceiling surface by attaching a cloth or by painting. Illumination apparatus D1 is installed such that outer surface D53 of light emission component D50 is in contact with the side surface of ceiling D80 where the opening is formed or that a space between outer surface D53 and the mentioned side surface is as small as possible. A reflection layer or a reflector that reflects the light received from second light source D60 and guides the light to light emission surface D52 may be formed in outer surface D53.

Figure 39:
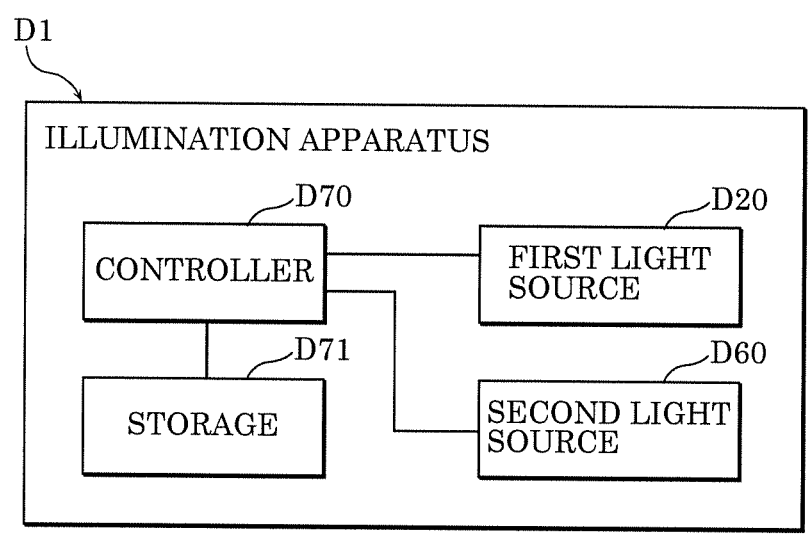
FIG. 39 is a block diagram illustrating a control configuration of the illumination apparatus according to Embodiment 4.

FIG. 39 is a block diagram illustrating a control configuration of illumination apparatus D1. Focusing on the control configuration of illumination apparatus D1, illumination apparatus D1 includes controller D70, storage D71, first light source D20, and second light source D60. Here, storage D71, first light source D20, and second light source D60 are connected to controller D70.

Controller D70 controls operations of first light source D20 and second light source D60, such as turning the light on, turning the light off, dimming, and toning (adjusting the color of light emitted or the color temperature). Controller D70 is realized by a microcomputer, a processor, or a specialized circuit, for example.

Controller D70 obtains information regarding an image stored in storage D71, and controls the light emission of first light source D20 according to the information. For example, when a blue sky is to be projected on light diffuser D40, controller D70 obtains information regarding a blue sky from storage D71, and controls the light emission of the plurality of light-emitting elements D22 based on the information obtained. In such a manner, by controlling the light emission of each light-emitting element D22 using controller D70, illumination apparatus D1 projects light having an image, such as an image of a blue sky, a white cloud, a cloudy sky, an evening sky, or a sunset, on light diffuser D40.

Meanwhile, controller D70 causes light emission component D50 to radiate light, in other words, causes second light source D60 to emit light such that the light projected on light diffuser D40 is inhibited from appearing on inner wall surface Dw1 (light emission surface D52) of illumination apparatus D1. When doing so, controller D70 controls second light source D60 such that light emission component D50 radiates light in the same color as the color of ceiling D80 in which illumination apparatus D1 is installed.

Figure 40:
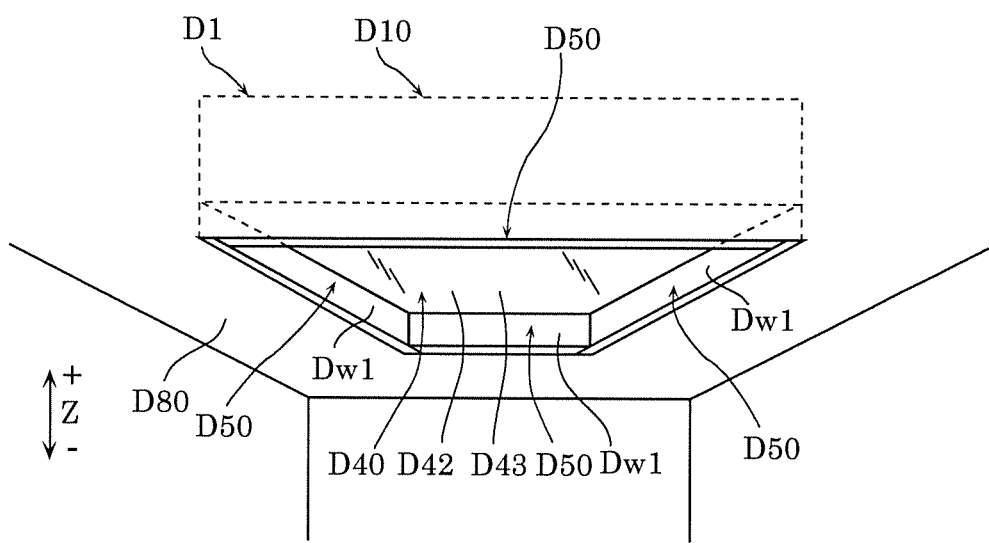
FIG. 40 illustrates an example of a light emission state of the illumination apparatus according to Embodiment 4.

FIG. 40 illustrates an example of a light emission state of illumination apparatus D1. For example, when the color of ceiling D80 is white, controller D70 controls the light emission of second light source D60 such that light emission component D50 radiates white light. Alternatively, controller D70 controls the light emission of second light source D60 according to the color of the light projected on light diffuser D40 such that the color of inner wall surface Dw1 becomes the same as the color of the surroundings such as ceiling D80 as a result. Such control reduces the feeling of strangeness generated due to inner wall surface Dw1 of illumination apparatus D1 being irradiated with the light from light diffuser D40.

[Advantageous Effects Etc.]

Illumination apparatus D1 according to Embodiment 4 includes: case D10 having opening portion D11; first light source D20 disposed in case D10 and including a plurality of light-emitting elements D22; light diffuser D40 which is disposed in opening portion D11, diffuses and transmits light emitted from first light source D20, and from which the light diffused and the light transmitted exit; light emission component D50 disposed outside light exit region D43 of light diffuser D40 on light exit surface D42 side of light diffuser D40; and second light source D60 that emits light to light emission component D50 to cause light emission component D50 to radiate light.

As described above, disposing light emission component D50 outside light exit region D43 of light diffuser D40 makes it possible to form, in a surface of light emission component D50, inner wall surface Dw1 connecting the ceiling surface and light diffuser D40, for example. According to this configuration, even when inner wall surface Dw1, that is, a surface of light emission component D50, is irradiated with the light exiting from light diffuser D40, it is possible to reduce the influence of the light from light diffuser D40 and the user's feeling of strangeness by causing light emission component D50 to radiate light.

Light emission component D50 may be disposed around light exit region D43.

With this, even when inner wall surface Dw1 is viewed from various directions, it is possible to reduce the influence of the light from light diffuser D40 and the user's feeling of strangeness by causing light emission component D50, that forms inner wall surface Dw1, to radiate light.

Light emission component D50 may be a light guide plate having light emission surface D52.

By using a light guide plate as light emission component D50 as described above, light emission component D50 can be thinner and illumination apparatus D1 can be smaller in size.

Light emission component D50 may be disposed such that light emission surface D52 intersects light exit surface D42 of light diffuser D40 and faces an inside of light exit region D43 opposite an outside of light exit region D43.

With this, the light from light emission component D50 can exit through the inner surface (light emission surface D52) irradiated with the light from light diffuser D40, and it is possible to efficiently reduce the influence of the light from light diffuser D40 and reduce the user's feeling of strangeness.

Second light source D60 may include light-emitting element D62 that emits light of three primary colors.

With this, for example, second light source D60 can emit light in a color that is the same as or similar to the color of a part of a building such as ceiling D80, and it is possible to form inner wall surface Dw1 natural to the user. Further, for example, second light source D60 can emit light according to the color of light from light diffuser D40, and it is possible to efficiently reduce the influence of the light from light diffuser D40 and reduce the user's feeling of strangeness.

Illumination apparatus D1 may further include controller D70 that controls light emission of first light source D20 and light emission of second light source D60.

With this, it is possible to change the light projected on light diffuser D40 using first light source D20 and change the light radiated from light emission component D50 using second light source D60. As a result, for example, even when the image or color of the light projected on light diffuser D40 changes, it is possible to reduce the influence of the light from light diffuser D40 and the user's feeling of strangeness by causing light emission component D50 to radiate light according to the change.

[Examples 1 and 2 of Light Emission State of Illumination Apparatus]

Next, other examples (Examples 1 and 2) of the light emission state of illumination apparatus D1 will be described with reference to FIG. 41 and FIG. 42. The configuration of illumination apparatus D1 is the same as that of illumination apparatus D1 according to Embodiment 4 described above, and thus the description will be omitted. Here, other examples of the light emission state of illumination apparatus D1 will be described.

Figure 41:
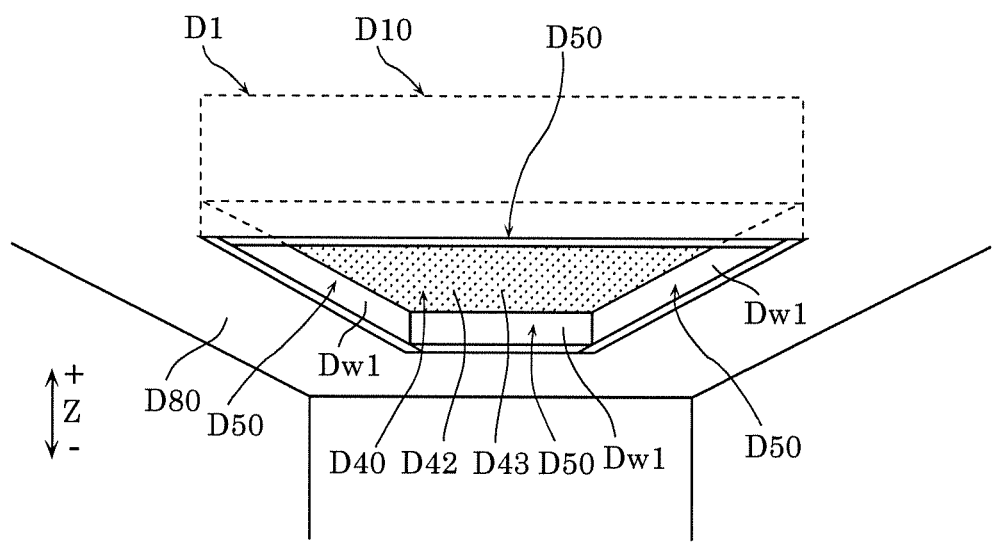
FIG. 41 illustrates Example 1 of the light emission state of the illumination apparatus according to Embodiment 4.

FIG. 41 illustrates Example 1 of the light emission state of illumination apparatus D1.

First, controller D70 obtains an image dependent on a time of day from storage D71, and displays the image on light diffuser D40. For example, when the time of day during which illumination apparatus D1 is used is 8:00 am-4:00 pm, controller D70 obtains an image of the daytime stored in storage D71, e.g., an image including a blue sky, and causes the plurality of light-emitting elements D22 to emit light based on the image. Note that the image may be a plain image.

Meanwhile, when the color of the light projected on light diffuser D40 as described above is blue, controller D70 causes light emission component D50 to radiate light having a color temperature (for example, at least 5000 K and at most 7000 K) lower than the color temperature of blue light (for example, at least 10000 K and at most 15000 K).

In FIG. 41, light diffuser D40 is illustrated in light shading and is colored in blue. In contrast, inner wall surface Dw1 is in a color substantially the same as the color of ceiling D80 as a result of light emission component D50 radiating light having a color temperature lower than the color temperature of blue light. With controller D70 controlling the color temperature of the light from light emission component D50 in this manner, the light from light diffuser D40 is inhibited from appearing on inner wall surface Dw1.

Figure 42:
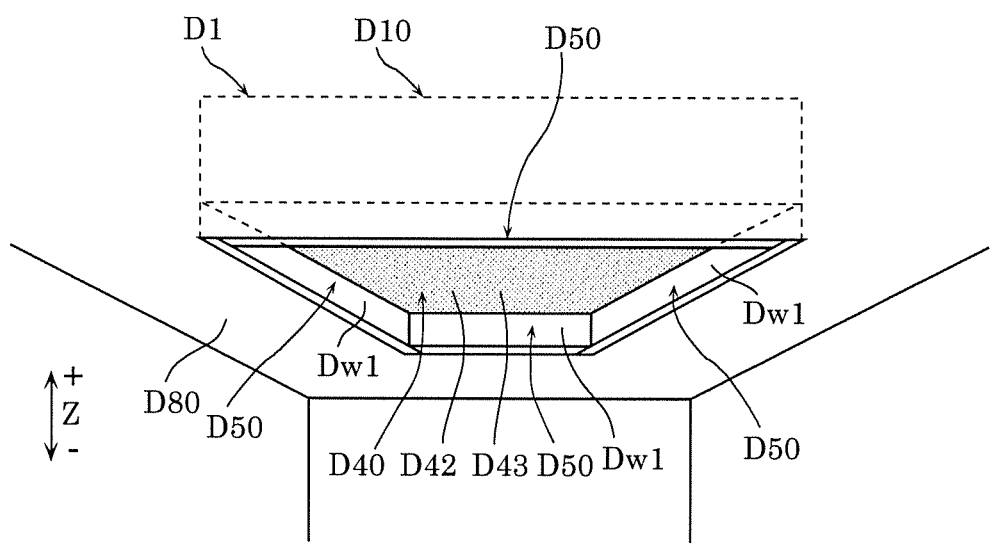
FIG. 42 illustrates Example 2 of the light emission state of the illumination apparatus according to Embodiment 4.

FIG. 42 illustrates Example 2 of the light emission state of illumination apparatus D1.

First, controller D70 obtains an image dependent on a time of day from storage D71, and displays the image on light diffuser D40. For example, when the time of day at which illumination apparatus D1 is used is 6:00 pm, controller D70 obtains an image including an evening sky stored in storage D71, and causes the plurality of light-emitting elements D22 to emit light based on the image.

Meanwhile, when the color of the light projected on light diffuser D40 as described above is orange, controller D70 causes light emission component D50 to radiate light having a color temperature (for example, at least 5000 K and at most 7000 K) higher than the color temperature of orange light (for example, at least 2000 K and at most 3000 K).

In FIG. 42, light diffuser D40 is illustrated in dark shading and is colored in orange. In contrast, inner wall surface Dw1 is in a color substantially the same as the color of ceiling D80 as a result of light emission component D50 radiating light having a color temperature higher than the color temperature of orange light. With controller D70 controlling the color temperature of the light from light emission component D50 in this manner, the light from light diffuser D40 is inhibited from appearing on inner wall surface Dw1.

With illumination apparatus D1 according to Examples 1 and 2 of Embodiment 4, controller D70 controls the light emission of second light source D60 such that the color temperature of the light radiated from light emission component D50 is different from the color temperature of the light exiting from light diffuser D40. With this, light emission component D50, that is inner wall surface Dw1, can be brought into a state closer to the state of being irradiated with natural light, and it is thus possible to reduce the user's feeling of strangeness.

[Example 3 of Light Emission State of Illumination Apparatus]

Next, Example 3 of the light emission state of illumination apparatus D1 will be described with reference to FIG. 43.

Figure 43:
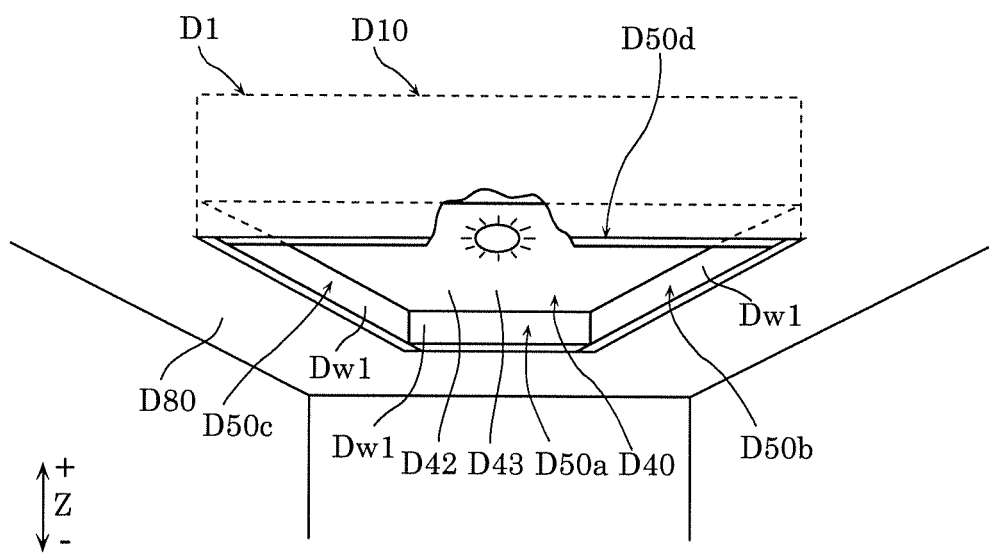
FIG. 43 illustrates Example 3 of the light emission state of the illumination apparatus according to Embodiment 4.

FIG. 43 illustrates Example 3 of the light emission state of illumination apparatus D1. Although the configuration of illumination apparatus D1 in Example 3 is the same as that of illumination apparatus D1 in Embodiment 4 described above, at least two light emission components D50 among four light emission components D50a, D50b, D50c, and D50d radiate light in different brightness or in different colors.

First, controller D70 obtains an image dependent on a time of day from storage D71, and displays the image on light diffuser D40. For example, when the time of day at which illumination apparatus D1 is used is 8:00 am, controller D70 obtains an image including a sunrise stored in storage D71, and causes the plurality of light-emitting elements D22 to emit light based on the image.

Meanwhile, when the sunrise projected on light diffuser D40 as described above is located at a position which is, in light exit surface D42 of light diffuser D40, closer to light emission component D50d, controller D70 controls the light emission of light emission component D50a opposed to light emission component D50d such that the sunrise less easily appears on light emission component D50a. Further, dimming control or toning control is performed on light emission components D50b, D50c, and D50d such that they do not radiate light or that the sunrise less easily appears on them.

Furthermore, when the time of day at which illumination apparatus D1 is used is 6:00 pm, controller D70 obtains an image of an evening stored in storage D71, and causes the plurality of light-emitting elements D22 to emit light based on the image.

Meanwhile, when a sunset projected on light diffuser D40 as described above is located at a position which is, in light exit surface D42 of light diffuser D40, closer to light emission component D50a (not illustrated), controller D70 controls the light emission of light emission component D50d opposed to light emission component D50a such that the sunset less easily appears on light emission component D50d. Further, dimming control or toning control is performed on light emission components D50a, D50b, and D50c such that they do not radiate light or that the sunset less easily appears on them.

In illumination apparatus D1 according to Example 3 of Embodiment 4, a plurality of light emission components D50a to D50d, each being light emission component D50, are provided, and the plurality of light emission components D50a to D50d include a first light emission component (e.g., D50a) and a second light emission component (e.g., D50b). A plurality of second light sources D60, each being second light source D60, are also provided, and the plurality of second light sources D60 include a first-second light source corresponding to the first emission component and a second-second light source corresponding to the second emission component. Controller D70 controls the light emission of the first-second and second-second light sources such that a light emission state of the first light emission component is different from a light emission state of the second light emission component.

With this, light emission components D50a to D50d that make up inner wall surface Dw1 can be brought into a state closer to the state of being irradiated with natural light, and it is thus possible to reduce the user's feeling of strangeness.

[Variation 8]

Next, illumination system D2 according to a variation of Embodiment 4 (Variation 8) will be described. In illumination system D2, light emission component D50 and second light source D60 illustrated in Embodiment 4 are disposed not in illumination apparatus D1 but in a part of a building such as ceiling D80.

Figure 44:
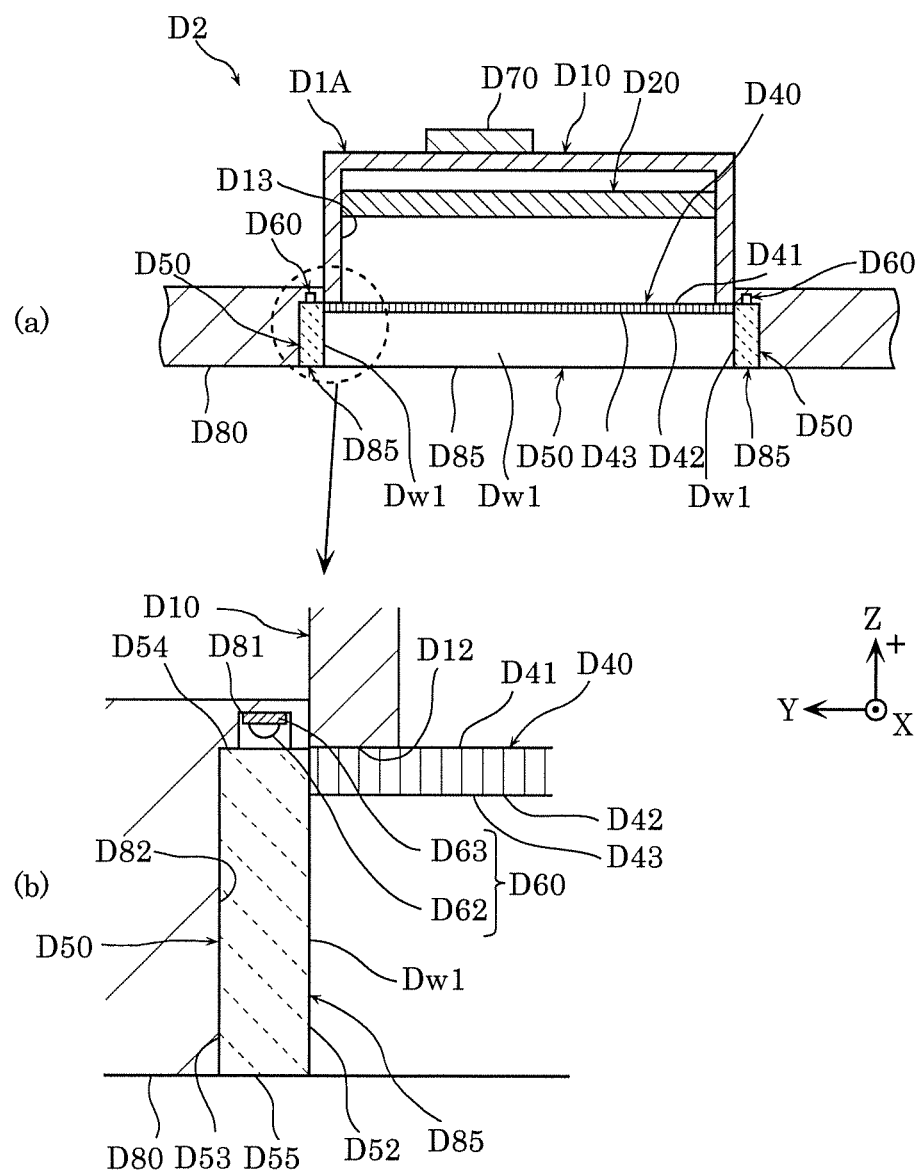
FIG. 44 is a cross sectional view of an illumination system according to Variation 8.
Figure 45:
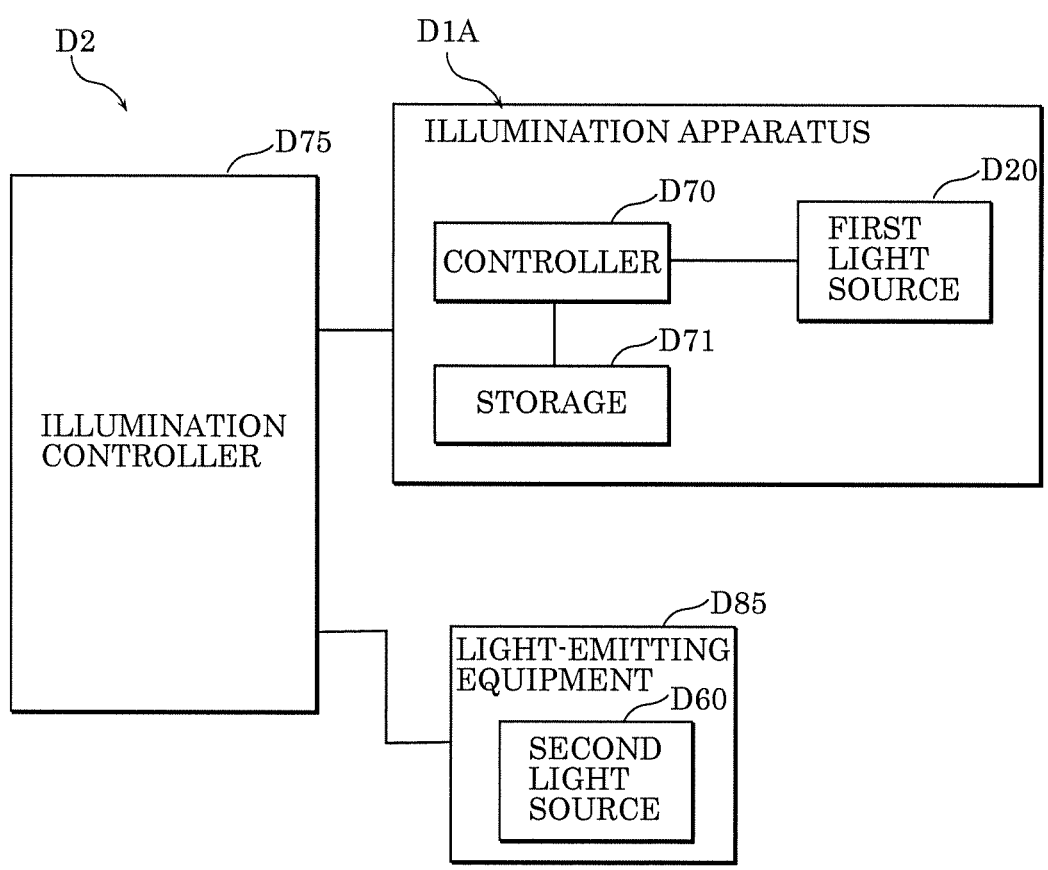
FIG. 45 is a block diagram illustrating a control configuration of the illumination system according to Variation 8.

FIG. 44 is a cross sectional view of illumination system D2. FIG. 45 is a block diagram illustrating a control configuration of illumination system D2.

As illustrated in FIG. 44 and FIG. 45, illumination system D2 includes: illumination apparatus D1A including case D10, first light source D20, and light diffuser D40; light-emitting equipment D85 including light emission component D50 and second light source D60; and illumination controller D75.

Note that illumination apparatus D1A of illumination system D2 is different from the illumination apparatus according to Embodiment 4 in that light entrance surface D41 of light diffuser D40 is in contact with edge surface D12 of case D10. Other than that, the configurations of case D10, first light source D20, and light diffuser D40 are substantially the same as those of illumination apparatus D1 described in Embodiment 4, and thus, the descriptions will be omitted.

In the present variation, light emission component D50 and second light source D60 included in light-emitting equipment D85 are disposed in ceiling D80 that is an example of a part of a building.

Second light source D60 is a light emission source that emits light toward light emission component D50 to cause light emission component D50 to radiate light. Second light source D60 is disposed in recess D81 of ceiling D80. Second light source D60 is an LED line module including board D63 and a plurality of light-emitting elements D62 mounted on board D63.

Each light-emitting element D62 is an RGB-type element that emits light of three primary colors. The plurality of light-emitting elements D62 are arranged in a line at equal spaces on board D63. Second light source D60 is fixed to ceiling D80 such that the plurality of light-emitting elements D62 face upper surface D54 of light emission component D50.

Light emission component D50 is a light guide plate having light emission surface D52. Light emission component D50 is disposed in ceiling D80 such that light emission component D50 is disposed on light exit surface D42 side of light diffuser D40 and located outside light exit region D43. Illumination system D2 includes four light emission components D50. Four light emission components D50 are disposed around rectangular light exit region D43. Each light emission component D50 is disposed such that light emission surface D52 intersects light exit surface D42 of light diffuser D40 and faces the inside of light exit region D43 opposite the outside of light exit region D43.

Light emission component D50 includes: outer surface D53 opposite light emission surface D52; upper surface D54 located on recess D81 side of ceiling D80; and bottom surface D55 located on the floor surface side opposite the side where upper surface D54 is disposed.

Light emission component D50 is attached to ceiling D80 in a state of being in contact with notch D82 formed in ceiling D80. Light emission component D50 is fixed to ceiling D80 by fitting or screwing, for example. Light emission component D50 receives, through upper surface D54, the light emitted from second light source D60, and radiates light from light emission surface D52 via the light guide plate.

Light-emitting equipment D85 is installed in ceiling D80 such that bottom surface D55 of light emission component D50 is flush with (lies in the same surface as) the ceiling surface. Bottom surface D55 is formed in the same color as the color of the ceiling surface by attaching a cloth or by painting. Light-emitting equipment D85 is installed such that outer surface D53 of light emission component D50 is in contact with the side surface of ceiling D80 or that a space between outer surface D53 and the side surface of ceiling D80 is small. A reflection layer or a reflector for reflecting the light received from second light source D60 and guiding the light to light emission surface D52 is formed in outer surface D53. Light-emitting equipment D85 can be also referred to as a luminaire or an illumination apparatus.

As illustrated in FIG. 45, focusing on the control configuration, illumination system D2 includes illumination controller D75, illumination apparatus D1A, and light-emitting equipment D85. Illumination apparatus D1A includes controller D70, storage D71, and first light source D20. Here, storage D71 and first light source D20 are connected to controller D70. Light-emitting equipment D85 includes second light source D60.

Illumination controller D75 controls operations of first light source D20 and second light source D60, such as turning the light on, turning the light off, dimming, and toning. Illumination controller D75 is realized by a microcomputer, a processor, or a specialized circuit, for example.

Illumination controller D75 obtains information regarding an image stored in storage D71 of illumination apparatus D1A, and controls the light emission of first light source D20 via controller D70. For example, when a blue sky is to be projected on light diffuser D40, illumination controller D75 obtains information regarding a blue sky from storage D71, and controls the light emission of the plurality of light-emitting elements D22 based on the information obtained. In such a manner, by controlling the light emission of each light-emitting element D22 using illumination controller D75, illumination system D2 projects light having an image such as an image of a blue sky, a white cloud, a cloudy sky, an evening sky, or a sunset, on light diffuser D40.

Meanwhile, illumination controller D75 causes light emission component D50 to radiate light, in other words, causes second light source D60 to emit light such that the light projected on light diffuser D40 is inhibited from appearing on inner wall surface Dw1 of illumination apparatus D1A (light emission surface D52). Further, illumination controller D75 controls second light source D60 such that light emission component D50 radiates light having the same color as the color of ceiling D80.

When the color of ceiling D80 is beige, for example, illumination controller D75 controls the light emission of second light source D60 such that light emission component D50 radiates beige light. Alternatively, illumination controller D75 controls the light emission of second light source D60 according to the color of the light projected on light diffuser D40 such that the color of inner wall surface Dw1 becomes the same as the color of the surroundings such as ceiling D80 as a result. Such control reduces the feeling of strangeness generated due to light irradiation of inner wall surface Dw1 of illumination system D2.

Illumination system D2 according to the present variation includes: illumination apparatus D1A including case D10 having opening portion D11, first light source D20 disposed in case D10 and including a plurality of light-emitting elements D22, and light diffuser D40 which is disposed in opening portion D11, diffuses and transmits light emitted from first light source D20, and from which the light diffused and the light transmitted exit; light-emitting equipment D85 including light emission component D50 disposed outside light exit region D43 of light diffuser D40 on light exit surface D42 side of light diffuser D40, and second light source D60 that emits light to light emission component D50 to cause light emission component D50 to radiate light; and illumination controller D75 that controls light emission of first light source D20 and light emission of second light source D60.

As described above, disposing light emission component D50 outside light exit region D43 of light diffuser D40 makes it possible to form, in a surface of light emission component D50, inner wall surface Dw1 connecting the ceiling surface and light diffuser D40, for example. According to this configuration, even when inner wall surface Dw1, that is, a surface of light emission component D50, is irradiated with the light exiting from light diffuser D40, it is possible to reduce the influence of the light from light diffuser D40 and the user's feeling of strangeness by causing light emission component D50 to emit light.

[Other Variations of Embodiment 4]

Hereinbefore, the present disclosure has been described based on Embodiment 4; however, the present disclosure is not limited to Embodiment 4.

Figure 46:
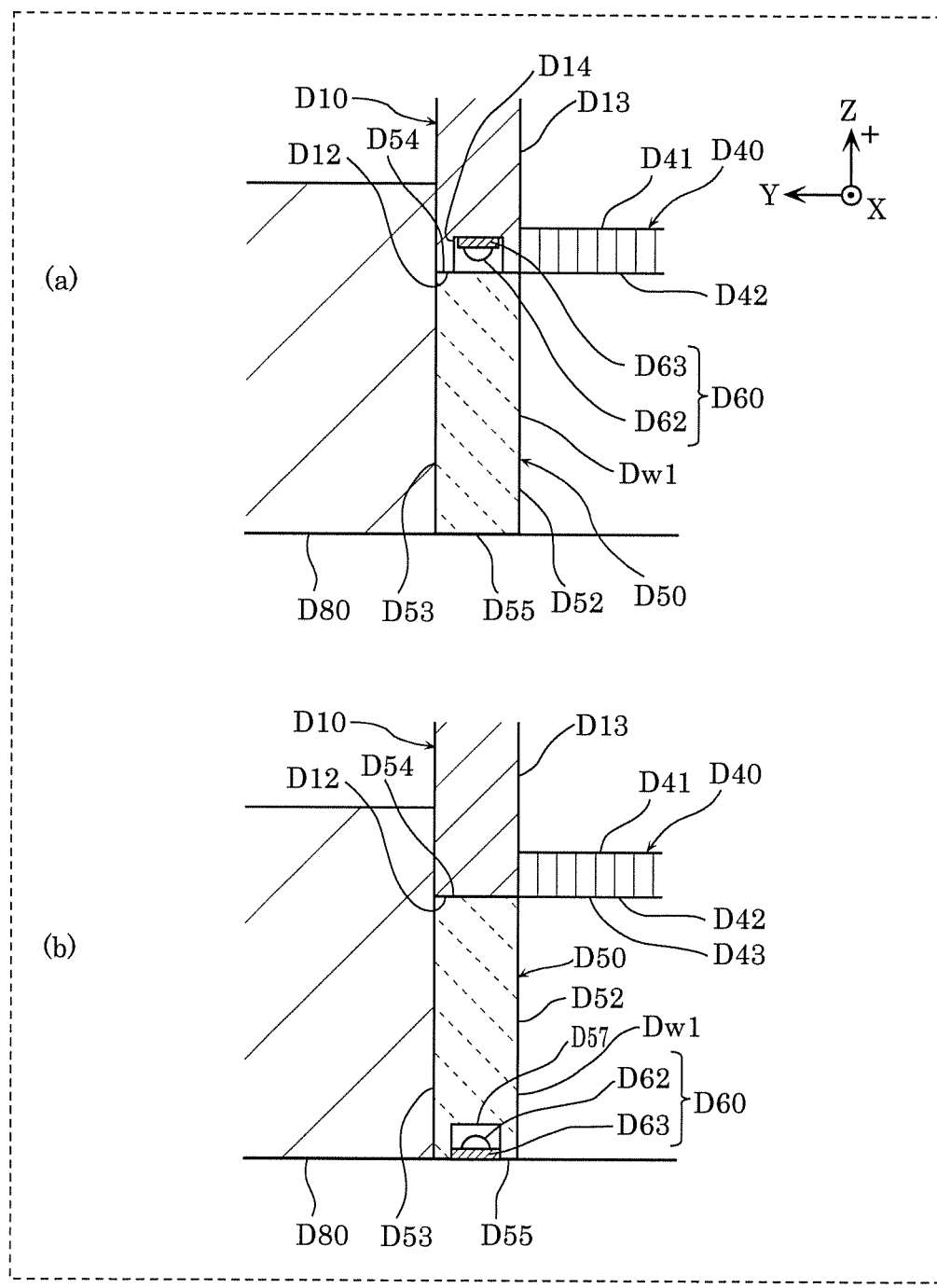
FIG. 46 is a cross sectional view illustrating examples of a light emission component of an illumination apparatus according to other variations according to Embodiment 4.

Although, in Embodiment 4, recess D56 is formed in upper surface D54 of light emission component D50 and second light source D60 is housed in recess D56, the position in which second light source D60 is housed is not limited to upper surface D54 of light emission component D50. For example, as illustrated in (a) of FIG. 46, recess D14 may be formed in edge surface D12 of case D10, and second light source D60 may be housed in recess D14. Further, as illustrated in (b) of FIG. 46, recess D57 may be formed in bottom surface D55 of light emission component D50, and second light source D60 may be housed in recess D57.

Although Embodiment 4 has presented the example where an image of a blue sky is projected on light diffuser D40, the image is not limited to this. For example, the image may be an image of a blue sky with a white cloud or an image of an evening sky with a sunset. Moreover, the image may be video showing a white cloud moving in a blue sky or video showing the sun setting in an evening sky. Even in this case, by controlling the light emission of light emission component D50 using controller D70, it is possible to reduce generation of the feeling of strangeness caused by the appearance, on inner wall surface Dw1, of an image displayed on light diffuser D40.

Although Embodiment 4 etc. have illustrated the example where illumination apparatuses D1 and D1A are recessed in ceiling D80, the present disclosure is not limited to this. For example, illumination apparatuses D1 and D1A may be recessed in a wall, that is a type of a part of a building.

Although Embodiment 4 etc. have illustrated the example where four light emission components D50 surround light exit region D43, the shape of light emission component D50 is not limited to a plate shape. The shape of light emission component D50 may be a frame shape or a tubular shape.

Although Embodiment 4 etc. have illustrated the example where a light guide plate of an edge light type is used as light emission component D50, light emission component D50 is not limited to this. Light emission component D50 may be a luminaire of internal illumination. Further, second light source D60 need not be disposed in the vicinity of light emission component D50, and may be disposed away from light emission component D50 and emit light to light emission component D50 via an optical fiber etc.

Although Embodiment 4 has presented the example where one light diffuser D40 is used, the number of light diffusers is not limited to one, and a plurality of light diffusers may be used. Specifically, another light diffuser may be inserted between light diffuser D40 and light source D20 to further diffuse the light.

For example, illumination apparatus D1 according to Embodiment 4 includes case D10 having opening portion D11; first light source D20 disposed in case D10 and including a plurality of light-emitting elements D22; light diffuser D40 which is disposed in opening portion D11, diffuses and transmits light emitted from first light source D20, and from which the light diffused and the light transmitted exit; and light emission component D50 disposed outside light exit region D43 of light diffuser D40 on light exit surface D42 side of light diffuser D40.

Figure 47:
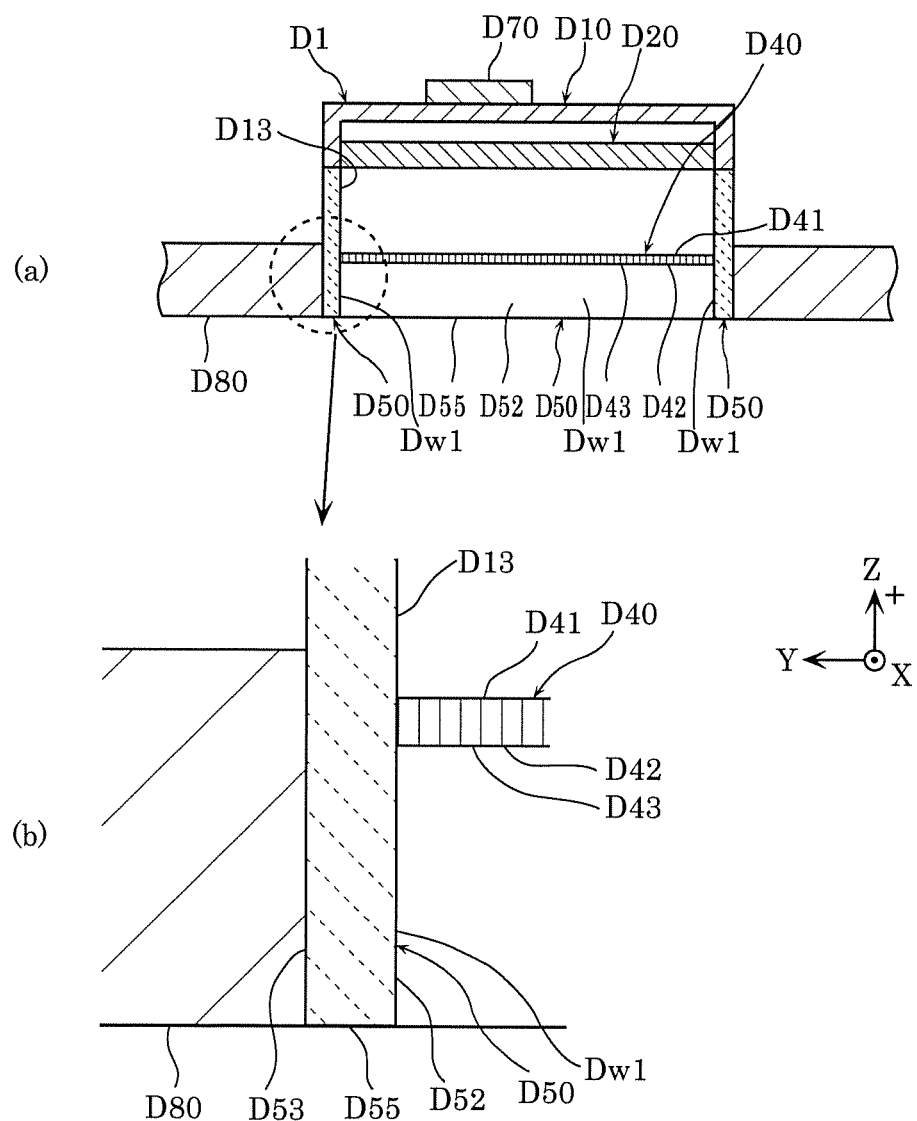
FIG. 47 is a cross sectional view of an illumination apparatus according to another variation according to Embodiment 4.
Figure 48:
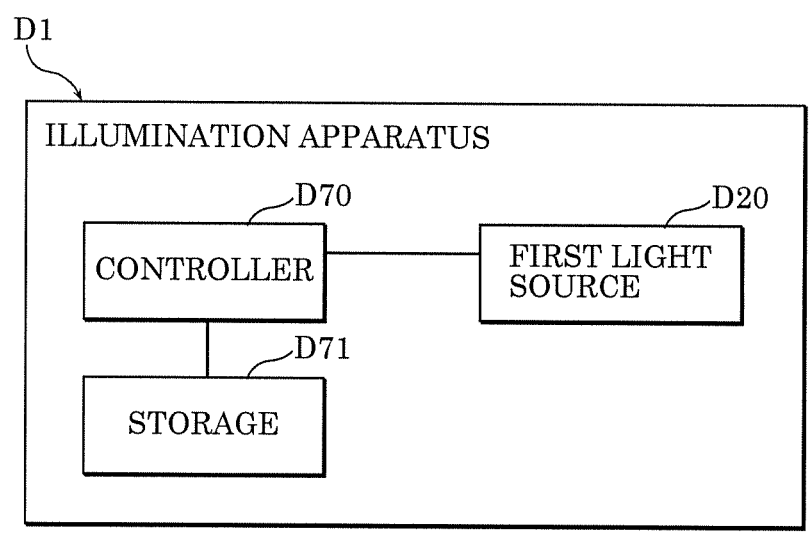
FIG. 48 is a block diagram illustrating a control configuration of the illumination apparatus according to another variation according to Embodiment 4.
Figure 49:
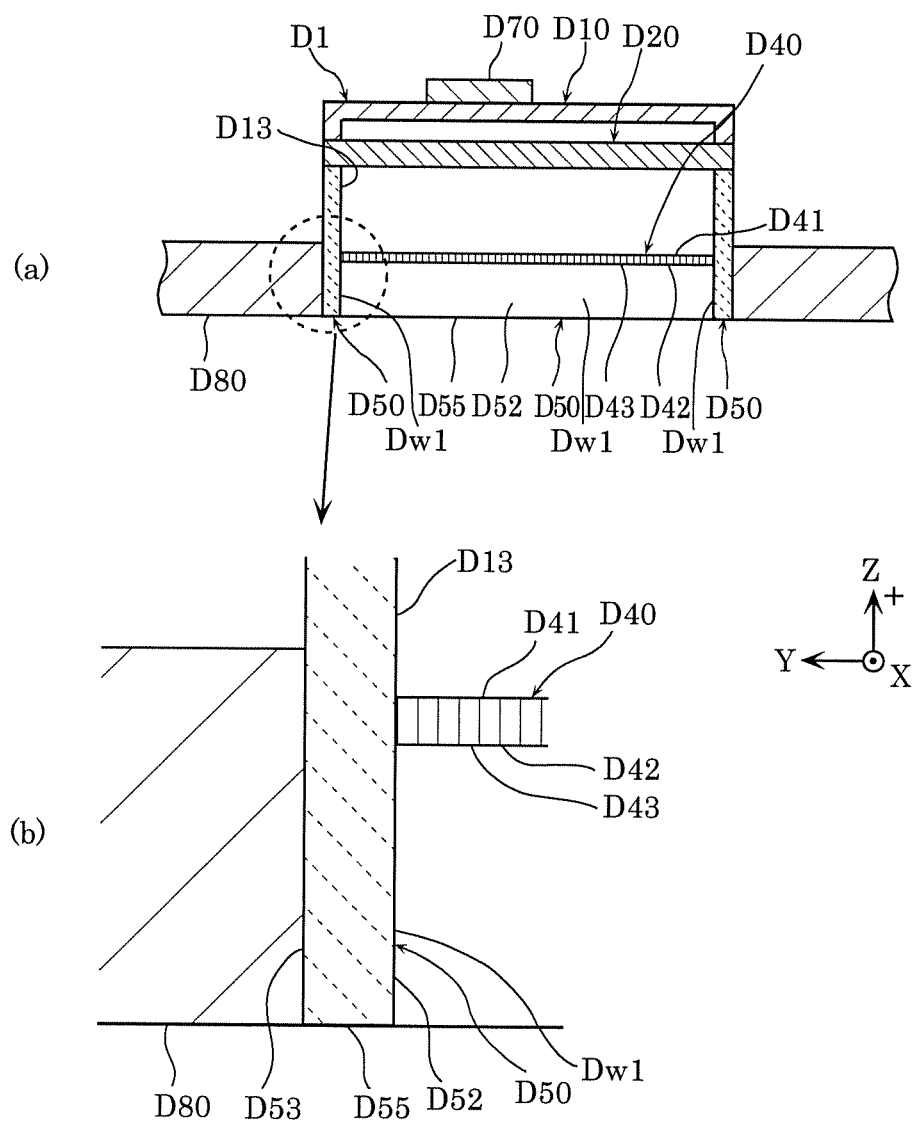
FIG. 49 is a cross sectional view of an illumination apparatus according to another variation according to Embodiment 4.

For example, as illustrated in FIG. 47, FIG. 48, and FIG. 49, part of the plurality of light-emitting elements D22 included in first light source D20 may emit light to light emission component D50.

For example, light exit region D43 may be rectangular, and light emission component D50 may be disposed around four sides of light exit region D43.

For example, light emission component D50 may be a light guide plate having light emission surface D52, and light emission surface D52 may be orthogonal to light exit surface D42 of light diffuser D40.

Controller D70 may have the functions of at least one of controllers A50, B50, and C50.

(Embodiment 5)

Conventionally, an illumination apparatus is disclosed that includes: a display unit (a liquid crystal display) that displays an image; a light-emitting unit (a backlight) that emits outgoing light to an illumination region; and an image generation unit that generates an image (see, for example, Japanese Unexamined Patent Application Publication No. 2013-92616). This illumination apparatus creates (reproduces) a lighting environment into which light streams, using the display unit and the light-emitting unit.

It is desirable that an illumination apparatus reproduce a display image (e.g., the look of the sky) without causing discomfort. For example, when the display image reproduced by the illumination apparatus is flat, a user has difficulty experiencing a sensation that the user sees the sky through a window from the inside of a room. In other words, the user feels uncomfortable with the display image reproduced by the illumination apparatus.

In view of this, Embodiment 5 has an object to provide an illumination apparatus capable of reproducing a display image with less discomfort.

The following describes an illumination apparatus according to Embodiment 5 with reference to FIG. 50 to FIG. 55. The illumination apparatus according to Embodiment 5 is an apparatus that allows a user to virtually experience a sensation that the user sees the sky through a window from the inside of a room. For example, the illumination apparatus is installed in an indoor location and virtually produces light (hereinafter referred to as virtual outdoor light) simulating the sky in nature (e.g., a blue sky or a sky at sunset). It should be noted that a case in which the illumination apparatus is recessed in a ceiling (an exemplary part of a building) will be described in Embodiment 5. In addition, visible light may be simply referred to as light in the Specification.

[Configuration of Illumination Apparatus]

Figure 50:
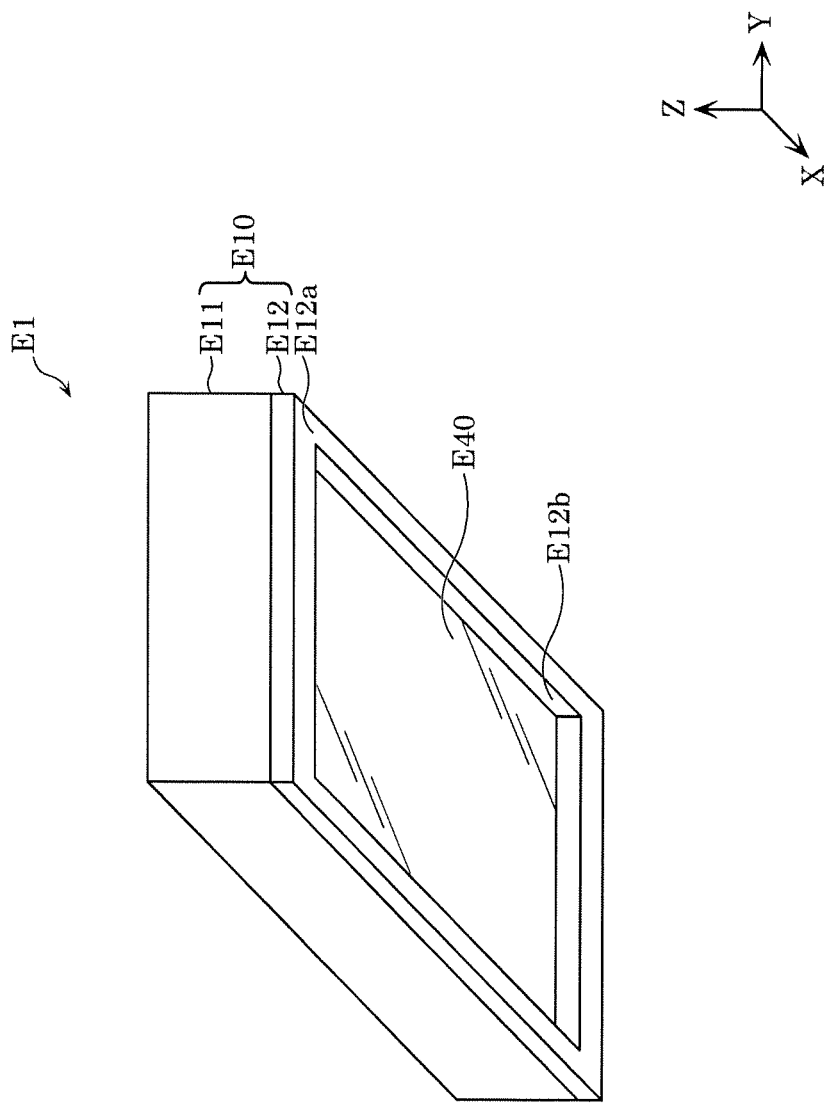
FIG. 50 is a perspective view of external appearance of an illumination apparatus according to Embodiment 5.
Figure 51:
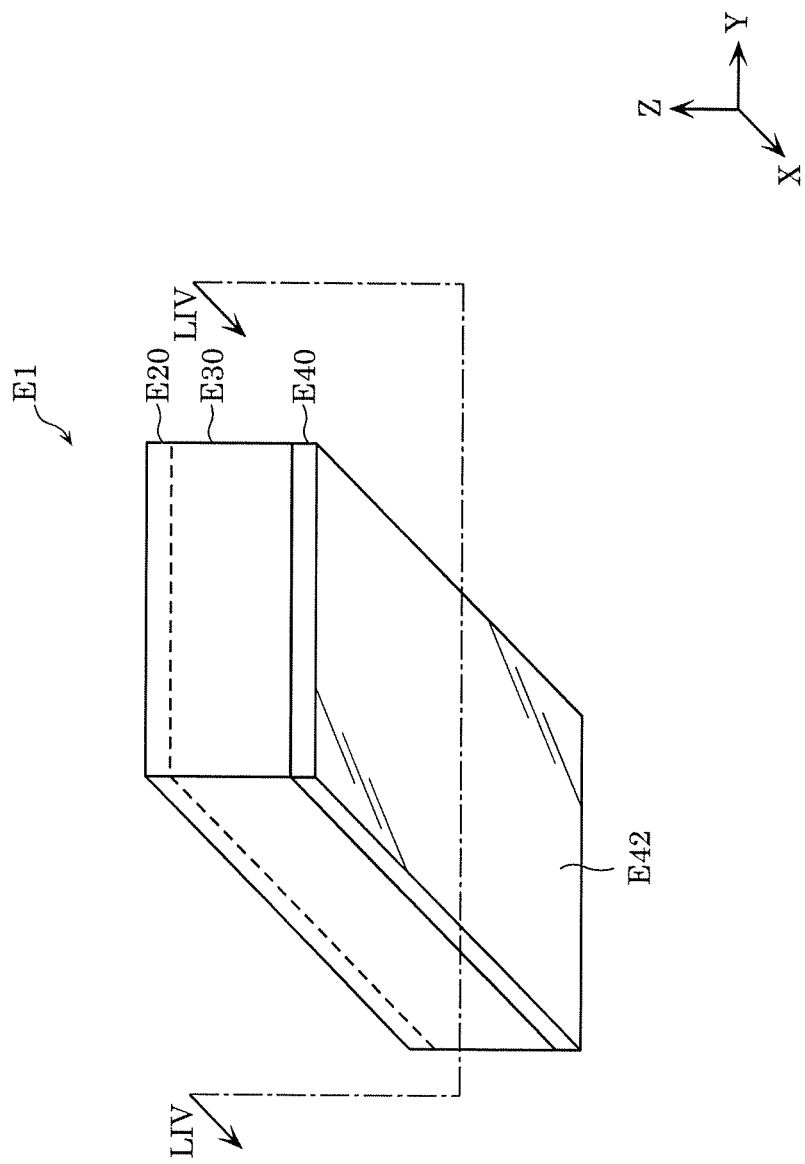
FIG. 51 is a perspective view of external appearance of the illumination apparatus according to Embodiment 5 from which a case is removed.
Figure 52:
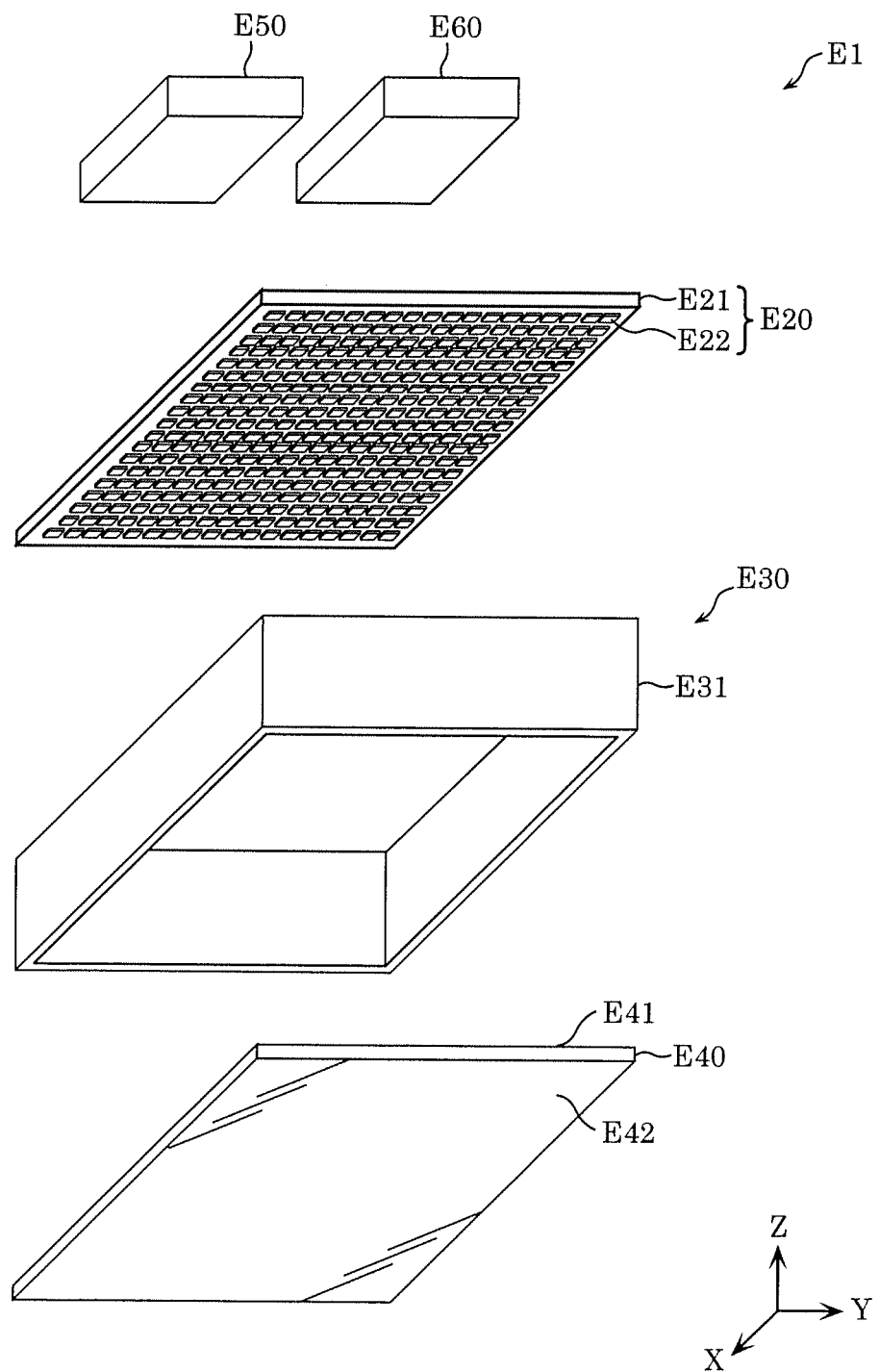
FIG. 52 is an exploded view of the illumination apparatus according to Embodiment 5.

First, the following describes a configuration of the illumination apparatus according to Embodiment 5 with reference to FIG. 50 to FIG. 52. FIG. 50 is a perspective view of external appearance of illumination apparatus E1 according to Embodiment 5. FIG. 51 is a perspective view of external appearance of illumination apparatus E1 according to Embodiment 5 from which case E10 is removed. FIG. 52 is an exploded perspective view of illumination apparatus E1 according to Embodiment 5.

As illustrated in FIG. 50 to FIG. 52, illumination apparatus E1 includes case E10, light-emitting module E20, light reflector E30, light diffuser E40, controller E50, and power source EGO.

Case E10 is a case body that houses light-emitting module E20, light reflector E30, light diffuser E40, controller E50, and power source E60.

As illustrated in FIG. 50, case E10 is a low-profile box and has a substantially rectangular shape in a plan view. It should be noted that case E10 is not limited to the substantially rectangular shape, and may have a shape such as a substantially circular shape, a substantially multangular shape, and a substantially semicircular shape, that is, is not limited to any particular shape.

Case E10 includes housing portion E11 and frame portion E12.

Housing portion E11 is a low-profile box that houses light-emitting module E20, light reflector E30, light diffuser E40, controller E50, and power source E60. It should be noted that controller E50 and power source E60 need not be housed in housing portion E11, and may be disposed outside of case E10, for example. Housing portion E11 has an opening (hereinafter referred to as a first opening) in a surface (hereinafter referred to as a bottom surface) on the floor side (the negative side of the Z axis), and houses light diffuser E40 to cover the first opening. In other words, the first opening corresponds in size to light diffuser E40. In Embodiment 5, the first opening has a substantially rectangular shape in a plan view.

Frame portion E12 is a ring-like (frame-like) member having a substantially rectangular shape in a plan view, and is disposed in an edge portion of the bottom surface of housing portion E11. In other words, frame portion E12 is disposed on the bottom surface of housing portion E11 to surround the first opening of housing portion E11. For this reason, when illumination apparatus E1 is seen in a plan view, an opening (hereinafter referred to as a second opening) of frame portion E12 and the first opening have a substantially identical shape. In Embodiment 5, the second opening has the substantially same rectangular shape as the first opening.

Light emitted from light diffuser E40 passes through the second opening. It should be noted that frame portion E12 is not limited to the substantially rectangular shape as long as frame portion E12 allows light emitted from light diffuser E40 to pass, and frame portion E12 may have a shape such as a substantially circular shape, a substantially multangular shape, and a substantially semicircular shape, that is, is not limited to any particular shape. For example, frame portion E12 has an external body that may have the same shape as housing portion E11 in a plan view.

Frame portion E12 has bottom surface portion E12a and upright portion E12b. Illumination apparatus E1 is recessed in a ceiling so that bottom surface portion E12a is flush with a ceiling surface, for example. In other words, bottom surface portion E12a is a surface that the user can see. For this reason, bottom surface portion E12a may be designed in harmony with the ceiling surface. For example, bottom surface portion E12a may be designed to imitate a ceiling pattern or a window frame. It should be noted that the ceiling surface is an exemplary installation surface of a part of a building.

Upright portion E12b is provided in a substantially vertical direction from an end portion of bottom surface portion E12a on a side facing the second opening toward a side opposite to the floor surface (a direction of the positive side of the Z axis). If upright portion E12b is not provided and light diffuser E40 is disposed flush with the ceiling, it appears to the user that the ceiling is a thin board (e.g., a thin board approximately as thick as light diffuser E40), and the user may have difficulty feeling as if a window that is a part of a building actually exists. Accordingly, in Embodiment 5, upright portion E12b is provided from a standpoint of simulating a window that is more realistic. For example, upright portion E12b has a height (a length in the Z-axis direction) which allows the user to perceive board thickness of the ceiling in which illumination apparatus E1 is recessed. Specifically, upright portion E12b has a height of at least 30 mm or may have a height approximately as much as a thickness from a roof to the ceiling.

Case E10 is made of, for example, a metal material or an non-metal material having high thermal conductivity. Examples of the non-metal material having high thermal conductivity include a resin having a high thermal conductance rate (a high thermal conductive resin). Using a material having high thermal conductivity as case E10 makes it possible to radiate heat generated by light-emitting module E20 to the outside via case E10. It should be noted that housing portion E11 and frame portion E12 may be each made of a different material.

A portion of light emitted from light diffuser E40 enters upright portion E12b. In order to effectively use the light, upright portion E12b may be made of a material having light-reflecting properties. Upright portion E12b may be made of a metal material or a material having a high light reflectance. For example, upright portion E12b may be formed of a hard resin material and covered with an evaporated metal film (a metal reflective film) made of a metal material such as silver or aluminum.

It should be noted that housing portion E11 and frame portion E12 may be integrally formed to constitute case E10, or housing portion E11 and frame portion E12 may be separate bodies, and case E10 may be formed by joining housing portion E11 and frame portion E12 with an adhesive.

As illustrated in FIG. 51, light-emitting module E20 is a light source that emits virtual outdoor light for forming a display image. Light-emitting module E20 is fixed to an end portion (an end portion on the positive side of the Z axis) of light reflector E30 opposite to light diffuser E40. In addition, as illustrated in FIG. 52, light-emitting module E20 includes board E21 and light-emitting elements E22 mounted on board E21.

Board E21 is a printed circuit board for mounting light-emitting elements E22 and is formed into a substantially rectangular shape. For example, a resin-based board, a metal-based board, or a ceramic board may be used as board E21.

A light-absorbing layer that is formed by black coating a layer to absorb visible light is disposed on a surface of board E21 on the floor side. This is because, in the case of an illumination apparatus that, like illumination apparatus E1 according to Embodiment 5, reproduces a display image by being directly seen by a user, it is sometimes desirable that the illumination apparatus look dark even if external light enters the illumination apparatus when the illumination apparatus is turned off. In other words, in the case of the illumination apparatus that is directly seen, it is sometimes desirable that a contrast ratio be high between when the illumination apparatus is turned on and when the illumination apparatus is turned off. That the light-absorbing layer is disposed on the surface of board E21 on the floor side allows, even if external light enters illumination apparatus E1 from the floor side when illumination apparatus E1 is turned off, the surface of board E21 on the floor side to absorb the external light. In other words, the external light entering illumination apparatus E1 is not reflected by board E21. In consequence, illumination apparatus E1 looks dark when illumination apparatus E1 is turned off. It should be noted that the expression "look dark" is intended to include a case in which illumination apparatus E1 is completely dark and a case in which illumination apparatus E1 is dark to such a degree that it is possible to recognize that illumination apparatus E1 is turned off. Moreover, the external light is light other than light emitted by illumination apparatus E1, and is sunlight or illumination light, for example. Furthermore, for example, the black coating is performed before light-emitting elements E22 are mounted on board E21.

It should be noted that although the example in which the light-absorbing layer is disposed on the surface of board E21 on the floor side is described, the present disclosure is not limited to this. For example, a light-reflecting layer that reflects visible light may be disposed on the surface of board E21 on the floor side. Furthermore, for example, a specular reflection layer that specularly reflects incident light may be disposed on the surface of board E21 on the floor side. It is possible to effectively use light reflected by light reflector E30 to form a display image because that the specular reflection layer is disposed on the surface of board E21 on the floor side makes it possible to further reflect, toward light diffuser E40, light emitted from light-emitting module E20 and reflected by light diffuser E40.

Light-emitting elements E22 are light-emitting diode (LED) elements. In Embodiment 5, light-emitting elements E22 are RGB-type LED elements that emit blue light, green light, and red light (i.e., the three primary colors of light). It should be noted that light-emitting elements E22 are not limited to the RGB-type LED elements. For example, light-emitting elements E22 may be RGBW-type LED elements that emit blue light, green light, red light, and white light, or LED elements that emit blue light and white light. In addition, light-emitting elements E22 may be other LED elements. Light-emitting elements E22 are disposed on the surface of board E21 on the floor side. For example, light-emitting elements E22 are arranged in a matrix on the surface of board E21 on the floor side. For example, light-emitting elements E22 are disposed at equal intervals.

It should be noted that the LED elements may be surface-mount device (SMD) LED elements or chip-on-board (COB) LED elements.

Moreover, although not shown, board E21 is provided with a control line that is a line for transmitting a control signal from controller E50, and a power line that is a line for supplying power from power source EGO. For example, the control line and the power line are provided so that light-emitting elements E22 are connected in series to the control line and the power line. Each of light-emitting elements E22 receives power from power source E60 via the power line, and emits predetermined light based on a control signal from the control line. In Embodiment 5, light-emitting elements E22 are capable of emitting light of various colors by adjusting luminance of blue light, green light, and red light because light-emitting elements E22 are the RGB-type LED elements. In consequence, light-emitting elements E22 are capable of emitting virtual outdoor light simulating, for example, a blue sky, a cloudy sky, or a sky at sunset.

As illustrated in FIG. 52, light reflector E30 is an optical member that is disposed to surround light-emitting elements E22 and has reflecting properties for light emitted from light-emitting elements E22. In other words, light reflector E30 reflects light emitted from light-emitting elements E22 and entering light reflector E30. Specifically, light reflector E30 reflects light entering an inner surface of light reflector E30 (namely, a surface of light reflector E30 on a side facing light-emitting elements E22) from light-emitting elements E22, toward light diffuser E40. Light reflector E30 has a reflectance of, for example, at least 80%.

In Embodiment 5, light reflector E30 includes wall E31 surrounding light-emitting elements E22. In other words, light reflector E30 is a frame-like member surrounding light-emitting elements E22. It should be noted that light reflector E30 is not limited to a frame-like shape. As long as light reflector E30 includes wall E31 surrounding light-emitting elements E22, light reflector E30 is not limited to any particular shape. It should be noted that wall E31 is disposed to be, for example, substantially orthogonal to board E21. Specifically, an inner surface of wall E31 (see inner surface E32 in FIG. 53) is disposed to be substantially orthogonal to board E21. A normal of wall E31 (e.g., a normal relative to inner surface E32, and in FIG. 53, a straight line parallel to the Y axis) may be inclined to a plane along the surface of board E21 in approximately 10 degrees. The normal of wall E31 further may be inclined to a plane along the surface of board E21 in approximately 30 degrees. The normal of wall E31 may be inclined to a plane along the surface of board E21 in greater than 30 degrees.

The user can see a display image (hereinafter also referred to as a real image) formed by light emitted from light-emitting elements E22 and entering light diffuser E40 without going through wall E31, and a display image (hereinafter also referred to as a reflected image) formed by light emitted from light-emitting elements E22, reflected by wall E31, and entering light diffuser E40. In other words, the real image and the reflected image constitute one display image. When light reflector E30 is not provided, a display image is formed of only the real image and is approximately as large as board E21. In contrast, when the real image and the reflected image constitute a display image, it is possible to reproduce the display image larger than board E21. For example, it is possible to reproduce a display image that appears to infinitely expand (e.g., a blue sky that appears to infinitely expand). Furthermore, board E21 can be made smaller because providing light reflector E30 makes it possible to reproduce a display image that is more extensive. In other words, illumination apparatus E1 can be downsized. In addition, it is possible to reduce the number of light-emitting elements E22 to be mounted on light-emitting module E20.

Light reflector E30 is formed by performing, for example, a diffusion treatment on a reflective plate made of a metal material such as aluminum (Al) and having a specular surface. Examples of the diffusion treatment include a frosting treatment such as an anodizing treatment. It should be noted that the diffusion treatment may be performed on at least the inner surface of light reflector E30 (wall E31).

Figure 53:
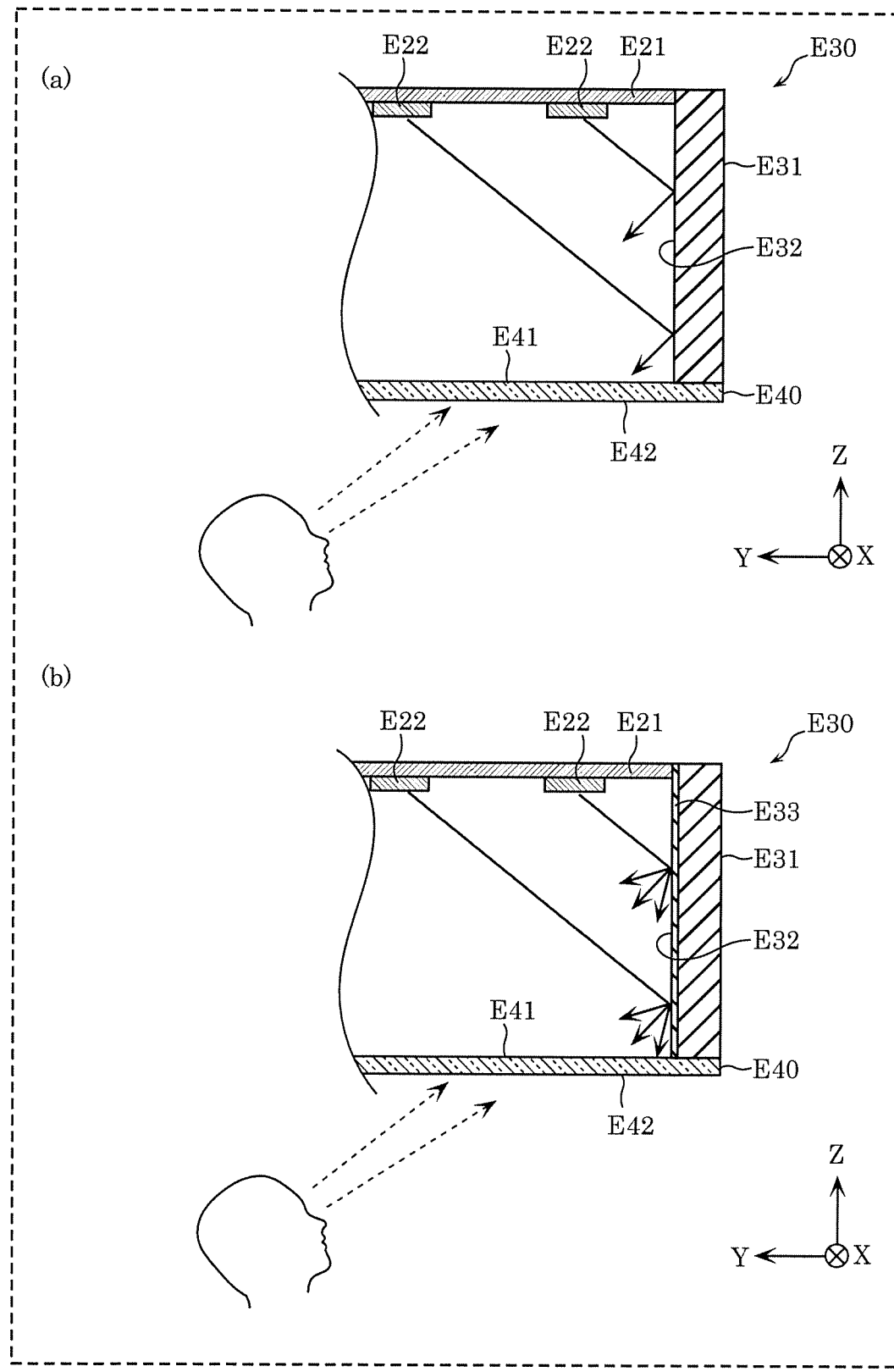
FIG. 53 is a diagram for illustrating a difference in how light reflected by a light reflector according to Embodiment 5 looks, depending on the presence or absence of a diffusion treatment on the light reflector.

The following describes a difference in how a display image looks via light diffuser E40 between a case in which the diffusion treatment is performed on wall E31 and a case in which the diffusion treatment is not performed on wall E31, with reference to FIG. 53. FIG. 53 is a diagram for illustrating a difference in how a display image looks depending on the presence or absence of a diffusion treatment on light reflector E30 according to Embodiment 5. Specifically, (a) in FIG. 53 is a diagram illustrating how light reflected by light reflector E30 on which the diffusion treatment is not performed looks, and (b) in FIG. 53 is a diagram illustrating how light reflected by light reflector E30 on which the diffusion treatment is performed looks.

As illustrated in (a) in FIG. 53, light is specularly reflected which entered wall E31 on which the diffusion treatment is not performed, that is, wall E31 having a specular surface. As described above, the user sees a real image and a reflected image as one display image. For this reason, it is desirable that the real image and the reflected image are hard to distinguish. When the reflected image is a specular image, continuity of brightness between the reflected image and the real image is maintained, but that the reflected image is the specular image is more easily noticed. In other words, an effect of simulating a sky is reduced, and the user is likely to feel discomfort with the display image.

In contrast, as illustrated in (b) in FIG. 53, light is diffusely reflected which entered light reflector E30 having inner surface E32 (a surface of wall E31 on a side facing light-emitting module E20) on which anodized layer E33 is disposed by the anodizing treatment, that is, light reflector E30 not having the specular surface on inner surface E32. As a result, a reflected image formed becomes a slightly blurred image, and thus the user is less likely to recognize that the reflected image is a specular image. In other words, the user is less likely to feel discomfort with the display image. In this case, light reflector E30 includes wall E31 and anodized layer E33. It should be noted that the anodizing treatment is an example of the diffusion treatment, and anodized layer E33 is an exemplary diffusion layer. It should also be noted that light-reflecting properties include diffusely reflecting properties.

It should be noted that the diffusion treatment performed on light reflector E30 does not include a white treatment. When light reflector E30 is a whitish reflective plate, light reflected by the whitish reflective plate shines substantially evenly. As a result, for example, a sense of resolution between the sky and cloud of the reflected image is lost, which reduces the effect of simulating the sky. Moreover, inner surface E32 of light reflector E30 may be the specular surface. When inner surface E32 of light reflector E30 is the specular surface, as described above, the brightness between the real image and the reflected image has continuity, and it is possible to reproduce a display image that causes less discomfort compared to a case in which light reflector E30 is white. Moreover, it is possible to reduce the loss of light from light-emitting module E20 because the light entering light reflector E30 from light-emitting module E20 can be totally reflected toward light diffuser E40.

The following describes a height (a length in the Z-axis direction) of light reflector E30 (wall E31). For example, when light reflector E30 is short, light-emitting elements E22 appear granular, and the user is likely to feel discomfort with a display image. In contrast, although it is possible to reduce the granular appearance of light-emitting elements E22 when light reflector E30 is tall, illumination apparatus E1 grows in size. Moreover, whether light-emitting elements E22 appear granular depends on intervals (see distance Ed1 to be described later, in FIG. 54) at which light-emitting elements E22 are mounted and a haze value of light diffuser E40. In other words, in order to reduce the granular appearance of light-emitting elements E22, the height of light reflector E30, the intervals at which light-emitting elements E22 are mounted, and the haze value of light diffuser E40 are set.

It should be noted that when light reflector E30 is short (i.e., a distance between light-emitting module E20 and light diffuser E40 is small), a display image to be reproduced is a flat image. For this reason, light reflector E30 may be set high from a standpoint of reproducing a display image giving a depth feel.

Light diffuser E40 is an optical member that diffuses light entering from light-emitting module E20 and emits light toward the floor side. Specifically, light diffuser E40 is a diffusing panel that diffuses light entering from light-entering surface E41 (a surface on the positive side of the Z axis) of light diffuser E40 and emits light from light-outgoing surface E42.

Light diffuser E40 has translucency and diffusibility for light emitted from light-emitting module E20. Light diffuser E40 is produced by performing, for example, diffusion processing on a resin material such as transparent acryl or poly ethylene terephthalate (PET), or on a transparent plate made of glass. Light diffuser E40 has a high transmittance by including a transparent material. For example, light diffuser E40 has a total transmittance of at least 80% or more preferably at least 90%. With this, it is possible to reduce the loss of light by light diffuser E40, and reproduce a bright display image.

Light diffuser E40 is produced by performing the diffusion treatment on the transparent plate. The diffusion treatment is performed on at least one of light-entering surface E41 and light-outgoing surface E42 of light diffuser E40. Examples of the diffusion treatment include prism processing in which prisms including minute holes having a dot-like shape (recesses) are formed. The minute holes are holes of a size which does not allow the user to visually confirm the holes. The minute holes each are, for example, a cone or a pyramid. For example, a depth (a height of the cone) defined by the apex and bottom surface of the minute hole when the minute hole is the cone is at most 100 μm, and the diameter of the bottom surface of the minute hole is at most 100 μm. As a result, illumination apparatus E1 allows the user to virtually experience a sensation that the user sees the sky through a window from the inside of a room because the user cannot see the minute holes (the prisms). It should be noted that the prisms are not limited to the above-described shapes or size, and a shape or size of the prisms is appropriately determined based on the haze value of light diffuser E40. For example, the prisms may be minute recesses having a dot-like shape. Furthermore, the diffusion treatment is not limited to the prism processing, and may be performed by surface texturing or printing.

The haze value of light diffuser E40 on which the diffusion treatment is performed is, for example, at least 10% and at most 90%. Even when light diffuser E40 includes the transparent material, it is possible to reduce the granular appearance of light-emitting elements E22 of light-emitting module E20 for the user, by setting the haze value to be at least 10%. In addition, it is possible to maintain an outline of a reproduced display image (e.g., an outline of cloud in a blue sky) to a certain degree, by setting the haze value to be at most 90%. It should be noted that the haze value can be adjusted based on, for example, the shape, size, etc. of the prisms formed in the prism processing.

It should be noted that light diffuser E40 is not limited to the transparent plate (e.g., a transparent acrylic plate) on which the diffusion treatment is performed. For example, light diffuser E40 may be produced by providing a diffusion sheet to a transparent plate. In this case, the diffusion sheet may be disposed on at least one of a surface of the transparent plate on the floor side and a surface of the transparent plate on the side facing light-emitting module E20.

As described above, light diffuser E40 has a high total transmittance and a high haze value. It should be noted that light diffuser E40 may be a milky-white diffuser panel in which a light diffusing material (e.g., light-reflective minute particles such as silica particles) is dispersed. Such a diffuser panel is produced by resin molding a translucent resin material mixed with a light diffusing material into a predetermined shape. It should be noted that although light diffuser E40 may be milky white, light diffuser E40 may be made of, for example, a transparent resin material on which the diffusion treatment is performed, from a standpoint of reducing the loss of light.

Light diffuser E40 is a rectangular plate in a plan view. Light diffuser E40 is fixed to an end portion (an end portion on the negative side of the Z axis) of light reflector E30 opposite to light diffuser E20. In other words, light diffuser E40 is opposite to light-emitting module E20 and is disposed to cover light-emitting module E20. Moreover, as illustrated in FIG. 50, light diffuser E40 is disposed to cover the first opening of case E10. For this reason, when the user looks up at the ceiling, the user can visually confirm, of illumination apparatus E1, light diffuser E40, and bottom surface portion E12a and upright portion E12b of frame portion E12.

Controller E50 is a control device that controls operations of light-emitting module E20 such as lighting up, turning off, dimming, and toning (adjustment of a color of emitted light or a color temperature), according to an instruction from the user (e.g., an instruction received via a remote control or the like). For example, controller E50 obtains information about a display image stored in a storage (not shown), and reproduces the display image based on the information. Specifically, when controller E50 receives, from the user, an instruction to display a blue sky as a display image, controller E50 obtains information about the blue sky from the storage, and controls light-emitting module E20 based on the information obtained. It should be noted that controller E50 and light-emitting module E20 (light-emitting elements E22) are electrically connected via a control line.

In Embodiment 5, light-emitting elements E22 are the RGB-type LED elements. Accordingly, controller E50 outputs a control signal to light-emitting elements E22 via the control line according to an instruction from the user, the control signal including information about luminance of each of blue LEDs, green LEDs, and red LEDs. Light-emitting elements E22 that received the control signal emit blue light, green light, and red light based on the control signal.

Controller E50 outputs a control signal to light-emitting module E20 at time intervals that, for example, do not cause a display image to move unnaturally. Specifically, controller E50 outputs the control signal approximately twenty times per second. With this, when, for example, a display image of moving cloud is reproduced, it is possible to reproduce more natural motion.

Controller E50 is implemented by, for example, a microcomputer, a processor, or a dedicated circuit.

In Embodiment 5, controller E50 is disposed on the surface of light-emitting module E20 (board E21) opposite to another surface of the same facing light diffuser E40.

Power source E60 includes: a power converter (e.g., a power converter circuit) that converts AC power supplied from a power system (e.g., a commercial power source) into DC power; and a power circuit that generates power for causing light-emitting module E20 (light-emitting elements E22) to emit light. For example, power source E60 converts AC power supplied from a commercial power source into DC power having a predetermined level, by rectifying, smoothing, stepping down, etc. the AC power, and supplies the DC power to light-emitting module E20. Power source E60 is electrically connected to the power system via, for example, a power line.

In Embodiment 5, power source E60 is disposed on the surface of light-emitting module E20 opposite to the other surface of the same facing light diffuser E40. In other words, controller E50 and power source E60 are coplanar.

Illumination apparatus E1 thus configured is capable of reproducing a display image giving a depth feel because a space surrounded by light reflector E30 is provided between light-emitting module E20 and light diffuser E40. For example, illumination apparatus E1 is capable of reproducing a display image giving a depth feel because, when illumination apparatus E1 is seen from a different angle, how the display image looks changes depending on an angle. In contrast, when a display image is reproduced using a display apparatus such as a liquid crystal display, the same display image is seen even the display apparatus is seen from a different angle. In other words, the user may feel discomfort with the display image because the display image reproduced by the display apparatus is flat. Accordingly, compared to a case in which a display image is reproduced by the display apparatus etc, illumination apparatus E1 according to Embodiment 5 is capable of reproducing a display image that causes less discomfort because illumination apparatus E1 is capable of rendering a depth feel.

[Positional Relationship Between Light-emitting Elements and Light Reflector]

Figure 54:
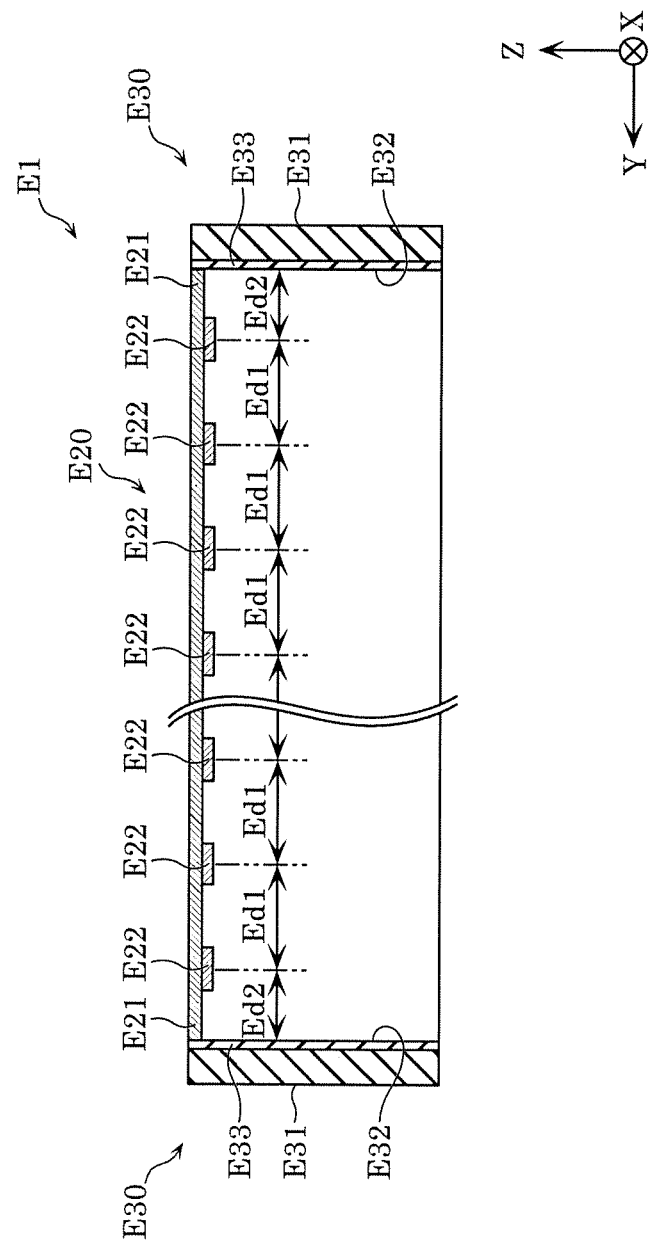
FIG. 54 is a cross-sectional view of the illumination apparatus according to Embodiment 5, taken along line LIV-LIV in FIG. 51.

Next, the following describes the disposition of light-emitting elements E22 and light reflector E30 (wall E31) with reference to FIG. 54. FIG. 54 is a cross-sectional view of illumination apparatus E1 according to Embodiment 5, taken along line LIV-LIV in FIG. 51. It should be noted that for convenience, light diffuser E40 is omitted in FIG. 54.

As illustrated in FIG. 54, light-emitting module E20 is disposed inside of wall E31 in Embodiment 5. In other words, light reflector E30 is disposed to surround light-emitting module E20. It should be noted that light reflector E30 may surround light-emitting elements E22 included in light-emitting module E20.

Distance Ed1 in the figure indicates a distance between each of light-emitting elements E22 and each adjacent one of light-emitting elements E22 (e.g., a distance between the centers of adjacent light-emitting elements E22 in a plan view), and is an example of a first interval. For example, distance Ed1 is a distance between the optical axes of adjacent light-emitting elements E22. Moreover, distance Ed2 in the figure indicates a distance between each light-emitting element E22 disposed in the outmost of board E21 and wall E31 (i.e., a distance between the center of, among light-emitting elements E22, each light-emitting element E22 closest to wall E31 and inner surface E32 of wall E31), and is an example of a second interval. For example, distance Ed2 is a distance between the optical axis of light-emitting element E22 closest to wall E31 and inner surface E32 of wall E31. It should be noted that although FIG. 54 shows the example in which the distance between each one of light-emitting elements E22 and each adjacent one of light-emitting elements E22 disposed in the Y-axis direction is distance Ed1, a distance between each one of light-emitting elements E22 and each adjacent one of light-emitting elements E22 disposed in the X-axis direction is also distance Ed1, for example.

A display image (a real image) formed by light entering light diffuser E40 from light-emitting elements E22 without going through wall E31 and a display image (a reflected image) formed by light entering light diffuser E40 after being emitted by light-emitting elements E22 and reflected by wall E31 may constitute a display image causing no discomfort. However, brightness of a boundary between the real image and the reflected image changes according to distance Ed2 between, among light-emitting elements E22 mounted on board E21, each light-emitting element E22 mounted on the outermost of board E21 and wall E31.

Specifically, the boundary between the real image and the reflected image becomes darker with an increase in distance Ed2. In other words, a dark line is formed at the boundary between the real image and the reflected image. Moreover, the boundary between the real image and the reflected image becomes brighter with a decrease in distance Ed2. In other words, a bright line is formed at the boundary between the real image and the reflected image. For the above reasons, the brightness between the real image and the reflected image becomes discontinuous, which results in a display image causing discomfort.

When distance Ed2 is expressed as Ed1/2 using distance Ed1, the bright or dark line is less likely to be formed at the boundary between the real image and the reflected image, and it is possible to reproduce a display image that causes less discomfort. It should be noted that in Embodiment 5, the diffusion treatment is performed on inner surface E32 of wall E31 and light diffuser E40, and a display image to be reproduced is a slightly blurred image. For this reason, distance Ed2 which does not cause the dark or bright line to be formed at the boundary between the real image and the reflected image has a predetermined range. For example, when distance Ed2 is expressed as being greater than Ed1/4 and less than 3×Ed1/4 (Ed1/4<Ed2<3×Ed1/4) using distance Ed1, the same effect is produced as the case in which distance Ed2 is expressed as Ed1/2. In other words, when distance Ed2 is expressed as being greater than Ed1/4 and less than 3×Ed1/4 using distance Ed1, the dark or bright line is less likely to be formed at the boundary between the real image and the reflected image, and it is possible to reproduce a display image that causes less discomfort.

Moreover, out of the bright line and the dark line, the dark line is less noticeable. Accordingly, the maximum value of distance Ed2 may be smaller than that of distance Ed1, although this case produces a less effect than the case in which distance Ed2 is greater than Ed1/4 and less than 3×Ed1/4. In other words, distance Ed2 may be greater than Ed1/4 and less than Ed1 (Ed1/4<Ed2<Ed1). In consequence, it is possible to reproduce a display image that causes less discomfort because the bright line is less likely to be formed at the boundary between the real image and the reflected image and the dark line is less noticeable even when the dark line is formed. It should be noted that in Embodiment 5, distance Ed2 is set Ed1/2.

Although FIG. 54 illustrates right and left distances Ed2 (distance Ed2 on the positive side of the Y axis and distance Ed2 on the negative side of the Y axis) are substantially equal distances, the present disclosure is not limited to this. Two distances Ed2 may each be a different distance as long as the different distance is within the range of from Ed1/4 to Ed1. In other words, distances Ed2 between light-emitting elements E22 disposed on the outermost of board E21 and wall E31 may each be a different distance as long as the different distance is within the range of from Ed1/4 to Ed1.

Figure 55:
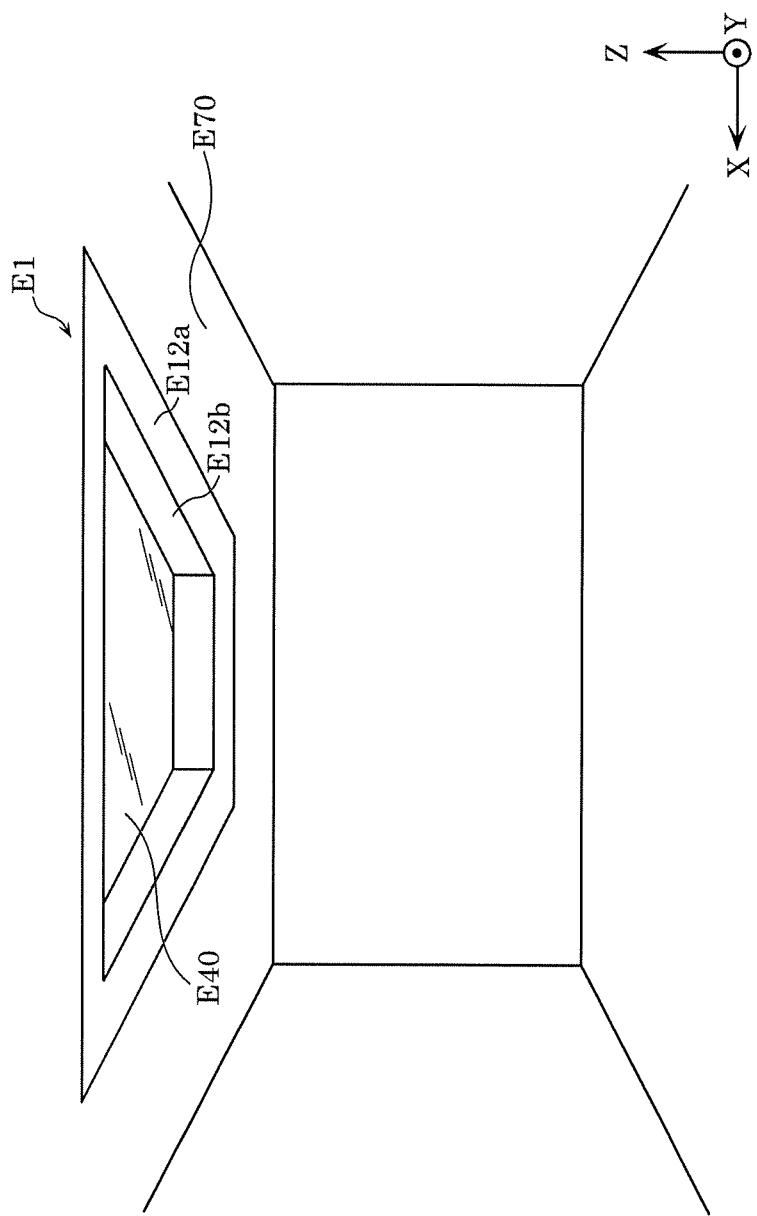
FIG. 55 is a conceptual diagram illustrating exemplary installation of the illumination apparatus according to Embodiment 5.

Illumination apparatus E1 thus configured is, for example, recessed in the ceiling and used. Specifically, as illustrated in FIG. 55, illumination apparatus E1 is recessed in ceiling E70 and used. FIG. 55 is a conceptual diagram illustrating an exemplary installation of illumination apparatus E1 according to Embodiment 5. Illumination apparatus E1 reproduces a display image that makes it difficult to visually confirm a boundary between a real image and a reflected image, and by looking up illumination apparatus E1, the user thus can see the display image that allows the user to virtually experience a sensation that the user sees the sky through a window from the inside of a room (i.e., the display image that causes less discomfort). It should be noted that illumination apparatus E1 may be installed in, for example, a facility, an underground mall, or the like in which daylight is hard to obtain.

[Advantageous Effects Etc.]

Next, the following describes advantageous effects of illumination apparatus E1 according to Embodiment 5.

Illumination apparatus E1 according to Embodiment 5 is to be disposed in a recess of ceiling E70 (an exemplary part of a building). Illumination apparatus E1 includes: light-emitting module E20 that includes board E21 and light-emitting elements E22 disposed on board E21; light diffuser E40 that has translucency and covers light-emitting module E20; and light reflector E30 that includes wall E31 having light-reflecting properties and surrounding light-emitting elements E22. Among light-emitting elements E22, every two adjacent light-emitting elements E22 are disposed on board E21 at distance Ed1 (an example of a first interval). Distance Ed2 (an example of a second interval) is larger than ¼ of distance Ed1 and smaller than distance Ed1, distance Ed2 being an interval between wall E31 and light-emitting element E22 closest to wall E31 among light-emitting elements E22 (Ed1/4<Ed2<Ed1).

With this, distance Ed2 between, among light-emitting elements E22 mounted on board E21, each light-emitting element E22 mounted on the outermost of board E21 and wall E31 becomes greater than Ed1/4 and smaller than Ed1. When distance Ed2 is greater than Ed1/4, it is possible to keep a bright line from being formed at a boundary between a real image that is a display image formed by light emitted from light-emitting elements E22 and entering light diffuser E40 without going through wall E31 and a reflected image that is a display image formed by light emitted from light-emitting elements E22, reflected by wall E31, and entering light diffuser E40. In addition, when distance Ed2 is smaller than distance Ed1, it is possible to make, even in the case where a dark line is formed at the boundary between the real image and the reflected image, the dark line less noticeable. In other words, illumination apparatus E1 according to Embodiment 5 is capable of reproducing a display image which makes it difficult for the user to recognize the boundary between the real image and the reflected image. Stated differently, illumination apparatus E1 is capable of reproducing the display image with less discomfort. Accordingly, illumination apparatus E1 is capable of reproducing the display image more similar to a sensation that the user sees the sky through a window from the inside of a room.

Moreover, a surface of wall E31 on a side facing light-emitting module E20 is a specular surface.

With this, brightness between a reflected image (a specular image) formed by light reflected by the specular surface and a real image has continuity, and it is possible to reproduce a display image with less discomfort compared to a case in which a diffusing member is white. In addition, when inner surface E32 of wall E31 is a specular surface, it is possible to reduce the loss of light from light-emitting module E20 because the light entering wall E31 from light-emitting module E20 can be totally reflected.

Moreover, a diffusion treatment is performed on a surface of wall E31 on a side facing light-emitting module E20. A surface of wall E31 on a side facing light-emitting module E20 is light-diffusive.

With this, a reflected image formed by light reflected by wall E31 becomes not a specular image but a slightly blurred image, and thus the user is less likely to recognize that the reflected image is the specular image. In other words, the user is less likely to feel discomfort with a display image formed of a real image and the reflected image that is not the specular image.

Moreover, the surface of wall E31 on the side facing light-emitting module E20 is not white.

With this, it is possible to reduce deterioration of the effect of simulating a sky, which is caused by the loss of the sense of resolution between the sky and cloud of the reflected image resulting from light reflected by wall E31 shining substantially evenly.

Moreover, light diffuser E40 has a total transmittance of at least 80% and a haze value of at least 10% and at most 90%.

With this, light diffuser E40 has, as optical properties, a high transmittance and a high haze value. It is possible to efficiently use light from light-emitting module E20 for a display image because the loss of light by light diffuser E40 is reduced due to the high transmittance of light diffuser E40. In addition, it is possible to reduce granular appearance of light-emitting elements E22 and maintain an outline of a reproduced display image (e.g., an outline of cloud in a blue sky) to a certain degree because light diffuser E40 has the haze value of at least 10% and at most 90%.

(Other Variations of Embodiment 5)

Although the present disclosure is described based on Embodiment 5, the present disclosure is not limited to Embodiment 5.

For example, although the example in which the case includes the frame portion is described in Embodiment 5, the present disclosure is not limited to this. For example, the frame portion may be configured as a portion of a part of a building. In other words, an illumination apparatus does not include the frame portion and is fixed to the frame portion which is the portion of the part of the building. In the case where the case includes the frame portion, when the illumination apparatus is attached to, for example, the ceiling, the user may see a boundary between the ceiling and the bottom surface of the frame portion and feel discomfort accordingly. In contrast, in the case where the frame portion is configured as the portion of the part of the building, the illumination apparatus does not include the frame portion, and discomfort to be felt by the user seeing the boundary between the ceiling and the illumination apparatus can be reduced accordingly.

Moreover, although the example in which the illumination apparatus is recessed in the ceiling is described in Embodiment 5, the present disclosure is not limited to this. For example, the illumination apparatus may be recessed in a wall etc. In this case, the wall is an exemplary part of a building.

Moreover, although the example in which the diffusion treatment performed on the inner surface of the light reflector is the frost treatment is described in Embodiment 5, the present disclosure is not limited to this. For example, a treatment for roughening the inner surface of the light reflector such as blasting may be used as the diffusion treatment. Furthermore, in this case, a rugged portion made by surface roughing is an example of the diffusion layer.

Moreover, although the example in which distance Ed1 (the example of the first interval) is the distance between the centers of the light-emitting elements is described in Embodiment 5, the present disclosure is not limited to this. For example, distance Ed1 may be a distance between end portions of the light-emitting elements on the positive side of the Y axis.

Moreover, although the example in which the illumination apparatus includes the light reflector and the case is described in Embodiment 5, the present disclosure is not limited to this. For example, when the light reflector has a closed-end cylindrical shape and houses each of the structural components, the illumination apparatus need not include the case. In addition, when the internal surface of the case has light-reflecting properties (i.e., when the case includes the wall surrounding the light-emitting elements, and a surface of the wall on the side facing the light-emitting elements has light-reflecting properties), the illumination apparatus need not include the light reflector. In this case, a distance between, among the light-emitting elements, each light-emitting element closest to the wall and the surface of the wall on the side facing the light-emitting elements is the second interval.

Moreover, although the example in which the light reflector is the frame-like member having the wall is described in Embodiment 5, the present disclosure is not limited to this. For example, the light reflector may have a closed-end frame-like shape. In this case, the light-emitting module is disposed so that the light-emitting elements are on a side facing the opening of the light reflector with reference to the board. In addition, the light reflector having the closed-end frame-like shape may include the wall surrounding the light-emitting elements and a bottom portion covering a surface opposite to a surface on which the light-emitting elements of the light-emitting module are mounted, and at least the wall may have reflecting properties for light emitted by the light-emitting elements. The light reflector may include the wall surrounding the light-emitting elements and having light-reflecting properties.

Moreover, although the example in which the light reflector is the reflective plate made of the metal material such as aluminum is described in Embodiment 5, the present disclosure is not limited to this. For example, the light reflector may be made of a hard resin, and an evaporated metal film (a metal reflective film) made of a metal material such as aluminum may be provided to the inner surface of the light reflector. In addition, the light reflector may be formed by joining a metal tape such as an aluminum tape to a resin plate made of a resin material with an adhesive.

Moreover, although the example in which the controller causes the light-emitting module to reproduce the display image according to the instruction of the user is described in Embodiment 5, the present disclosure is not limited to this. For example, the controller may obtain a look of the sky from an imaging device (e.g., a camera) that captures the look of the sky, and may cause the light-emitting module to reproduce a display image similar to the look of the sky obtained. Accordingly, it is possible to reduce discomfort to be felt by the user when the user goes outside or inside because the display image reproduced inside the room by the illumination apparatus and the actual look of the sky outside are similar.

Moreover, although the example in which the controller reproduces the display image according to the instruction of the user is described in Embodiment 5, the present disclosure is not limited to this. For example, the controller may have a timer function, obtain, from the storage, information about a display image corresponding to a time when an instruction is received from the user, and control the light-emitting module based on the information obtained. Alternatively, the controller may obtain, at a predetermined time, information about a display image corresponding to the predetermined time from the storage, and control the light-emitting module based on the information obtained.

(Embodiment 6)

Conventionally, an illumination apparatus is disclosed that includes: a display unit (a liquid crystal display) that displays an image; a light-emitting unit (a backlight) that emits outgoing light to an illumination region; and an image generation unit that generates an image (see, for example, Japanese Unexamined Patent Application Publication No. 2013-92616). This illumination apparatus creates (reproduces) a lighting environment into which light streams, using the display unit and the light-emitting unit.

It is desirable that an illumination apparatus reproduce a display image (e.g., the look of the sky) without causing discomfort. For example, when the display image reproduced by the illumination apparatus is flat, a user has difficulty experiencing a sensation that the user sees the sky through a window from the inside of a room. In other words, the user feels uncomfortable with the display image reproduced by the illumination apparatus.

In view of this, Embodiment 6 has an object to provide an illumination apparatus capable of reproducing a display image for which discomfort is reduced.

The following describes an illumination apparatus according to Embodiment 6 with reference to FIG. 56 to FIG. 61. The illumination apparatus according to Embodiment 6 is an apparatus that allows a user to virtually experience a sensation that the user sees the sky through a window from the inside of a room. For example, the illumination apparatus is installed in an indoor location and virtually produces light (hereinafter referred to as virtual outdoor light) simulating the sky in nature (e.g., a blue sky or a sky at sunset) through an indoor window. It should be noted that a case in which the illumination apparatus is recessed in a ceiling (an exemplary building element) will be described in Embodiment 6. In addition, visible light may be simply referred to as light in the Specification.

[Configuration of Illumination Apparatus]

Figure 56:
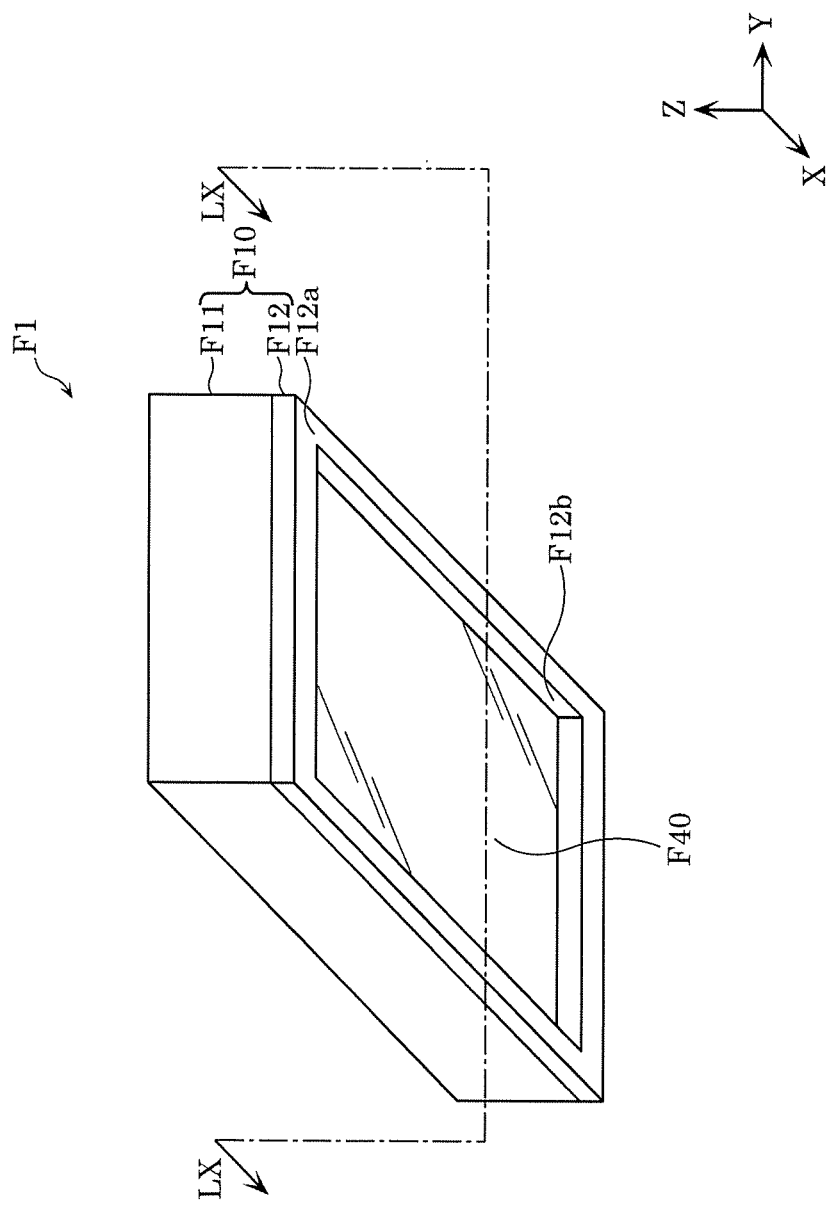
FIG. 56 is a perspective view of external appearance of an illumination apparatus according to Embodiment 6.
Figure 57:
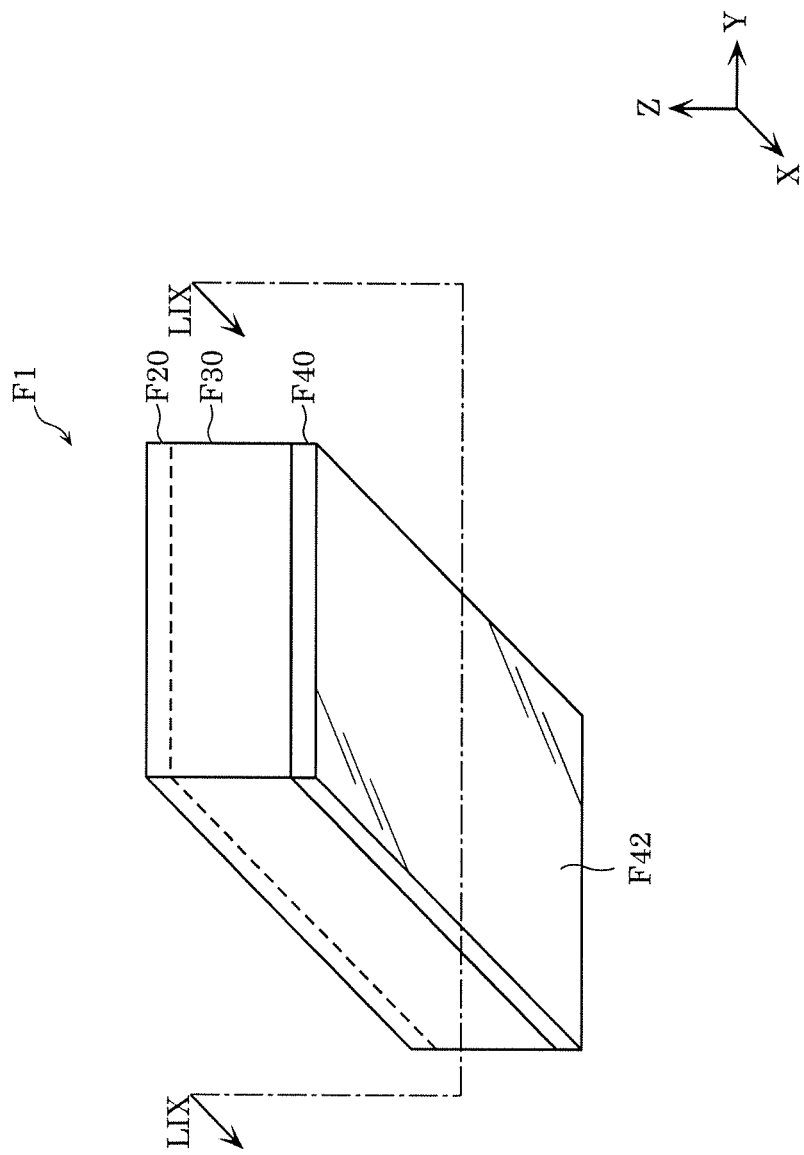
FIG. 57 is a perspective view of external appearance of the illumination apparatus according to Embodiment 6 from which a case is removed.
Figure 58:
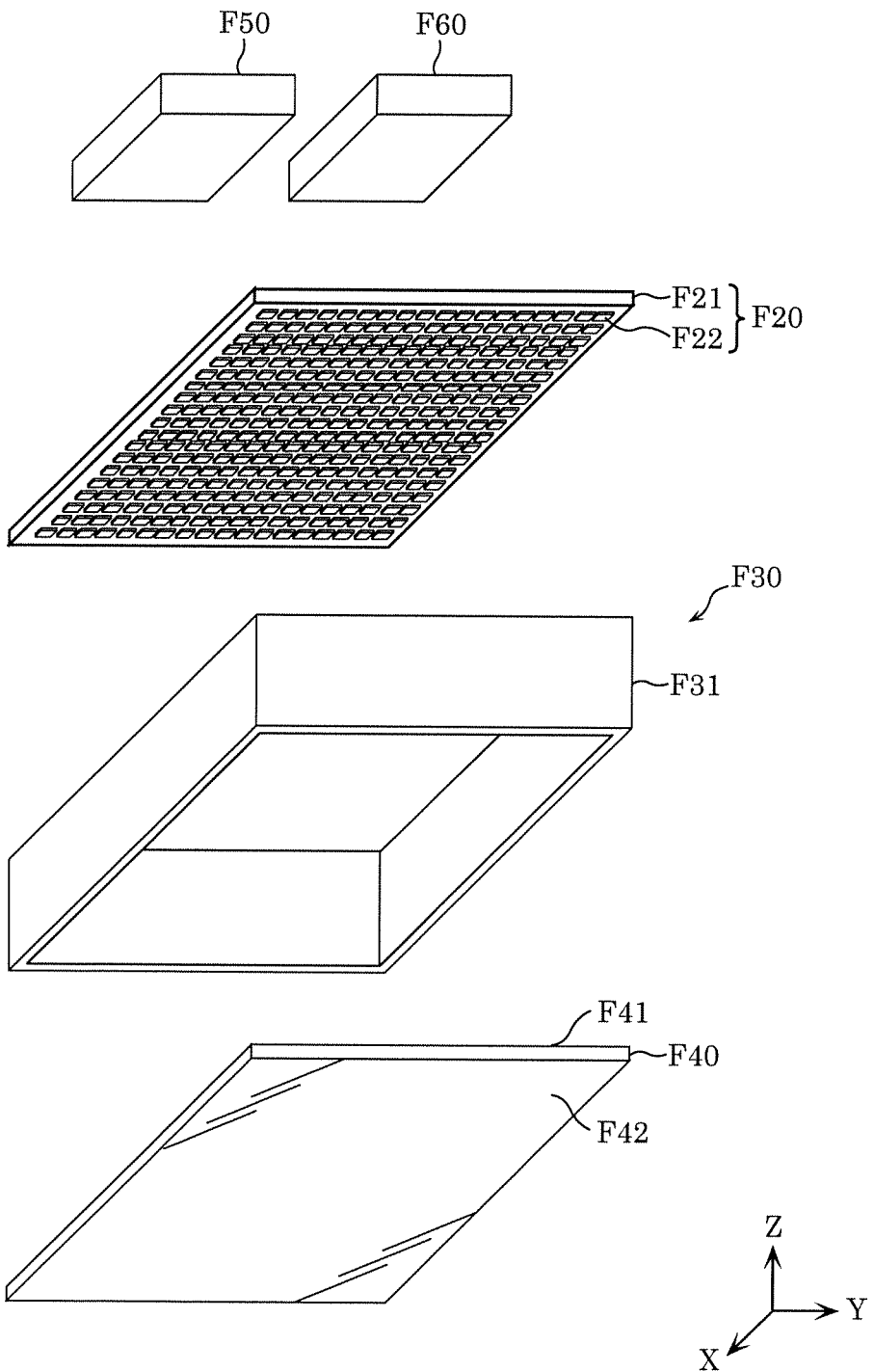
FIG. 58 is an exploded perspective view of the illumination apparatus according to Embodiment 6.

First, the following describes a configuration of the illumination apparatus according to Embodiment 6 with reference to FIG. 56 to FIG. 58. FIG. 56 is a perspective view of external appearance of illumination apparatus F1 according to Embodiment 6. FIG. 57 is a perspective view of external appearance of illumination apparatus F1 according to Embodiment 6 from which case F10 is removed. FIG. 58 is an exploded perspective view of illumination apparatus F1 according to Embodiment 6.

As illustrated in FIG. 56 to FIG. 58, illumination apparatus F1 includes case F10, light-emitting module F20, light reflector F30, light diffuser F40, controller F50, and power source F60.

Case F10 is a case body that houses light-emitting module F20, light reflector F30, light diffuser F40, controller F50, and power source F60.

As illustrated in FIG. 56, case F10 is a low-profile box and has a substantially rectangular shape in a plan view. It should be noted that case F10 is not limited to the substantially rectangular shape, and may have a shape such as a substantially circular shape, a substantially multangular shape, and a substantially semicircular shape, that is, is not limited to any particular shape.

Case F10 includes housing portion F11 and frame portion F12.

Housing portion F11 is a low-profile box that houses light-emitting module F20, light reflector F30, light diffuser F40, controller F50, and power source F60. It should be noted that controller F50 and power source F60 need not be housed in housing portion F11, and may be disposed outside of case F10, for example. Housing portion F11 has an opening (hereinafter referred to as a first opening) in a surface (hereinafter referred to as a bottom surface) on the floor side (the negative side of the Z axis), and houses light diffuser F40 to cover the first opening. In other words, the first opening corresponds in size to light diffuser F40. In Embodiment 6, the first opening has a substantially rectangular shape in a plan view.

Frame portion F12 is a ring-like (frame-like) member having a substantially rectangular shape in a plan view, and is disposed in an edge portion of the bottom surface of housing portion F11. In other words, frame portion F12 is disposed on the bottom surface of housing portion F11 to externally surround the first opening of housing portion F11. For this reason, when illumination apparatus F1 is seen in a plan view, an opening (hereinafter referred to as a second opening) of frame portion F12 and the first opening have a substantially identical shape. In Embodiment 6, the second opening has the substantially same rectangular shape as the first opening.

Light emitted from light diffuser F40 passes through the second opening. It should be noted that frame portion F12 is not limited to the substantially rectangular shape as long as frame portion F12 allows light emitted from light diffuser F40 to pass, and frame portion F12 may have a shape such as a substantially circular shape, a substantially multangular shape, and a substantially semicircular shape, that is, is not limited to any particular shape. For example, frame portion F12 has an external body that may have the same shape as housing portion F11 in a plan view.

Frame portion F12 has bottom surface portion F12a and upright portion F12b. Illumination apparatus F1 is recessed in a ceiling surface so that bottom surface portion F12a is flush with the ceiling surface, for example. In other words, bottom surface portion F12a is a surface that the user can see. For this reason, bottom surface portion F12a may be designed in harmony with the ceiling surface. For example, bottom surface portion F12a may be designed to imitate a ceiling pattern or a window frame. It should be noted that the ceiling surface is an exemplary installation surface of a part of a building.

Upright portion F12b is provided in a substantially vertical direction from an end portion of bottom surface portion F12a on a side facing the second opening toward a side opposite to the floor surface (a direction of the positive side of the Z axis). If upright portion F12b is not provided and light diffuser F40 is disposed flush with the ceiling, it appears to the user that the ceiling is a thin board (e.g., a thin board approximately as thick as light diffuser F40), and the user may have difficulty feeling as if a window that is a part of a building actually exists. Accordingly, in Embodiment 6, upright portion F12b is provided from a standpoint of simulating a window that is more realistic. For example, upright portion F12b has a height (a length in the Z-axis direction) which allows the user to perceive board thickness of the ceiling in which illumination apparatus F1 is recessed. Specifically, upright portion F12b has a height of at least 30 mm or may have a height approximately as much as a thickness from a roof to the ceiling.

Case F10 is made of, for example, a metal material or a non-metal material having high thermal conductivity. Examples of the non-metal material having high thermal conductivity include a resin having a high thermal conductance rate (a high thermal conductive resin). Using a material having high thermal conductivity as case F10 makes it possible to radiate heat generated by light-emitting module F20 to the outside via case F10. It should be noted that housing portion F11 and frame portion F12 may be each made of a different material.

A portion of light emitted from light diffuser F40 enters upright portion F12b. In order to effectively use the light, upright portion F12b may be made of a material having light-reflecting properties. Upright portion F12b may be made of a metal material or a material having a high light reflectance. For example, upright portion F12b may be formed of a hard resin material and covered with an evaporated metal film (a metal reflective film) made of a metal material such as silver or aluminum.

It should be noted that housing portion F11 and frame portion F12 may be integrally formed to constitute case F10, or housing portion F11 and frame portion F12 may be separate bodies, and case F10 may be formed by joining housing portion F11 and frame portion F12 with an adhesive.

As illustrated in FIG. 57, light-emitting module F20 is a light source that emits virtual outdoor light for forming a display image. Light-emitting module F20 is fixed to an end portion of light reflector F30 opposite to light diffuser F40 (an end portion on the positive side of the Z axis). In addition, as illustrated in FIG. 58, light-emitting module F20 includes board F21 and light-emitting elements F22 mounted on board F21.

Board F21 is a printed circuit board for mounting light-emitting elements F22 and is formed into a substantially rectangular shape. For example, a resin-based board, a metal-based board, or a ceramic board may be used as board F21.

Figure 59:
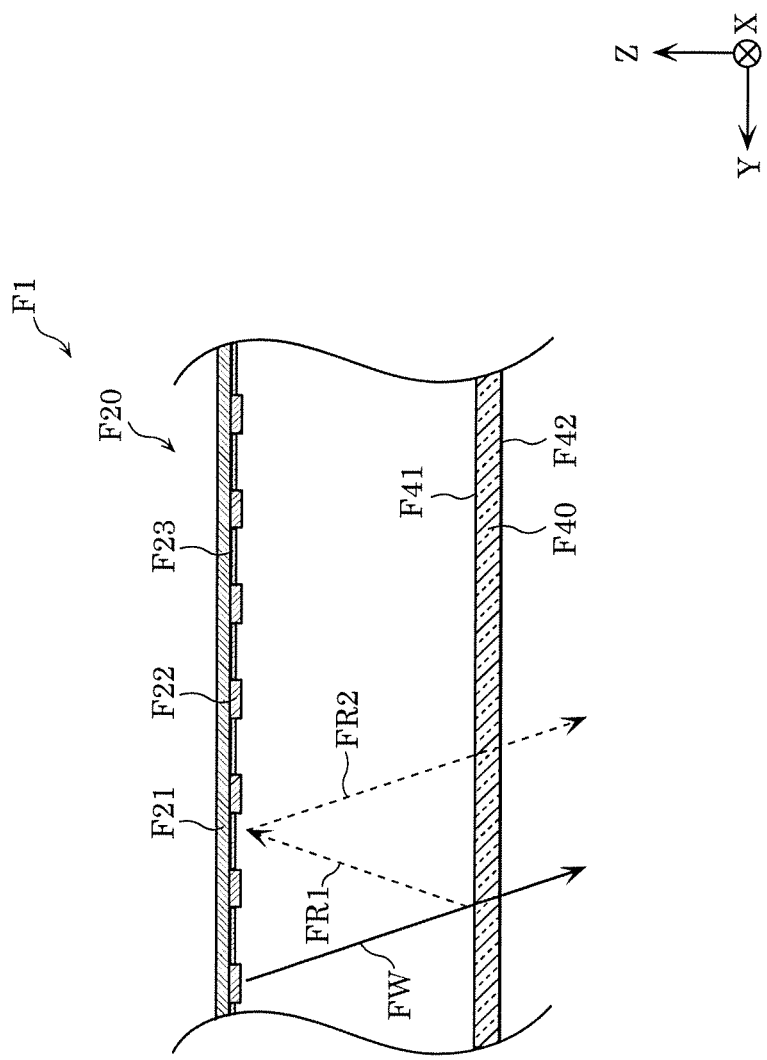
FIG. 59 is a cross-sectional view of the illumination apparatus according to Embodiment 6, taken along line LIX-LIX in FIG. 57.

In illumination apparatus F1 according to Embodiment 6, a specular reflection layer is disposed between board F21 and light diffuser F40 having translucency and light diffusibility. The specular reflection layer is an optical member that specularly reflects light entering the specular reflection layer from a side facing light diffuser F40. The following describes the specular reflection layer with reference to FIG. 59. FIG. 59 is a cross-sectional view of illumination apparatus F1 according to Embodiment 6, taken along line LIX-LIX in FIG. 57. It should be noted that a solid line and broken lines in FIG. 59 each indicate light, and specifically, the solid line indicates light (outgoing light FW) emitted from light-emitting element F22, and the broken lines each indicate light that is reflected. More specifically, reflected light FR1 indicated by one of the broken lines represents light reflected by light diffuser F40, which is included in outgoing light FW, and reflected light FR2 indicated by the other of the broken lines represents light reflected by specular reflection layer F23, which is included in reflected light FR1. It should be noted that specular reflection layer F23 is an exemplary specular reflector.

Specular reflection layer F23 is formed by applying a specular finish to a surface of board F21 on the side facing light diffuser F40 (a surface on which light-emitting elements F22 are mounted in Embodiment 6) before light-emitting elements F22 are mounted on board F21. The specular finish application includes applying or spraying a specular coating material (e.g., a coating material including pieces of aluminum). It should be noted that when board F21 is seen in a plan view, specular reflection layer F23 is formed in a region that does not overlap light-emitting elements F22 and electrodes (not shown). Moreover, specular reflection layer F23 is disposed, via an insulating layer, above electric conductors such as lines (though not shown, lines including power lines and control lines) disposed on the surface of board F21 on the side facing light diffuser F40. In other words, specular reflection layer F23 is disposed to cover board F21 except light-emitting elements F22 and the electrodes.

Furthermore, specular reflection layer F23 has a light reflectance of, for example, at least 80%.

When light enters such specular reflection layer F23 from light diffuser F40, the light is specularly reflected toward light diffuser F40 by specular reflection layer F23. For example, as illustrated in FIG. 59, a portion of outgoing light FW emitted from light-emitting module F20 is reflected toward light-emitting module F20 by light diffuser F40. Reflected light FR1 reflected by light diffuser F40 is specularly reflected toward light diffuser F40 by specular reflection layer F23 because illumination apparatus F1 according to Embodiment 6 includes specular reflection layer F23. In other words, specular reflection layer F23 is a reflecting member that reflects light emitted from light-emitting module F20. A display image is formed by light passing through light diffuser F40, which is included in outgoing light FW, and light passing through light diffuser F40, which is included in reflected light FR2 specularly reflected by specular reflection layer F23. In other words, it is possible to effectively use reflected light FR2 reflected by light diffuser F40 as light for forming the display image because illumination apparatus F1 includes specular reflection layer F23.

It should be noted that although FIG. 59 illustrates, as reflected light FR2, only the light passing through light diffuser F40, a portion of reflected light FR2 is reflected toward light-emitting module F20 by light diffuser F40. Specular reflection layer F23 further specularly reflects the reflected light. The above-described reflection repeatedly occurs between light-emitting module F20 and light diffuser F40.

It should be noted that conventionally, a light-diffusing layer that diffusely reflects light (e.g., a whitish layer in which light reflective minute particles such as silica particles are dispersed) or a light-absorbing layer (e.g., a blackish layer that absorbs light) is sometimes disposed on a surface of a board on which light-emitting elements are mounted (the surface on the floor side in Embodiment 6). Such a configuration, however, does not make it possible to effectively use, for a display image, light emitted from a light-emitting module and reflected toward the light-emitting module by a light diffuser.

For example, when the light-diffusing layer is disposed in the board, reflected light reflected by a light reflector is diffusely reflected by the light-diffusing layer. As a result, a display image formed by light emitted from the light-emitting module and passing through the light diffuser and a display image formed by light diffusely reflected by the light-diffusing layer and subsequently passing through the light diffuser differ in a degree of blur. Accordingly, the display images are different from a sky that a user sees through a window from the inside of a room, which may cause the user to feel discomfort.

Embodiment 6 is characterized by disposing specular reflection layer F23 and causing specular reflection layer F23 to specularly reflect entering light so that a display image more similar to an actual sky is reproduced. With this, a display image formed by light emitted from light-emitting module F20 and passing through light diffuser F40 (hereinafter also referred to as a first display image) and a display image formed by light specularly reflected by specular reflection layer F23 and subsequently passing through light diffuser F40 (hereinafter also referred to as a second display image) have a substantially identical degree of blur. It should be noted that the second display image is an image formed by light specularly reflected by specular reflection layer F23 at least once and subsequently passing through light diffuser F40. As explained above, numerous reflections occur between specular reflection layer F23 and light diffuser F40.

Consequently, the second display image is composed of images giving different depth feels.

Light-emitting elements F22 are light-emitting diode (LED) elements. In Embodiment 6, light-emitting elements F22 are RGB-type LED elements that emit blue light, green light, and red light (i.e., the three primary colors of light). It should be noted that light-emitting elements F22 are not limited to the RGB-type LED elements. For example, light-emitting elements F22 may be RGBW-type LED elements that emit blue light, green light, red light, and white light, or LED elements that emit blue light and white light. In addition, light-emitting elements F22 may be other LED elements. Light-emitting elements F22 are disposed on the surface of board F21 on the floor side. For example, light-emitting elements F22 are arranged in a matrix on the surface of board F21 on the floor side. For example, light-emitting elements F22 are disposed at equal intervals.

It should be noted that the LED elements may be surface-mount device (SMD) LED elements or chip-on-board (COB) LED elements.

Moreover, although not shown, board F21 is provided with a control line that is a line for transmitting a control signal from controller F50, and a power line that is a line for supplying power from power source F60. For example, the control line and the power line are provided so that light-emitting elements F22 are connected in series to the control line and the power line. Each of light-emitting elements F22 receives power from power source F60 via the power line, and emits predetermined light based on a control signal from the control line. In Embodiment 6, light-emitting elements F22 are capable of emitting light of various colors by adjusting luminance of blue light, green light, and red light because light-emitting elements F22 are the RGB-type LED elements. In consequence, light-emitting elements F22 are capable of emitting virtual outdoor light simulating, for example, a blue sky, a cloudy sky, or a sky at sunset.

As illustrated in FIG. 58, light reflector F30 is an optical member that is disposed to surround light-emitting elements F22 and has reflecting properties for light emitted from light-emitting elements F22. In other words, light-reflecting member F30 reflects light emitted from light-emitting elements F22 and entering light reflector F30. Specifically, light reflector F30 reflects light entering an inner surface of light reflector F30 (namely, a surface of light reflector F30 on a side facing light-emitting elements F22) from light-emitting elements F22, toward light diffuser F40. Light reflector F30 has a reflectance of, for example, at least 80%.

In Embodiment 6, light reflector F30 includes wall F31 surrounding light-emitting elements F22. In other words, light reflector F30 is a frame-like member surrounding light-emitting elements F22. It should be noted that light reflector F30 is not limited to a frame-like shape. As long as light reflector F30 includes wall F31 surrounding light-emitting elements F22, light reflector F30 is not limited to any particular shape. It should be noted that light reflector F30 is an exemplary frame that includes a wall surrounding light-emitting elements F22, and that the frame need not have light-reflecting properties.

The user can see a display image (hereinafter also referred to as a real image) formed by light emitted from light-emitting elements F22 and entering light diffuser F40 without going through wall F31, and a display image (hereinafter also referred to as a reflected image) formed by light emitted from light-emitting elements F22, reflected by wall F31, and entering light diffuser F40. In other words, the real image and the reflected image constitute one display image. When light reflector F30 is not provided, a display image is formed of only the real image and is approximately as large as board F21. In contrast, when the real image and the reflected image constitute a display image, it is possible to reproduce the display image larger than board F21. For example, it is possible to reproduce a display image that appears to infinitely expand (e.g., a blue sky that appears to infinitely expand). Furthermore, board F21 can be made smaller because providing light reflector F30 makes it possible to reproduce a display image that is more extensive. In other words, illumination apparatus F1 can be downsized. In addition, it is possible to reduce the number of light-emitting elements F22 to be mounted on light-emitting module F20.

Light reflector F30 is formed by performing, for example, a diffusion treatment on a reflective plate made of a metal material such as aluminum (Al) and having a specular surface. Examples of the diffusion treatment include a frosting treatment such as an anodizing treatment. It should be noted that the diffusion treatment may be performed on at least the inner surface of light reflector F30 (wall F31). Stated differently, light reflector F30 may have a diffusion layer inside wall F31. When wall F31 is a specular surface, a reflected image formed by light reflected by wall F31 is a specular image. The user is likely to recognize that the reflected image is the specular image, which reduces the effect of simulating the sky. On the other hand, as stated above, the frosting treatment causes a reflected image to be a slightly blurred image. Consequently, the user is less likely to recognize that the reflected image is a specular image, which makes it harder for the user to feel discomfort with the display image. It should also be noted that light-reflecting properties include diffusely reflecting properties.

It should be noted that the diffusion treatment performed on light reflector F30 does not include whitening. When light reflector F30 is a whitish reflective plate, light reflected by the whitish reflective plate shines substantially evenly. As a result, for example, a sense of resolution between the sky and cloud of the reflected image is lost, which reduces the effect of simulating the sky. Moreover, the inner surface of light reflector F30 (the surface on the side facing light-emitting elements F22) may be a specular surface. When the inner surface of light reflector F30 is the specular surface, as explained above, brightness between the real image and the reflected image has continuity, and it is possible to reproduce a display image that causes less discomfort compared to a case in which light reflector F30 is white. Moreover, it is possible to reduce the loss of light from light-emitting module F20 because the light entering light reflector F30 from light-emitting module F20 can be totally reflected toward light diffuser F40.

The following describes a height (a length in the Z-axis direction) of light reflector F30 (wall F31). For example, when light reflector F30 is short, light-emitting elements F22 appear granular, and the user is likely to feel discomfort with a display image. In contrast, although it is possible to reduce the granular appearance of light-emitting elements F22 when light reflector F30 is tall, illumination apparatus F1 grows in size. Moreover, whether light-emitting elements F22 appear granular depends on intervals at which light-emitting elements F22 are mounted and a haze value of light diffuser F40. In other words, in order to reduce the granular appearance of light-emitting elements F22, the height of light reflector F30, the intervals at which light-emitting elements F22 are mounted, and the haze value of light diffuser F40 are set.

It should be noted that when light reflector F30 is short (i.e., a distance between light-emitting module F20 and light diffuser F40 is small), a display image to be reproduced is a flat image. For this reason, light reflector F30 may be set high from a standpoint of reproducing a display image giving a depth feel.

Light diffuser F40 is an optical member that diffuses light entering from light-emitting module F20 and emits light toward the floor side. Specifically, light diffuser F40 is a diffusing panel that diffuses light entering from light-entering surface F41 (a surface on the positive side of the Z axis) of light diffuser F40 and emits light from light-outgoing surface F42.

Light diffuser F40 has translucency and diffusibility for light emitted from light-emitting module F20. Light diffuser F40 is produced by performing, for example, diffusion processing on a transparent plate made of glass or a resin material such as transparent acryl or poly ethylene terephthalate (PET). Light diffuser F40 has a high transmittance by including a transparent material. For example, light diffuser F40 has a total transmittance of at least 80% or more preferably at least 90%. With this, it is possible to reduce the loss of light by light diffuser F40, and reproduce a bright display image.

Light diffuser F40 is produced by performing the diffusion treatment on the transparent plate. The diffusion treatment is performed on at least one of light-entering surface F41 and light-outgoing surface F42 of light diffuser F40. Examples of the diffusion treatment include prism processing in which prisms including minute holes having a dot-like shape (recesses) are formed. The minute holes are holes of a size which does not allow the user to visually confirm the holes. The minute holes each are, for example, a cone or a pyramid. For example, a depth (a height of the cone) defined by the apex and bottom surface of the minute hole when the minute hole is the cone is at most 100 μm, and the diameter of the bottom surface of the minute hole is at most 100 μm. As a result, illumination apparatus F1 allows the user to virtually experience a sensation that the user sees the sky through a window from the inside of a room because the user cannot see the minute holes (the prisms). It should be noted that the prisms are not limited to the above-described shapes or size, and a shape or size of the prisms are appropriately determined based on the haze value of light diffuser F40. Furthermore, the diffusion treatment is not limited to the prism processing, and may be performed by surface texturing or printing.

The haze value of light diffuser F40 on which the diffusion treatment is performed is, for example, at least 10% and at most 90%. Even when light diffuser F40 includes the transparent material, it is possible to reduce the granular appearance of light-emitting elements F22 of light-emitting module F20 for the user, by setting the haze value to be at least 10%. In addition, it is possible to maintain an outline of a reproduced display image (e.g., an outline of cloud in a blue sky) to a certain degree, by setting the haze value to be at most 90%. It should be noted that the haze value can be adjusted based on, for example, the shape, size, etc. of the prisms formed in the prism processing.

Moreover, a surface of light diffuser F40 on a side facing light-emitting module F20 (light-entering surface F41) is a smooth surface. The smooth surface is, for example, a surface having surface roughness Ra of at most 5. It is possible to increase a proportion of reflected light FR1 to outgoing light FW illustrated in FIG. 59, by causing the surface of light diffuser F40 on the side facing light-emitting module F20 to be the smooth surface. For example, light reflector F30 having the smooth surface has a light reflectance of approximately 5%. In other words, a proportion of light passing through light diffuser F40 to outgoing light FW is higher than a proportion of light (reflected light FR1) reflected by light diffuser F40 to outgoing light FW.

The smooth surface of light diffuser F40 on the side facing light-emitting module F20 may be achieved by polishing the surface of light diffuser F40 on the side facing light-emitting module F20 or by applying surface coating for smoothing to the surface of light diffuser F40 on the side facing light-emitting module F20. Alternatively, the smooth surface may be achieved by applying a transparent film to the surface of light diffuser F40 on the side facing light-emitting module F20.

According to such a configuration, the first display image formed by the light emitted from light-emitting module F20 and passing through light diffuser F40 and the second display image formed by the light specularly reflected by specular reflection layer F23 and subsequently passing through light diffuser F40 differ in depth feel. The first display image is an image that is brighter than the second display image and appears ahead of the second display image. The second display image is an image that is darker than the first display image and appears behind of the first display image. In other words, the user can see the second display image darker than the first display image, behind of the first display image. The user is likely to experience a depth feel (a three-dimensional feel) about a display image composed of the first display image and the second display image, by the second display image being formed.

It should be noted that a light reflectance of light diffuser F40 is not limited to 5%, and can be adjusted based on surface roughness etc. of the smooth surface. The light reflectance of light reflector F30 may be light reflectance that allows a display image causing less discomfort to be reproduced, and may be 10% or 20%.

It should be noted that when the diffusion treatment is performed on the surface of light diffuser F40 on the side facing light-emitting module F20, the smooth surface may be provided by applying a transparent film etc. to the surface on which the diffusion treatment is performed.

Figure 60:
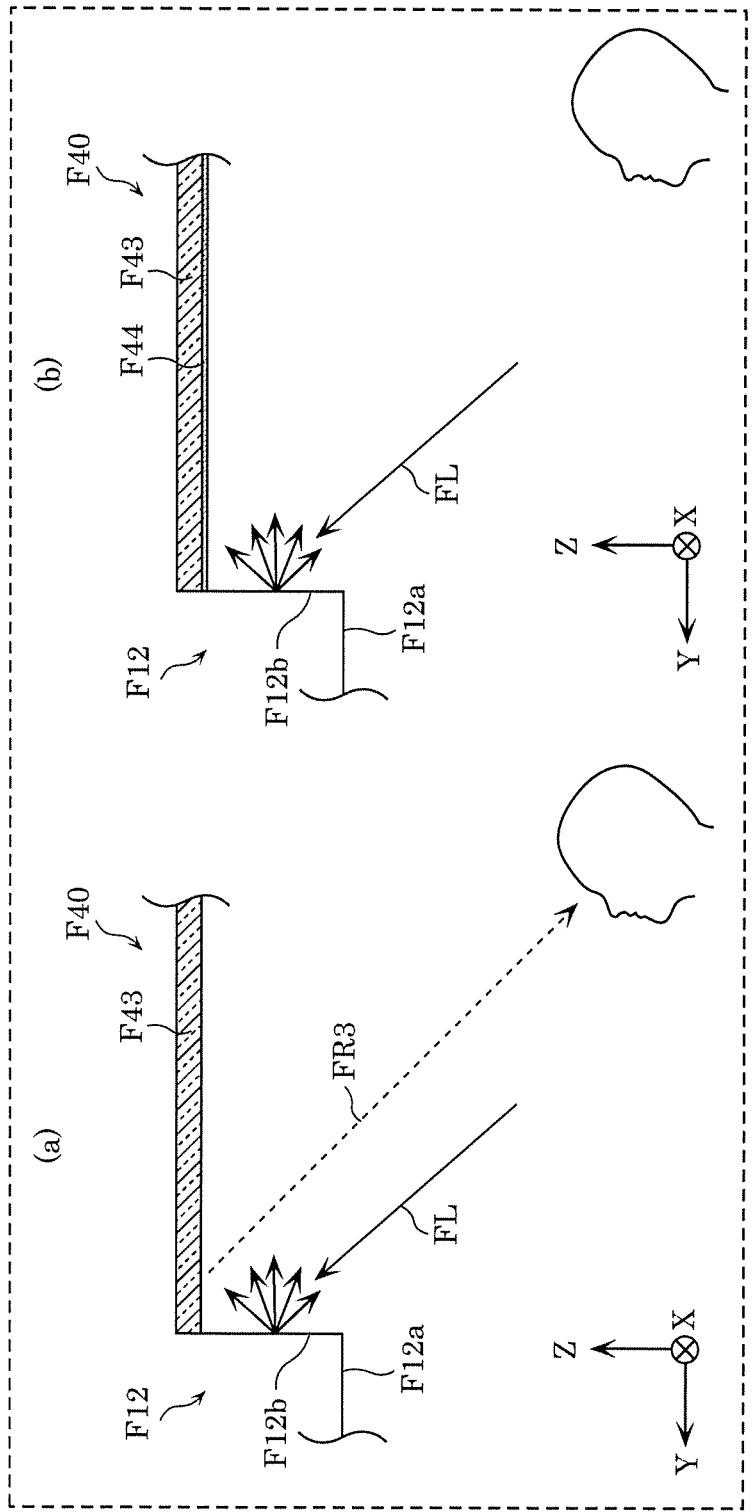
FIG. 60 is a diagram for explaining reflection of light reflected by an upright portion and entering a light diffuser depending on the presence or absence of an antireflection layer.

Furthermore, antireflection processing is performed on a surface of light diffuser F40 on the floor side (i.e., a surface from which light from light-emitting module F20 is emitted) to reduce reflection of external light reflected by upright portion F12b of case F10 and entering light diffuser F40. The following describes the antireflection processing with reference to FIG. 60. FIG. 60 is a diagram for explaining reflection of light reflected by upright portion F12b and entering light diffuser F40 depending on the presence or absence of antireflection layer F44, and is an enlarged partial cross sectional view of illumination apparatus F1 according to Embodiment 6, taken along line LX-LX in FIG. 56. Specifically, (a) in FIG. 60 is a diagram for explaining the reflection when the antireflection processing is not performed on light diffuser F40, and (b) in FIG. 60 is a diagram for explaining the reflection when the antireflection processing is performed on light diffuser F40. It should be noted that for convenience, in (a) in FIG. 60, the same components as (b) in FIG. 60 are assigned the same reference signs.

First, as illustrated in (a) in FIG. 60, a case will be described in which the antireflection processing is not performed on light diffuser F40 (i.e., light diffuser F40 includes base F43). It should be noted that base F43 is, for example, a transparent plate made of glass or a resin material such as transparent acryl or PET.

External light FL entering upright portion F12b of case F10 from the floor side is reflected by upright portion F12b. For example, external light FL is diffusely reflected by upright portion F12b. In other words, at least a portion of external light FL is diffused toward light diffuser F40. In an illumination apparatus according to a comparative example, light entering light diffuser F40 (a portion of external light FL) is diffused toward the floor side by light diffuser F40 because the antireflection processing is not performed on the surface of light diffuser F40 on the floor side. The user can see the reflection of the light reflected by upright portion F12b and entering light diffuser F40 by seeing reflected light FR3 reflected by light diffuser F40.

The reflection of the light reflected by upright portion F12b occurs both when illumination apparatus F1 is turned off and when illumination apparatus F1 is turned on. The reflection of the light reflected by upright portion F12b when illumination apparatus F1 is turned off may spoil the aesthetic appearance of illumination apparatus F1. In addition, the reflection of the light reflected by upright portion F12b when illumination apparatus F1 is turned on may cause an image generated by the reflection and a display image being overlapped to be seen in an area in which the reflection occurs, and the user may feel discomfort with the display image accordingly.

It should be noted that external light FL is light that is different from light emitted by illumination apparatus F1 and enters illumination apparatus F1. Examples of external light FL include sunlight and illumination light.

In contrast, as illustrated in (b) in FIG. 60, a case will be described in which antireflection layer F44 provided by the antireflection processing is disposed on the surface light diffuser F40 on the floor side (i.e., light diffuser F40 includes base F43 and antireflection layer F44). Antireflection layer F44 is an optical member that is transparent and reduces reflection of external light FL reflected by upright portion F12b on the surface of light diffuser F40 on the floor side. Examples of antireflection layer F44 include an antireflective (AR) coat layer provided by AR coating and an antireflection film layer provided by applying a film having an antireflection function.

According to such a configuration, it is possible to reduce the reflection of the light (the portion of external light FL) entering light diffuser F40 from upright portion F12b, toward the floor side. As explained above, the reflection of external light FL from upright portion F12b of case F10 to light diffuser F40 occurs both when illumination apparatus F1 is turned on and when illumination apparatus F1 is turned off. For this reason, it is possible to enhance the appearance of illumination apparatus F1 both when illumination apparatus F1 is turned on and when illumination apparatus F1 is turned off, by antireflection layer F44 being disposed on the surface of light diffuser F40 on the floor side.

It should be noted that in Embodiment 6, antireflection layer F44 is disposed and is, for example, the AR coat layer. Moreover, the present disclosure includes illumination apparatus F1 including light diffuser F40 which is illustrated in (a) in FIG. 60 and in which antireflection layer F44 is not disposed.

It should be noted that light diffuser F40 is not limited to the transparent plate (e.g., a transparent acrylic plate) on which the diffusion treatment is performed. For example, light diffuser F40 may be produced by providing a diffusion sheet to a transparent plate. In this case, the diffusion sheet may be applied to at least one of a surface of the transparent plate on the floor side and a surface of the transparent plate on the side facing light-emitting module F20.

As described above, light diffuser F40 has a high total transmittance and a high haze value. It should be noted that light diffuser F40 may be a milky-white diffuser panel in which a light diffusing material (e.g., light-reflective minute particles such as silica particles) is dispersed. Such a diffuser panel is produced by resin molding a translucent resin material mixed with a light diffusing material into a predetermined shape. It should be noted that although light diffuser F40 may be milky white, light diffuser F40 may be made of, for example, a transparent resin material on which the diffusion treatment is performed, from a standpoint of reducing the loss of light.

Light diffuser F40 is a rectangular plate in a plan view. Light diffuser F40 is fixed to an end portion (an end portion on the negative side of the Z axis) of light reflector F30 opposite to light-emitting module 20. In other words, light diffuser F40 is opposite to light-emitting module F20 and is disposed to cover light-emitting module F20. Moreover, as illustrated in FIG. 56, light diffuser F40 is disposed to cover the first opening of case F10. For this reason, when the user looks up at the ceiling, the user can visually confirm, of illumination apparatus F1, light diffuser F40, and bottom surface portion F12a and upright portion F12b of frame portion F12.

Controller F50 is a control device that controls operations of light-emitting module F20 such as lighting up, turning off, dimming, and toning (adjustment of a color of emitted light or a color temperature), according to an instruction from the user (e.g., an instruction received via a remote control or the like). For example, controller F50 obtains information about a display image stored in a storage (not shown), and reproduces the display image based on the information. Specifically, when controller F50 receives, from the user, an instruction to display a blue sky as a display image, controller F50 obtains information about the blue sky from the storage, and controls light-emitting module F20 based on the information obtained. It should be noted that controller F50 and light-emitting module F20 (light-emitting elements F22) are electrically connected via a control line.

In Embodiment 6, light-emitting elements F22 are the RGB-type LED elements. Accordingly, controller F50 outputs a control signal to light-emitting elements F22 via the control line according to an instruction from the user, the control signal including information about luminance of each of blue LEDs, green LEDs, and red LEDs. Light-emitting elements F22 having received the control signal emit blue light, green light, and red light based on the control signal.

Controller F50 outputs a control signal to light-emitting module F20 at time intervals that, for example, do not cause a display image to move unnaturally. Specifically, controller F50 outputs the control signal approximately twenty times per second. With this, when, for example, a display image of moving cloud is reproduced, it is possible to reproduce more natural motion.

Controller F50 is implemented by, for example, a microcomputer, a processor, or a dedicated circuit.

In Embodiment 6, controller F50 is disposed on the surface of light-emitting module F20 (board F21) opposite to another surface of the same facing light diffuser F40.

Power source F60 includes: a power converter (e.g., a power converter circuit) that converts AC power supplied from a power system (e.g., a commercial power source) into DC power; and a power circuit that generates power for causing light-emitting module F20 (light-emitting elements F22) to emit light. For example, power source F60 converts AC power supplied from a commercial power source into DC power having a predetermined level, by rectifying, smoothing, stepping down, etc. the AC power, and supplies the DC power to light-emitting module F20. Power source F60 is electrically connected to the power system via, for example, a power line.

In Embodiment 6, power source F60 is disposed on the surface of light-emitting module F20 opposite to the other surface of the same facing light diffuser F40. In other words, controller F50 and power source F60 are coplanar.

Figure 61:
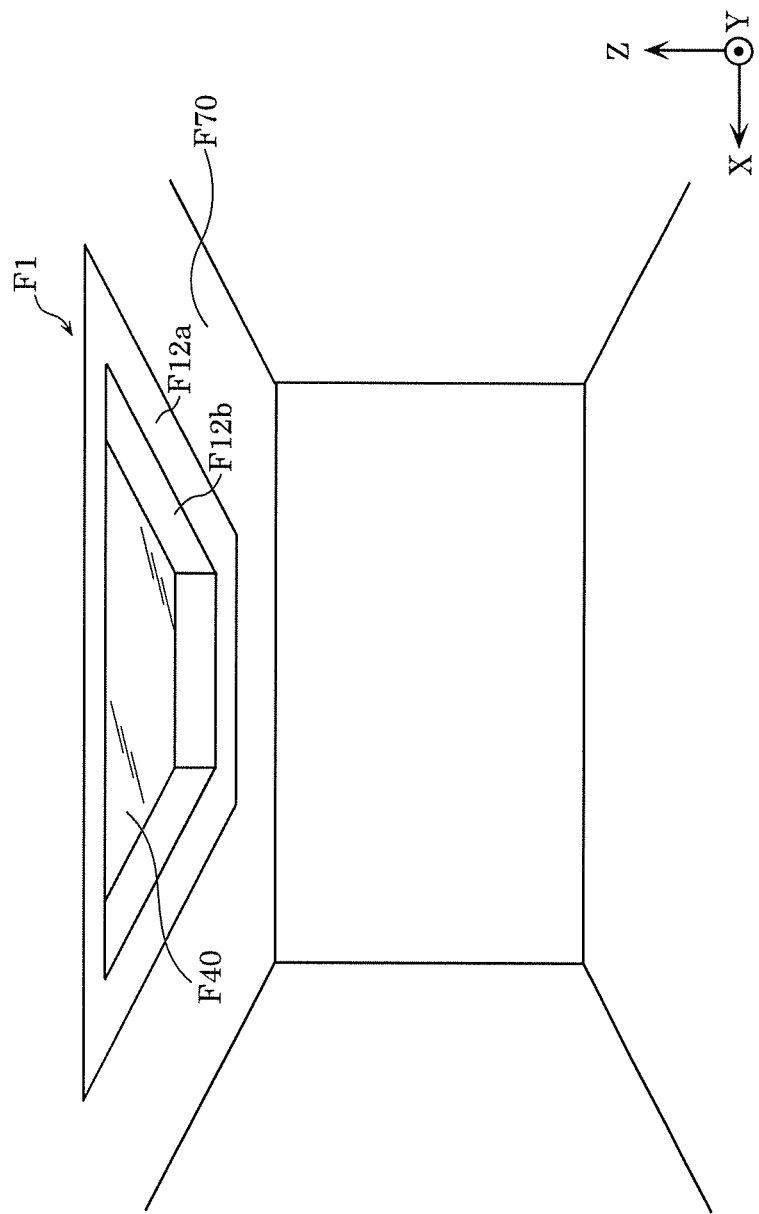
FIG. 61 is a conceptual diagram illustrating exemplary installation of the illumination apparatus according to Embodiment 6.

Illumination apparatus F1 thus configured is, for example, recessed in the ceiling and used. Specifically, as illustrated in FIG. 61, illumination apparatus F1 is recessed in ceiling F70 of a room and used. FIG. 61 is a conceptual diagram illustrating exemplary installation of illumination apparatus F1 according to Embodiment 6. Illumination apparatus F1 reproduces a display image giving a depth feel with the first display image and the second display image, and by looking up at illumination apparatus F1, the user can see the display image that allows the user to virtually experience a sensation that the user sees the sky through a window from the inside of a room (i.e., the display image that causes less discomfort). It should be noted that illumination apparatus F1 may be installed in, for example, a facility, an underground mall, or the like in which daylight is hard to obtain.

[Advantageous Effects Etc.]

Next, the following describes advantageous effects of illumination apparatus F1 according to Embodiment 6.

Illumination apparatus F1 according to Embodiment 6 is to be disposed in a recess of ceiling F70 (an exemplary part of a building). Illumination apparatus F1 includes: light-emitting module F20 that includes board F21 and light-emitting elements F22 disposed on board F21; light diffuser F40 that has translucency and covers light-emitting module F20; specular reflection layer F23 (an example of the specular reflector) that is disposed between light-emitting module F20 and light diffuser F40; and light reflector F30 that includes wall F31 surrounding light-emitting elements F22. Light-emitting module F20 emits light toward light diffuser F40, and specular reflection layer F23 reflects light from light diffuser F40.

With this, light (e.g., reflected light FR1) emitted from light-emitting elements F22 and reflected by a surface of light diffuser F40 on a side facing light-emitting module F20 is reflected toward light diffuser F40 by specular reflection layer F23 (an example of the light reflector). In other words, the user can see a first display image formed by light emitted from light-emitting module F20 and passing light diffuser F40, and a second display image formed by light emitted from light-emitting module F20, reflected by light diffuser F40 and specular reflection layer F23, and passing light diffuser F40. Stated differently, the user can see one display image formed of the first display image and the second display image. The light forming the second display image propagates between light-emitting module F20 and light diffuser F40 for a longer distance than the light forming the first display image because the light forming the second display image is reflected by light diffuser F40 and specular reflection layer F23. For this reason, the second display image is formed behind of the first display image when seen by the user. In other words, by the second display image being formed, it is possible to reproduce a display giving a stronger depth feel without upsizing the illumination apparatus.

Thus, according to illumination apparatus F1 according to Embodiment 6, it is possible to reproduce the display image with less discomfort.

Moreover, the specular reflector is specular reflection layer F23 disposed on a surface of board F21 on a side facing light diffuser F40.

With this, light reflected by light diffuser F40 can be further reflected toward light diffuser F40 by specular reflection layer F23. In other words, by disposing specular reflection layer F23 on the surface of board F21 on the side facing light diffuser F40, it is possible to reproduce a display giving a depth feel without upsizing the illumination apparatus.

Moreover, a surface of light diffuser F40 on a side facing light-emitting module F20 is a smooth surface.

With this, it is possible to increase a proportion of light emitted from light-emitting module F20 and reflected by the surface of light diffuser F40 on the side facing light-emitting module F20. In other words, it is possible to cause the second display image formed by the light passing light diffuser F40, which is included in reflected light FR2, to be a more bright image. Accordingly, it is possible to reproduce a display image with much less discomfort because the difference in brightness between the first display image and the second display image can be reduced, compared to a case in which the surface of light diffuser F40 on the side facing light-emitting module F20 is not the smooth surface.

Moreover, light diffuser F40 includes antireflection layer F44 on a surface opposite to a surface facing light-emitting module F20.

With this, when external light reflected by upright portion F12b enters the surface of light diffuser F40 on the side facing light-emitting module F20 (a surface on the floor side), it is possible to reduce reflection of the entering light toward the floor side by light diffuser F40. In other words, it is possible to reduce reflection of light reflected by upright portion F12b and entering light diffuser F40. The reflection of external light reflected by upright portion F12b and entering light diffuser occurs both when illumination apparatus F1 is turned on and when illumination apparatus F1 is turned off. For this reason, by disposing antireflection layer F44 on the surface of light diffuser F40 on the floor side, it is possible to reduce discomfort caused by the display image when illumination apparatus F1 is turned on as well as to enhance the aesthetic appearance of illumination apparatus F1 when illumination apparatus F1 is turned off. It should be noted that illumination apparatus F1 may include upright portion F12b or a part of a building may include upright portion F12b.

(Variation 9)

Figure 62:
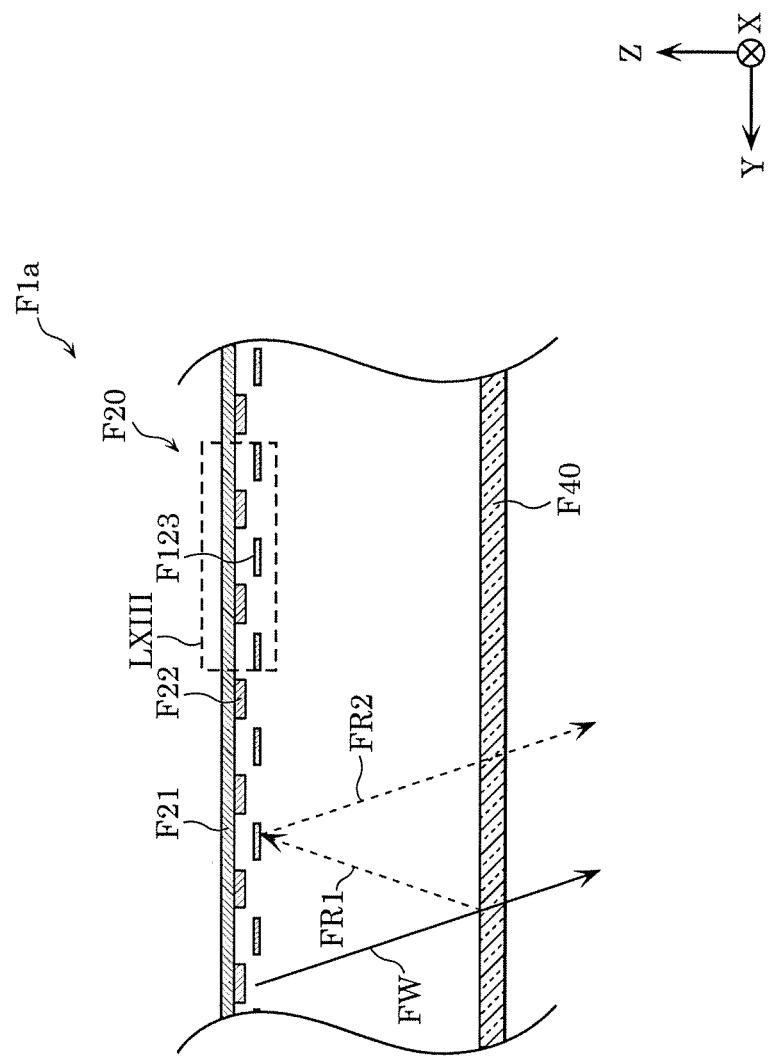
FIG. 62 is a cross-sectional view of an illumination apparatus according to Variation 9, taken along line LIX-LIX in FIG. 57.
Figure 63:
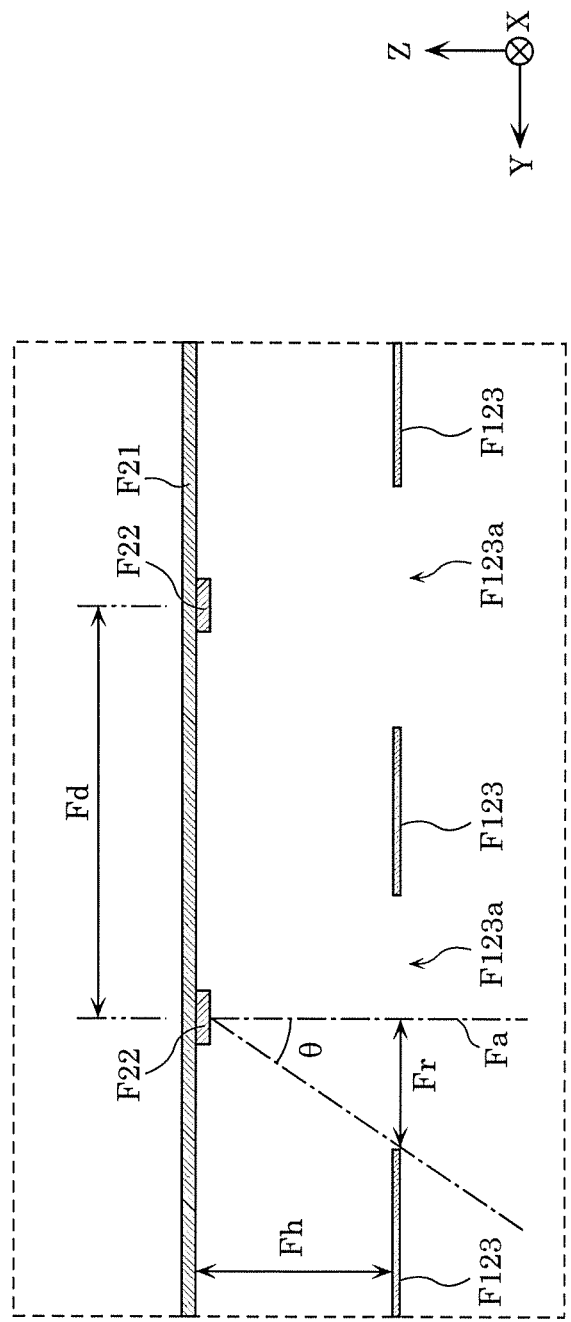
FIG. 63 is an enlarged cross-sectional view of the illumination apparatus according to Variation 9, in a dashed region in FIG. 62.

The following describes an illumination apparatus according to Variation 9 of Embodiment 6 with reference to FIG. 62 to FIG. 64. FIG. 62 is a cross-sectional view of illumination apparatus F1a according to Variation 9, taken along line LIX-LIX in FIG. 57. FIG. 64 is a fragmentary plan view of illumination apparatus F1a according to Variation 9, in a state in which light diffuser F40 is omitted from FIG. 57. It should be noted that differences from Embodiment 6 will be mainly described in Variation 9, and descriptions of the same structural components are omitted or simplified. Illumination apparatus F1a according to Variation 9 differs from the illumination apparatus of Embodiment 6 mainly in that a specular reflector includes a metal plate having holes.

As illustrated in FIG. 62 and FIG. 64, illumination apparatus F1a according to Variation 9 includes perforated metal plate F123 that specularly reflects, toward light diffuser F40 of board F21, reflected light FR1 reflected by light diffuser F40. Perforated metal plate F123 is an exemplary specular reflector. In addition, perforated metal plate F123 is an exemplary metal plate having holes.

Perforated metal plate F123 has reflecting properties for light emitted from light-emitting module F20. Perforated metal plate F123 may be made of a material having a high reflectance for the light emitted from light-emitting module F20. For example, perforated metal plate F123 is produced by punching holes F123a in a metal plate such as a copper plate, a stainless plate, or an aluminum plate. It should be noted that a specular reflector is not limited to be made of the metal plate. For example, a glass plate or a resin plate to which a specular surface is provided by depositing aluminum etc. thereon may be used as the specular reflector. In this case also, holes are punched at locations corresponding to respective light-emitting elements F22.

As illustrated in FIG. 62, perforated metal plate F123 is disposed between board F21 and light diffuser F40 and closer to board F21. In Variation 9, perforated metal plate F123 is disposed in proximity to board F21. Holes F123a of perforated metal plate F123 are holes through which light emitted from light-emitting elements F22 is allowed to pass toward light diffuser F40. In other words, perforated metal plate F123 is disposed to avoid blocking the light emitted from light-emitting elements F22. For this reason, holes F123a of perforated metal plate F123 are made corresponding to respective light-emitting elements F22. For example, as illustrated in FIG. 64, holes F123a are made corresponding one-to-one with light-emitting elements F22. It should be noted that holes F123a each have, for example, a substantially circular shape in a plan view. It should be noted that the substantially circular shape may be a circular shape or an elliptical shape.

Moreover, holes F123a are made to cover light-emitting elements F22 in a plan view. Furthermore, holes F123a are larger in area than light-emitting elements F22 in a plan view. This is because it is intended to reduce a decrease of light for reproducing a display image caused by light emitted from light-emitting elements F22 entering a surface of perforated metal plate F123 on the side facing light-emitting module F20. The size of holes F123a is appropriately determined based on, for example, light distribution characteristics of light-emitting elements F22 and a distance between perforated metal plate F123 and light-emitting module F20. It should be noted that perforated metal plate F123 is fixed to, for example, light reflector F30.

Moreover, perforated metal plate F123 is disposed on the surface of board F21 on the side facing light diffuser F40 so that the centers of holes F123a are approximately aligned with the centers of light-emitting elements F22. This makes it possible to further reduce the decrease of the light for reproducing the display image.

With this configuration, light emitted from light-emitting module F20 and reflected by light diffuser F40 is specularly reflected toward light diffuser F40 by the surface of perforated metal plate F123 on the side facing light diffuser F40. It should be noted that perforated metal plate F123 may be disposed in proximity to light-emitting module F20 from a standpoint of reproducing a display image giving a depth feel.

The following describes a positional relationship between light-emitting module F20 and perforated metal plate F123 and the size of holes F123a with reference to FIG. 63. In what follows, a case will be described in which perforated metal plate F123 is disposed between light diffuser F40 and surfaces of light-emitting elements F22 on the side facing light diffuser F40 (hereinafter also referred to as light-emitting surfaces). It should be noted that when perforated metal plate F123 is disposed between board F21 and the light-emitting surfaces of light-emitting elements F22, the following need not be applied. For example, when perforated metal plate F123 is disposed between board F21 and the light-emitting surfaces of light-emitting elements F22, the size of holes F123a of perforated metal plate F123 may be substantially identical to the size of light-emitting elements F22.

FIG. 63 is an enlarged cross-sectional view of illumination apparatus F1a according to Variation 9, in dashed region LXIII in FIG. 62.

As illustrated in FIG. 63, where the radius of each of holes F123a of perforated metal plate F123 is denoted by Fr, an interval between light-emitting elements F22 arranged in a matrix (a distance between adjacent ones of light-emitting elements F22) is denoted by Fd, a half beam angle of light (outgoing light FW) emitted from light-emitting elements F22 is denoted by θ, and a distance between board F21 and perforated metal plate F123 is denoted by Fh, the positional relationship (distance) between light-emitting module F20 and perforated metal plate F123 and the size of holes F123a are determined so that the following relationship is satisfied.

$$Fd/2 > Fr > Fh \times \tan\theta \qquad \text{(Expression 1)}$$

It is clear from Expression 1 that radius Fr of each hole F123a is smaller than the half of interval Fd of light-emitting elements F22 and larger than Fh×tan θ defined by distance Fh between board F21 and perforated metal plate F123 and half beam angle θ of outgoing light FW from light-emitting elements F22. Even when perforated metal plate F123 is disposed between light diffuser F40 and the light-emitting surfaces of light-emitting elements F22, punching holes F123a in perforated metal plate F123 to satisfy Expression 1 allows perforated metal plate F123 to avoid blocking outgoing light FW from light-emitting elements F22.

It should be noted that interval Fd between adjacent light-emitting elements F22 indicates a distance between the centers of respective adjacent light-emitting elements F22 in a plan view or cross-sectional view, and is, for example, a distance between optical axes of respective adjacent light-emitting elements F22. Moreover, the half beam angle is defined as an angle formed by optical axis Fa and a direction in which an intensity of light emitted from the light-emitting surfaces of light-emitting elements F22 becomes half of the maximum intensity of the light.

It should be noted that above Expression 1 is not limited to the case in which the specular reflector is perforated metal plate F123. For example, Expression 1 is applicable to a case in which specular reflection layer F23 according to Embodiment 6 is disposed between light diffuser F40 and the surfaces of light-emitting elements F22 on the side facing light diffuser F40.

It should be noted that although perforated metal plate F123 produced by punching the holes in the metal plate is described above as the exemplary metal plate having the holes, a method of punching holes in a metal plate is not limited to this. For example, holes may be punched in a metal plate by cutting.

It should be noted that although the example in which perforated metal plate F123 is disposed between board F21 and light diffuser F40 and closer to board F21 is described above, the present disclosure is not limited to this. For example, perforated metal plate F123 may be disposed in contact with the surface of board F21 on the side facing light diffuser F40 via an insulating layer. Moreover, in this case, perforated metal plate F123 may be thinner than light-emitting elements F22.

As above, the specular reflector included in illumination apparatus F1a according to Variation 9 is perforated metal plate F123 having holes F123a at the locations corresponding to light-emitting elements F22 (the exemplary metal plate having the holes).

With this, it is possible to provide the same effect as in the case in which the specular reflector is specular reflection layer F23.

Moreover, the metal plate is disposed between light-emitting elements F22 and light reflector F40.

With this, since it is possible to control a depth feel by adjusting the metal plate between light-emitting elements F22 and light reflector F40, it is possible to reproduce a display image with less discomfort.

Moreover, where an interval of adjacent two light-emitting elements F22 among light-emitting elements F22 is denoted by Fd, a half beam angle of outgoing light from light-emitting elements F22 is denoted by θ, and a distance between board F21 and perforated metal plate F123 is denoted by Fh, the radius Fr of each of holes F123a is defined by the following relational expression.

$$Fd/2 > Fr > Fh \times \tan\theta \qquad \text{(Expression 1)}$$

With this, even when perforated metal plate F123 is disposed between light diffuser F40 and the light-emitting surfaces of light-emitting elements F22, perforated metal plate F123 having holes F123a satisfying Expression 1 makes it possible to avoid blocking outgoing light FW from light-emitting elements F22.

Other Variations of Embodiment 6 Etc.

Although the present disclosure is described based on Embodiment 6 etc., the present disclosure is not limited to Embodiment 6 etc.

For example, although the example in which the case includes the frame portion is described in Embodiment 6 etc., the present disclosure is not limited to this. For example, the frame portion may be configured as a portion of a part of a building. In other words, an illumination apparatus does not include the frame portion and is fixed to the frame portion which is the part of the building. In the case where the case includes the frame portion, when the illumination apparatus is attached to, for example, a ceiling, the user may see a boundary between the ceiling and the bottom surface of the frame portion and feel discomfort accordingly. In contrast, in the case where the frame portion is configured as the part of the building, the illumination apparatus does not include the frame portion, and discomfort to be felt by the user seeing the boundary between the ceiling and the illumination apparatus can be reduced accordingly.

Moreover, although the example in which the specular reflector is disposed between the board and the light diffuser is described in Embodiment 6 etc., the present disclosure is not limited to this. For example, when the board is transparent, the specular reflector may be disposed on a side (the positive side of the Z axis) opposite to the light diffuser with reference to the board. In other words, the board (the light-emitting module) may be disposed between the specular reflector and the light reflector. In this case, the specular reflector need not have the holes.

Moreover, although the example in which the holes of the perforated metal plate are larger in area than the light-emitting elements in a plan view is described in Embodiment 6 etc., the present disclosure is not limited to this. For example, a lens that controls light distribution characteristics of light emitted from the light-emitting module may be disposed between the light-emitting module and the perforated metal plate, and the size of each of the holes may be determined based on light distribution characteristics of light passing through the lens.

Moreover, although the example in which the holes of the perforated metal plate have the substantially circular shape in a plan view is described in Embodiment 6 etc., the present disclosure is not limited to this. For example, the shape of the holes may be appropriately determined based on light distribution characteristics of the light-emitting elements.

Moreover, although the example in which the illumination apparatus is recessed in the ceiling is described in Embodiment 6 etc., the present disclosure is not limited to this. For example, the illumination apparatus may be recessed in a wall etc. In this case, the wall is an exemplary part of the building.

Moreover, although the example in which the diffusion treatment performed on the inner surface of the light reflector is the frost treatment is described in Embodiment 6 etc., the present disclosure is not limited to this. For example, a treatment for roughening the inner surface of the light reflector such as blasting may be used as the diffusion treatment.

Moreover, although the example in which the illumination apparatus includes the light reflector and the case is described in Embodiment 6 etc., the present disclosure is not limited to this. For example, when the light reflector has a closed-end cylindrical shape and houses each of the structural components, the illumination apparatus need not include the case. In addition, when the internal surface of the case has light-reflecting properties (i.e., when the case includes the frame portion surrounding the light-emitting elements, and a surface of the frame portion on the side facing the light-emitting elements has light-reflecting properties), the illumination apparatus need not include the light reflector.

Moreover, although the example in which the light reflector is the frame-like member having the wall is described in Embodiment 6 etc., the present disclosure is not limited to this. For example, the light reflector may have a closed-end frame-like shape. In this case, the light-emitting module is disposed so that the light-emitting elements are on a side facing the opening of the light reflector with reference to the board. In addition, the light reflector having the closed-end frame-like shape may include the wall surrounding the light-emitting elements and a bottom portion covering a surface opposite to a surface on which the light-emitting elements of the light-emitting module are mounted, and at least the wall may have reflecting properties for light emitted by the light-emitting elements. The light reflector may include the wall surrounding the light-emitting elements and having light-reflecting properties.

Moreover, although the example in which the light reflector is the reflective plate made of the metal material such as aluminum is described in Embodiment 6 etc., the present disclosure is not limited to this. For example, the light reflector may be made of a hard resin, and an evaporated metal film (a metal reflective film) made of a metal material such as aluminum may be provided to the inner surface of the light reflector. In addition, the light reflector may be formed by joining a metal tape such as an aluminum tape to a resin plate made of a resin material with an adhesive.

Moreover, although the example in which the controller causes the light-emitting module to reproduce the display image according to the instruction of the user is described in Embodiment 6 etc., the present disclosure is not limited to this. For example, the controller may obtain a look of the sky from an imaging device (e.g., a camera) that captures the look of the sky, and may cause the light-emitting module to reproduce a display image similar to the look of the sky obtained. Accordingly, it is possible to reduce discomfort to be felt by the user when the user goes outside or inside because the display image reproduced inside the room by the illumination apparatus and the actual look of the sky outside are similar.

Moreover, although the example in which the controller reproduces the display image according to the instruction of the user is described in Embodiment 6 etc., the present disclosure is not limited to this. For example, the controller may have a timer function, obtain, from the storage, information about a display image corresponding to a time when an instruction is received from the user, and control the light-emitting module based on the information obtained. Alternatively, the controller may obtain, at a predetermined time, information about a display image corresponding to the predetermined time from the storage, and control the light-emitting module based on the information obtained.

While the foregoing has described one or more embodiments and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. An illumination apparatus, comprising:
a case having an opening portion;
a first light source disposed in the case and including a plurality of light-emitting elements;
a light diffuser which is disposed in the opening portion, diffuses and transmits light emitted from the first light source, and from which the light diffused and the light transmitted exit;
a light emission component disposed outside a light exit region of the light diffuser on a light exit surface side of the light diffuser; and
a second light source that emits light to the light emission component to cause the light emission component to radiate light,
wherein the light emission component is a different component from the case and has a light emission surface, and
the light emission surface reflects light that is emitted from the first light source and enters the light emission surface without transmitting through the light emission component, and emits light that is emitted from the second light source and transmits through the light emission component.

2. The illumination apparatus according to claim 1, wherein
the light emission component is disposed around the light exit region.

3. The illumination apparatus according to claim 1, wherein
the light emission component is a light guide plate having the light emission surface.

4. The illumination apparatus according to claim 3, wherein
the light emission component is disposed such that the light emission surface intersects a light exit surface of the light diffuser and faces an inside of the light exit region opposite the outside of the light exit region.

5. The illumination apparatus according to claim 1, wherein
the second light source includes a light-emitting element that emits light of three primary colors.

6. The illumination apparatus according to claim 1, further comprising:
a controller that controls light emission of the first light source and light emission of the second light source.

7. The illumination apparatus according to claim 6, wherein
the controller controls the light emission of the second light source such that a color temperature of the light radiated from the light emission component is different from a color temperature of the light exiting from the light diffuser.

8. The illumination apparatus according to claim 6, wherein
a plurality of light emission components, each being the light emission component, are provided, the plurality of light emission components including a first light emission component and a second light emission component,
a plurality of second light sources, each being the second light source, are provided, the plurality of second light sources including a first-second light source corresponding to the first emission component and a second-second light source corresponding to the second emission component, and
the controller controls light emission of the first-second and second-second light sources such that a light emission state of the first light emission component is different from a light emission state of the second light emission component.

9. An illumination apparatus, comprising:
a case having an opening portion;
a first light source disposed in the case and including a plurality of light-emitting elements;
a light diffuser which is disposed in the opening portion, diffuses and transmits light emitted from the first light source, and from which the light diffused and the light transmitted exit; and
a light emission component disposed outside a light exit region of the light diffuser on a light exit surface side of the light diffuser,
wherein the light emission component is a different component from the case and has a light emission surface, and
the light emission surface reflects light that is emitted from the first light source and enters the light emission surface without transmitting through the light emission component, and emits light that is emitted from the second light source and transmits through the light emission component.

10. The illumination apparatus according to claim 9, wherein
part of the plurality of light-emitting elements emits light to the light emission component.

11. The illumination apparatus according to claim 9, wherein
the light exit region is rectangular, and
the light emission component is disposed around four sides of the light exit region.

12. The illumination apparatus according to claim 9, wherein
the light emission component is a light guide plate having the light emission surface, and
the light emission surface is orthogonal to a light exit surface of the light diffuser.

13. An illumination system, comprising:
an illumination apparatus including:
a case having an opening portion;
a first light source disposed in the case and including a plurality of light-emitting elements; and a light diffuser which is disposed in the opening portion, diffuses and transmits light emitted from the first light source, and from which the light diffused and the light transmitted exit;

light-emitting equipment including:
- a light emission component disposed outside a light exit region of the light diffuser on a light exit surface side of the light diffuser; and
- a second light source that emits light to the light emission component to cause the light emission component to radiate light; and an illumination controller that controls light emission of the first light source and light emission of the second light source, wherein the light emission component is a different component from the case and has a light emission surface, and the light emission surface reflects light that is emitted from the first light source and enters the light emission surface without transmitting through the light emission component, and emits light that is emitted from the second light source and transmits through the light emission component.

14. The illumination apparatus according to claim 1, wherein
the light emitted from the second light source is incident on the light emission component without the light diffuser.

15. The illumination apparatus according to claim 6, wherein
when light exiting from the light diffuser has a color temperature of at least 10000 K and at most 15000 K, the controller controls the light emission of the second light source such that a color temperature of the light emitted from the light emission component is at least 5000 K and at most 7000 K, and when light exiting from the light diffuser has a color temperature of at least 2000 K and at most 3000 K, the controller controls the light emission of the second light source such that a color temperature of the light emitted from the light emission component is at least 5000 K and at most 7000 K.

16. The illumination apparatus according to claim 1, wherein
the second light source is housed in a recess of the light emission component.

17. The illumination apparatus according to claim 1, wherein
the second light source is disposed on the light exit surface side of the light diffuser.

18. The illumination apparatus according to claim 6, wherein
the controller further causes the first light source to emit light simulating a blue sky.

19. The illumination apparatus according to claim 18, wherein
the controller further causes the first light source to emit light simulating a cloud moving in a blue sky.

20. The illumination apparatus according to claim 6, wherein:
the illumination apparatus is an illumination apparatus in a recess of part of a building, and
the controller controls the second light source such that a color of the light emitted from the light emission component becomes identical to a color of the part of the building.

* * * * *